US006535553B1

(12) United States Patent
Limberg et al.

(10) Patent No.: US 6,535,553 B1
(45) Date of Patent: Mar. 18, 2003

(54) PASSBAND EQUALIZERS WITH FILTER COEFFICIENTS CALCULATED FROM MODULATED CARRIER SIGNALS

(75) Inventors: Allen LeRoy Limberg, Vienna, VA (US); Chandrakant B. Patel, Hopewell, NJ (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/335,514

(22) Filed: Jun. 18, 1999

Related U.S. Application Data

(60) Provisional application No. 60/130,566, filed on Apr. 22, 1999, provisional application No. 60/125,384, filed on Mar. 22, 1999, and provisional application No. 60/089,884, filed on Jun. 19, 1998.

(51) Int. Cl.⁷ ............................. H03H 7/30; H04B 1/18
(52) U.S. Cl. ................... 375/232; 455/164.1; 348/614
(58) Field of Search ............................... 375/232, 328, 375/229, 230, 233, 316; 708/322, 323; 455/164.1, 164.2, 182.3, 192.3; 348/614, 607, 611

(56) References Cited

U.S. PATENT DOCUMENTS 5,297,165 A * 3/1994 Ueda et al. ................. 375/230
5,673,293 A * 9/1997 Scarpa et al. ............... 375/321
6,377,312 B1 * 4/2002 Limberg et al. ............. 348/21

* cited by examiner

Primary Examiner—Chi Pham
Assistant Examiner—Khai Tran
(74) Attorney, Agent, or Firm—Sughrue Mion, PLLC

(57) ABSTRACT

A digital communications radio receiver, as for television, digitizes a final intermediate-frequency signal offset from zero frequency no more than a few megahertz. This digitized final I-F signal is passed through an adaptive equalizer before being synchrodyned to baseband in the digital regime, which adaptive equalizer has its weighting coefficients determined by comparing I-F signal as received with possible multipath with ideal I-F signal free from multipath distortion. Decision feedback for adjusting the filtering coefficients of the equalizer is described, which is based on the ideal baseband signal being re-modulated onto final I-F carrier and compared to the received signal as translated in frequency to provide the final I-F signal. A training-signal method for adjusting the filtering coefficients of the equalizer is described, which characterizes the reception channel by comparing prescribed portions of the received signal as translated in frequency to provide the final I-F signal to final I-F signal segments stored at the receiver. Equalization of the final I-F signal based on error signals derived from modulated I-F signal, rather than from demodulated baseband signal, allows different equalization of the upper sideband and the lower sideband of the final I-F signal. This facilitates receiver passband tilts as well as multipath distortion being compensated for.

76 Claims, 30 Drawing Sheets

PASSBAND EQUALIZERS WITH FILTER COEFFICIENTS CALCULATED FROM MODULATED CARRIER SIGNALS

This application is filed under 35 U.S.C. 111(a) claiming pursuant to 35 U.S.C. 119(e)(1) benefit of the filing date of provisional application Ser. No. 60/130,566 filed Apr. 22, 1999, pursuant to 35 U.S.C. 111(b), benefit of the filing date of provisional application Ser. No. 60/125,384 filed Mar. 22, 1999, pursuant to 35 U.S.C. 111(b); and benefit of the filing date of provisional application Ser. No. 60/089,884 filed Jun. 19, 1998, pursuant to 35 U.S.C. 111(b).

The invention relates to the suppression of multipath distortion in radio receivers, such as those used for receiving television signals.

BACKGROUND OF THE INVENTION

Multipath reception conditions give rise to ghosts in NTSC television reception. Multipath signals that arrive at the receiver with enough time displacement from the principal signal as to cause discernible ghosts in a received television image are referred to as "macro-ghosts". Multipath signals which arrive over a transmission path of lesser length than the strongest or "principal" signal reach the receiver earlier and are referred to as "pre-ghosts"; the ghost images they cause in a received television image appear to the left of the desired image. Pre-ghosts occurring in off-the-air reception can be displaced as much as six microseconds from the "principal" signal, but pre-ghosts preceding the principal signal by more than four microseconds are rare. Multipath signals which arrive over a transmission path of greater length than the strongest or "principal" signal reach the receiver later and are referred to as "post-ghosts"; the ghost images they cause in a received TV image appear to the right of the desired image. Typically, the range for post-ghosts extends to forty microseconds displacement from the "principal" signal, with most post-ghosts occurring in a sub-range that extends to ten microseconds displacement. Multipath signals that arrive at the receiver with too little time displacement from the principal signal as to cause discernible ghosts in a received television image, but which affect transient response, are referred to as "micro-ghosts". Macro-ghosts are more common in over-the-air terrestrial broadcasts than cablecasting, in which micro-ghosts commonly occur because of reflections introduced by un-terminated or mis-terminated cables.

Ghosts are a problem in digital television (DTV) transmissions as well as in NTSC analog television transmissions, although the ghosts are not seen as such by the viewer of the image televised by DTV. Instead, the ghosts cause errors in the data-slicing procedures used to convert symbol coding to binary code groups. If these errors are too frequent, the error correction capabilities of the DTV receiver are overwhelmed, and there is catastrophic failure in the DTV television image. If such catastrophic failure occurs infrequently, it can be masked to some extent by freezing the last transmitted good DTV image, such masking being less satisfactory if the DTV images contain considerable motion content. The catastrophic failure in DTV image reception may be accompanied by loss of sound, which is harder to conceal than momentary loss of video. Loss or break-up of sound may occur by itself, also.

Filtering to suppress macro-ghosts is often referred to as "ghost-cancellation" filtering, with filtering to suppress micro-ghosts being referred to as "channel equalization". For the sake of brevity, in this specification the term "equalizer" will be used generically to describe a filter that suppresses both micro-ghosts and macro-ghosts.

Baseband equalization of demodulated signals can be done with digital filters sampling at the Nyquist or symbol rate of the signal being equalized. Such equalization is called "synchronous equalization", and equalization cannot be satisfactorily achieved at lower effective sampling rates. If adaptation of the coefficients of the digital filters is to be done by decision-feedback method, synchronous equalization is not satisfactory when multipath distortion is susceptible to change at appreciable rate. Such reception conditions are commonly referred to as "dynamic multipath conditions", and the multipath distortion occurring under such reception conditions is commonly referred to as "dynamic multipath distortion". The signal to be equalized must be oversampled to obtain the bandwidth in the feedback loop necessary to track changing multipath distortion. Equalization is done by a digital filter or filters having the delay between successive taps a proper fraction of that in the digital filter(s) used for synchronous equalization. Accordingly, baseband equalization of oversampled demodulated signal is termed "fractional equalization".

Aside from considerations of sampling rate, two basic types of equalization have been employed in the prior art, namely, baseband equalization of demodulated signal and passband equalization for signal modulating a carrier wave. Adaptive digital lowpass filters called "baseband equalizers" are used in baseband equalization. An adaptive digital filter used as a baseband equalizer has weighting coefficients that are adjusted responsive to decision-feedback error signal that is extracted from the demodulated radio signal or to received training signal extracted from selected portions of the demodulated radio signal. Passband equalization as known in the art uses adaptive digital bandpass filters called "passband equalizers" for supplying equalized responses to modulated carrier waves. Typically, the modulated carrier wave is an intermediate-frequency signal derived from a transmitted radio-frequency signal that has been selected for reception. Since passband equalization is performed before demodulation, persons skilled in the art of digital communications radio receiver design have favored its use for radio-frequency signals using modulation resulting in the carrier being central to its sidebands. Examples of such modulation are double-sideband amplitude modulation (DSB AM), quadrature amplitude modulation (QAM), binary phase-shift keying (BPSK) and quadrature phase-shift keying (QPSK). Passband equalization is preferred because the demodulation results, being already equalized, are more reliably suitable for carrier synchronization.

In passband equalization as practiced in the prior art, a digital bandpass filter used as a passband equalizer has its weighting coefficients calculated in accordance with a baseband-to-bandpass transformation of the weighting coefficients that would obtain for an equivalent baseband equalizer. This is the case whether the equalizer has its weighting coefficients determined responsive to training signal extracted from the demodulated radio signal, or has its weighting coefficients adjusted responsive to decision-error feedback signal that is derived from the demodulated radio signal. That is, the signal is demodulated to generate baseband signals that are compared with ideal baseband signals as the basis for determining weighting coefficients for the equivalent baseband equalizer, using a training signal method, a decision-error feedback method or a combination of these two methods.

Passband equalization as known in the art is not particularly well suited for vestigial sideband amplitude-modulation (VSB) signals such as those specified by the 1995 ATSC Digital Television Standard. This is because, with carrier not being midband, baseband-to-bandpass transformation of the equivalent baseband equalizer weighting coefficients results in a passband equalizer having a bandwidth of nearly 12 MHz. If the VSB digitized I-F signal has its carrier in the lower-frequency portions thereof, the carrier must be offset nearly 6 MHz to avoid folding of the bandpass passband. The uppermost frequencies of the VSB digitized I-F signal will be nearly 12 MHz, pushing the sampling rate requirement upward. If the VSB digitized I-F signal has its carrier in the higher-frequency portions thereof, the sampling rate needed to support the 12 MHz bandwidth of the digital filter is still the same. The doubling of sampling rate required by the doubled-bandwidth passband equalizer makes analog-to-digital conversion and phase-splitter filtering considerably more difficult to implement in practice.

Even in passband equalization for signals that employ modulation with the carrier being central to its sidebands, there are previously unrecognized problems associated with using the baseband-to-bandpass transformation of the weighting coefficients of the equivalent baseband equalizer to generate the weighting coefficients for the passband equalizer. The transformation results in passband filtering with amplitude response exhibiting even symmetry about the carrier frequency and phase response exhibiting odd symmetry about the carrier frequency. Reduction of multipath distortion is possible with such passband filtering, since multipath distortion arising from macro-ghosts presents essentially a linear-phase filtering problem. Multipath distortion arising from micro-ghosts (the predominant multipath problem in a cable system) causes asymmetry of the reception channel about the carrier frequency, however. Also, the filtering done to define the passband in a practical receiver design is very apt to introduce asymmetry of the reception channel about the carrier frequency. Using the baseband-to-bandpass transformation of the equivalent baseband equalizer weighting coefficients to generate the weighting coefficients for the passband equalizer does not allow for the upper-sideband frequencies and the lower-sideband frequencies of the modulated carrier to be equalized separately, but forces an equalization on average of upper-sideband and lower-sideband frequencies equidistant from the carrier. Such equalization will permit undesirable distortion in QAM and in multiple-phase shift keying (MPSK) signals, such as QPSK, to remain uncorrected.

In the decision-feedback method disclosed in this specification for adjusting the weighting coefficients of a passband equalizer, the estimates of the actual modulating signal used in multipath-free transmission of the signal that is received are per custom made in the baseband, after demodulation of the received signal that is possibly accompanied by multipath distortion has taken place. In the decision feedback method disclosed in this specification, these estimates are transformed from the baseband to the passband using a modulation process that is the converse of the demodulation process. The results of this re-modulation process are filtered to have the same bandwidth as the received signal, thus to generate a comparison signal against which the actually received passband signal and possible accompanying multipath distortion is differentially compared to generate the decision-feedback error signal. Since in the derivation of the decision-feedback error signal there is no folding of the frequency spectrum of the received signal, which is possibly accompanied by multipath distortion, the equalization of the upper-sideband frequencies and the equalization of the lower-sideband frequencies of the modulated carrier are separable when using the decision-feedback method of the invention.

In the training-signal method disclosed in this specification for adjusting the weighting coefficients of a passband equalizer, a "passband" training signal with possible multipath distortion is extracted from the actually received passband signal before its demodulation, rather than a "baseband" training signal being extracted from baseband signal following demodulation of the passband signal. The "passband" training signal is the result of a baseband-to-bandpass transformation of the "baseband" training signal that the prior-art training-signal method employs for adjusting the weighting coefficients of a baseband equalizer. The discrete Fourier transform of the "passband" training signal with possible multipath distortion as extracted from the actually received passband signal is divided term-by-term by the discrete Fourier transform of the ideal "passband" training signal, which is free from multipath distortion. The DFT of the ideal "passband" training signal is stored at the receiver. The DFT resulting from this term-by-term division procedure characterizes the channel through which the transmitted "passband" training signal is received. The weighting coefficients of the passband equalizer are then calculated as the complex conjugates of the channel DFT terms. The DFTs used in the calculation of the weighting coefficients of the passband equalizer are descriptive of passband signals before there is any frequency spectrum folding associated with the demodulation procedure, so the equalization of the upper-sideband frequencies and the equalization of the lower-sideband frequencies of the modulated carrier are separable when using the training-signal method of the invention.

SUMMARY OF THE INVENTION

Radio receivers that down-convert radio-frequency signal to an intermediate-frequency signal offset in its entirety from zero frequency by an offset of no more than a few megacycles are known, being particularly favored for digital television (DTV) signal receivers. The invention in a general aspect thereof is a new type of equalization for such an intermediate-frequency signal. A radio receiver employing this new type of equalization comprises an analog-to-digital converter for digitizing samples of a selected modulated signal as translated to an intermediate-frequency band offset in its entirety from zero frequency, thereby to generate a digitized intermediate-frequency signal; an equalizer including an adaptive digital filter with adjustable filter weights, for providing an equalizer response to the digitized intermediate-frequency signal; a demodulator for demodulating the equalizer response, thereby to provide demodulation results; circuitry for comparing at least a portion of the digitized intermediate-frequency signal with ideal values thereof to generate comparison results; and filter coefficient computation apparatus for determining from those comparison results the adjustable filter coefficients of the adaptive digital filtering required for equalizing the digitized intermediate-frequency signal. That is, the adjustable filter coefficients are calculated based on error signals obtained from modulated I-F signal, rather than on error signals obtained from baseband signals that have been demodulated.

A more specific aspect of the invention concerns calculating by a decision-feedback method the adjustable weights of the adaptive digital filter in the equalizer. To implement such calculation, the radio receiver further comprises circuitry responsive to the demodulation results to generate noise-free estimates of the original modulating signals used for the radio transmission, a modulator for modulating a carrier in accordance with those noise-free estimates of the original modulating signals to generate an estimation of the original radio transmission, and circuitry for generating decision-feedback signal by differentially comparing the adaptive digital filter response with the estimation of the original radio transmission. In a preferred embodiment of this more specific aspect of the invention, the circuitry responsive to the demodulation results to generate noise-free estimates of the original modulating signals used for the radio transmission includes rate-reduction filtering for supplying samples of the demodulation results at symbol rate, quantization circuitry for generating the noise-free estimates of the original modulating signals responsive to the response of said rate-reduction filtering, and re-sampling circuitry for re-sampling the noise-free estimates of the original modulating signals to the same sample rate as the adaptive digital filter response for use as modulating signals by the modulator.

Another more specific aspect of the invention concerns calculating the adjustable weights of the adaptive digital filter by a training signal method. To implement such calculation, the radio receiver further comprises circuitry for extracting training signal of predetermined character and the multipath distortion thereof from the digitized intermediate-frequency signal, and the computer has associated with it a memory for storing the discrete Fourier transform of that training signal of predetermined character without multipath distortion. The training signal of predetermined character without multipath distortion stored in memory is an intermediate-frequency signal that is the baseband-to-passband transform of the baseband training signal that would be used for a baseband equalizer. The computer is arranged for computing the discrete Fourier transform of the training signal of predetermined character and the multipath distortion thereof as extracted from the digitized intermediate-frequency signal. The computer is arranged for then dividing the terms of that discrete Fourier transform by the corresponding terms of the discrete Fourier transform of the training signal of predetermined character without multipath distortion as drawn from the memory therefor, thereby to generate a discrete Fourier transform characterizing the reception channel preceding the adaptive digital filter; The computer is arranged for thereafter calculating the adjustable parameters of the adaptive digital filter so as to compensate against the multipath distortion in the reception channel.

Figure 1:
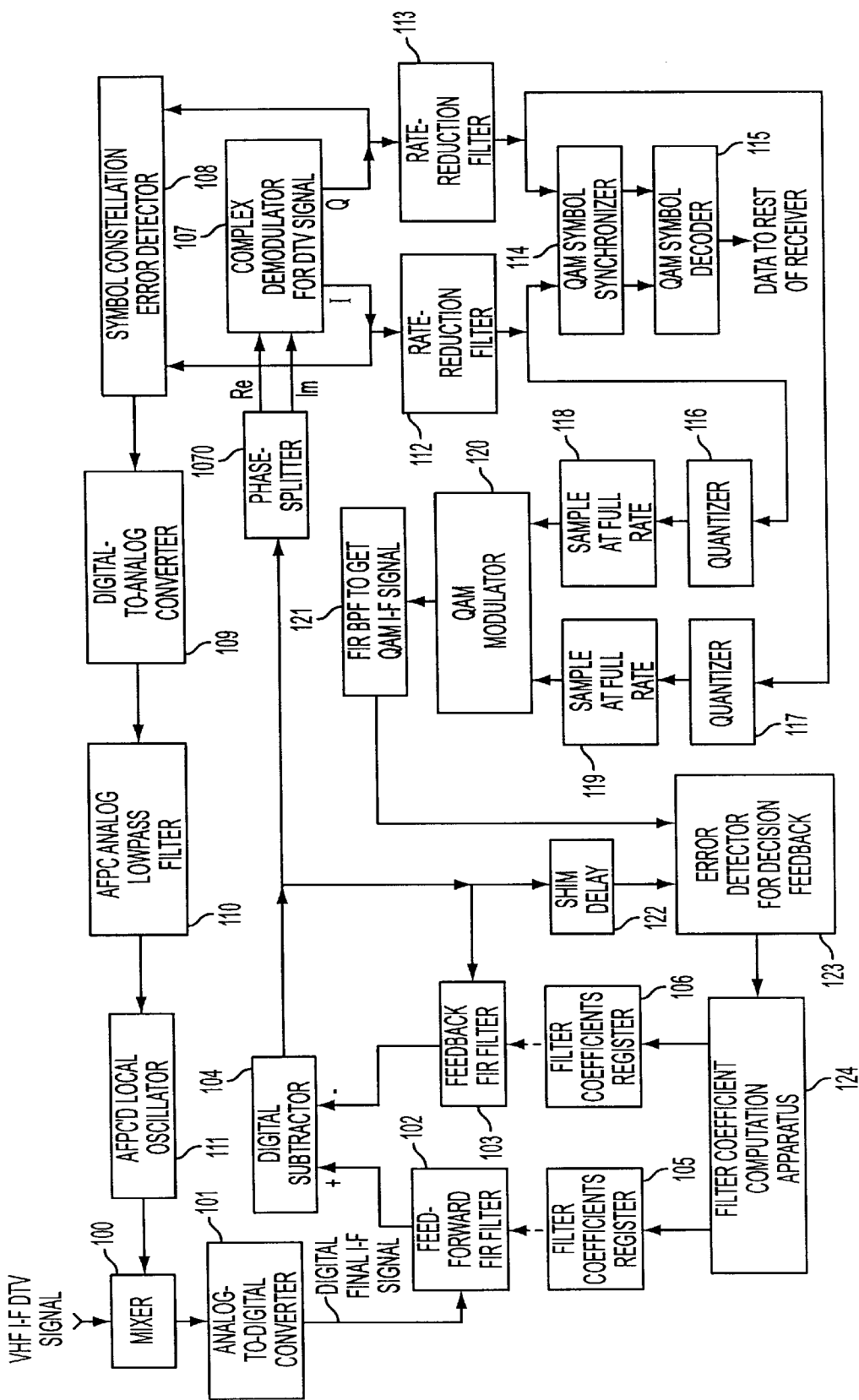
FIG. 1 is a block schematic diagram of circuitry for equalization of QAM final intermediate-frequency signal, which circuitry is an embodiment of the invention.

At various points in the circuits shown in the FIGURES of the drawing, shimming delays must be inserted in order that the sequence of operation is correct, as will be understood by those skilled in electronic design. Unless there is something noteworthy about a particular shimming delay requirement, it will not be explicitly referred to in the specification that follows.

DETAILED DESCRIPTION

The FIG. 1 circuitry for equalizing QAM signal receives a very-high-frequency (VHF) intermediate-frequency QAM signal as a first input signal for a mixer 100. The mixer 100 is used for down-converting the frequencies of the QAM signal to a final intermediate-frequency signal in a frequency band offset in its entirety from zero frequency by no more than a few megahertz. By way of specific example, a QAM signal having a symbol rate of $5.38*10^6$ symbols per second and occupying a bandwidth of 6 MHz can be down-converted in frequency to place its carrier at 4.48 MHz in the final I-F signal. The lowest-frequency lower-sideband component in the final I-F signal will be at 1.48 MHz. So, if the demodulation scheme that is used requires Hilbert transform filtering of the digitized final I-F signal, this filtering can be done without suffering unreasonably long latent delay. The highest-frequency upper-sideband component in the final I-F signal will be at 7.48 MHz, which has to be sampled at a rate of somewhat more than $29.9*10^6$ samples per second if crosstalk between real and imaginary components of the orthogonal modulation is to be avoided. The frequency spectrum near the ninth harmonic of NTSC color subcarrier frequency is available for fixed frequency oscillators, such as a master clock oscillator oscillating at 32,286,712.5 Hz.

The final I-F signal is digitized by an analog-to-digital converter 101. Preferably, the sampling rates used in the digital processing are established by a spectral line method, so they are related by whole-number ratios to the symbol rate of the received digital communication (e.g., DTV) signal. This procedure results in the digital carrier used for synchrodyning in the digital regime corresponding to a fixed frequency in the analog regime and causes the system functions of digital filters to have precisely defined spectral responses in the analog regime.

If the final I-F band is offset in its entirety from zero frequency, and if the uppermost frequency in the final I-F band is not undersampled during digitization, the concurrence of these two conditions necessarily results in the modulating signal of the modulated carrier in the I-F band being oversampled. The equalized baseband signal resulting from demodulating the equalized digital I-F signal at its sampling rate will therefore be fractionally equalized. This is the case whether the modulation form is QAM, is double-sideband amplitude-modulation (DSB AM), or is vestigial-sideband amplitude-modulation (VSB AM or simply VSB). Equalization of VSB modulation is considered in detail further on in this specification.

The digitized final I-F signal from the ADC 101 is viewed as being the input signal of the equalizer for the QAM signal as converted to final I-F band. Within the equalizer, the digitized final I-F signal is applied as input signal to a feed-forward finite-impulse-response digital filter 102. The output signal from the feed-forward FIR digital filter 102 and the output signal from a feedback finite-impulse-response digital filter 103 are applied as minuend and subtrahend input signals, respectively, of a digital subtractor 104. The FIR digital filter 102 is an adaptive filter including a tapped digital delay line for supplying tap signals that variously delay its respective input signal, digital multipliers for multiplying the tap signals by weighting coefficients supplied from a filter coefficients register 105, and a digital adder for summing the products from the digital multipliers to generate the filter 102 response. The FIR digital filter 103 is an adaptive filter including a tapped digital delay line for supplying tap signals that variously delay its respective input signal, digital multipliers for multiplying the tap signals by weighting coefficients supplied from a filter coefficients register 106, and a digital adder for summing the products from the digital multipliers to generate the filter 103 response. The difference output signal from the subtractor 104 is viewed as being the output signal of the equalizer for the QAM final I-F signal. In FIG. 1 this output signal of the equalizer is directly applied to the feedback FIR digital filter 103 as the input signal thereof.

The subtractor 104 and the feedback FIR digital filter 103 together form an infinite-impulse-response (IIR) digital filter used to reduce multipath distortion arising from post-ghosts that exhibit appreciable delay from the principal signal. Usually many of the weighting coefficients of a feedback FIR digital filter using a uniformly-tapped digital delay line will be zero-valued, so the feedback FIR digital filter 103 is often constructed using programmable bulk digital delay elements and a digital adder with a reduced number of summand inputs. The feed-forward FIR digital filter 102 is used for reducing multipath distortion arising from pre-ghosts, from micro-ghosts, and from post-ghosts too little delayed from principal signal for the IIR filter to suppress the multipath distortion those post-ghosts cause.

The highest-frequency upper-sideband component of consequence in the final I-F signal is preferably kept as low as possible, consonant with the requirements on offset of the final I-F signal from zero frequency and with the ease of generating the digital carrier from read-only memory (ROM). This permits the sampling rate at which the ADC 101 operates to digitize final I-F signal being kept low, to reduce the number of digital multipliers needed for convolving the final I-F signal with equalization filter coefficients in the digital regime.

The equalized QAM final I-F signal that the subtractor 104 supplies as difference output signal is applied as input signal to a phase-splitter 1070, which responds to supply a stream of imaginary samples of equalized QAM final I-F signal and to supply a stream of real samples of equalized QAM final I-F signal with similar latent delay. The phase-splitter circuitry 1070 may comprise an FIR digital filter for providing the stream of imaginary samples as a Hilbert transform filter response to the real samples of the equalized digital I-F signal supplied by the subtractor 104 and compensatory digital delay for providing the stream of real samples with similar latent delay. Alternatively, the phase-splitter circuitry 1070 uses a pair of IIR digital filters as described by C. M. Rader in his article "A Simple Method for Sampling In-Phase and Quadrature Components", IEEE TRANSACTIONS ON AEROSPACE AND ELECTRONIC SYSTEMS, Vol. AES-20, No. 6 (November 1984), pp. 821≧824. In another alternative the phase-splitter circuitry 1070 uses a pair of FIR digital filters as described by T. F. S. Ng in United Kingdom patent application 2 244 410 A published Nov. 27, 1991 and entitled "QUADRATURE DEMODULATOR".

A complex demodulator 107 supplies an in-phase (I) synchronous detection result and a quadrature phase (Q) synchronous detection result in response to the streams of real and imaginary samples of equalized QAM final I-F signal the demodulator 107 receives from the phase splitter 1070. These I and Q signals are supplied to a symbol constellation error detector 108, which develops an error signal responsive to mis-phasing of the two-dimensional QAM symbol constellation. This error signal is supplied to a digital-to-analog converter 109 for conversion to an analog signal applied as input signal to a lowpass filter 110. The lowpass response from the filter 110 is applied to a local oscillator 111 as an automatic frequency and phase control signal. Controlled oscillations from the oscillator 111 are supplied as second input signal to the mixer 100 for heterodyning with the VHF I-F signal supplied as first input signal to the mixer 100 to generate the final I-F signal supplied to the ADC 101.

As noted above, the sampling rates used in the digital processing are preferably established by a spectral line method, so the digital carrier used for synchrodyning in the digital regime has a prescribed system function corresponding to a fixed frequency in the analog regime. Automatic frequency and phase control (AFPC) of oscillations from the oscillator 111 indirectly adjusts, via their heterodyne with VHF I-F signal in the mixer 100, the final I-F signal supplied from the mixer 100 so its frequency corresponds to the prescribed system function of that digital carrier and so its phase is synchronized to establish demodulation of the QAM signal at one of the desired phase rotation angles. This differs from the previous practice of adjusting the frequency and phase of the digital carrier system function to correspond with the frequency and phase of the final I-F signal.

The AFPC loop adjusts the frequency and phase of the local oscillator 111 and consequently of the final I-F signal such that one of the I and Q signals from the complex demodulator 107 corresponds to the real component of the baseband QAM symbol code as originally transmitted. The frequency and phase adjustments by the AFPC loop are such that the other of the I and Q signals from the complex demodulator 107 corresponds to the imaginary component of the baseband QAM symbol code as originally transmitted. The I and Q signals from the complex demodulator 107 are supplied to rate-reduction filters 112 and 113, respectively, which supply I and Q signals with sample rate reduced to symbol rate. The I and Q signals from the rate-reduction filters 112 and 113 are supplied to a QAM symbol synchronizer 114 that determines which of the real and imaginary components of the baseband QAM symbol code each of the I and Q signals corresponds to. The real and imaginary components of the baseband QAM symbol code as reproduced from the I and Q signals are supplied to a QAM symbol decoder 115.

The derivation of the error signal used in the decision-feedback loop will be considered next. The I and Q signals from the rate-reduction filters 112 and 113 are supplied to a quantizer 116 and to a quantizer 117, respectively, which quantizers provide noise-free estimates of the I and Q signal components of the baseband QAM symbol code as originally transmitted. In the prior art the error signal used in the decision-feedback loop has been generated by comparing these best estimates supplied as output signals from the quantizers 116 and 117 with the actually received I and Q signals supplied from the rate-reduction filters 112 and 113 to the quantizers 116 and 117 as their respective input signals. The error signals as thus generated are of limited bandwidth because the sampling rate of these error signals is no more than the symbol rate. In order to maintain the full advantage of oversampling during equalization in regard to capability to track changing multi-path distortion, care should to be taken not to reduce the bandwidth of the decision-feedback loop when deriving the error signals. Decision-feedback error signals should be generated by comparing the best estimates of the transmitted I and Q signals with received signals that have not been subjected to rate reduction.

Generating decision-feedback error signals by comparing the best estimates of the transmitted I and Q signals with the I and Q signals supplied from the complex demodulator 107 has a shortcoming, even if the comparisons are made before rate reduction of the I and Q signals by the rate-reduction filters 112 and 113. Demodulation is attended by the folding of the frequency spectrum around zero frequency. This spectrum folding makes it no longer possible to distinguish the respective equalization requirements of the lower-frequency sideband and of the upper-frequency sideband. While this may not be a serious shortcoming in regard to equalizing against the effects of multipath reception, it is a serious shortcoming with regard to being able to equalize against the effects of non-linear group delay within the receiver itself. The better way of generating decision-feedback error signals is as follows. The digital carrier used in the synchrodyning of the equalizer output signal to baseband is quadrature-amplitude-modulated in accordance with the best estimates of the transmitted I and Q signals to generate a best estimate of the transmitted QAM signal. The decision-feedback error signal is then generated by comparing this best estimate of the transmitted QAM signal with the actually received QAM signal after equalization. That is, to obtain a full-bandwidth decision-feedback error signal oversampled to suit the tap spacing of the FIR digital filters 102 and 103, the best estimate of the transmitted QAM signal is compared with the equalizer output signal from the subtractor 104 before any rate reduction thereof.

More particularly, the best estimates of the transmitted I and Q signals from the quantizers 116 and 117 are each re-sampled to the oversampling rate used by the ADC 101 and the equalizer thereafter. This re-sampling of the best estimates of the transmitted I and Q signals is done by samplers 118 and 119, respectively, with the re-sampled best estimates of the transmitted I and Q signals being supplied as in-phase and quadrature-phase modulating signals to a modulator 120 that generates a quadrature-amplitude-modulation output signal. This QAM output signal from the quadrature-amplitude-modulation modulator 120 is supplied to an FIR digital bandpass filter 121, the bandpass response from which is constrained to a prescribed bandwidth with Nyquist slopes through a lower cut-off frequency and through an upper cut-off frequency. The response of the digital bandpass filter 121 is the best estimate of the transmitted QAM signal. The equalizer output signal from the subtractor 104 is delayed by shim delay 122 before being differentially compared with the best estimate of the transmitted QAM signal in an error detector 123 that generates the decision-feedback error signal.

The decision-feedback error signal is supplied to filter coefficient computation apparatus 124, which is substantially the same as that employed in prior-art baseband equalizers using adaptive filters adjusted in accordance with a decision-feedback method. The decision-feedback error signal, while developed by differentially comparing final I-F signals rather than baseband signals, is suited for applying equalization to final I-F signal. In order for the adaptive procedures to converge in a more stable manner, the designer may desire to defer the modification of filter coefficients in response to samples of the equalizer output signal including a current sample until the current sample no longer affects modification of filter coefficients appreciably. This delay can be introduced by delaying the decision-feedback error signal from the error detector 123, or the filter coefficient computation apparatus 124 may delay the application of calculated filter coefficients to the filter coefficients registers 105 and 106.

Figure 2:
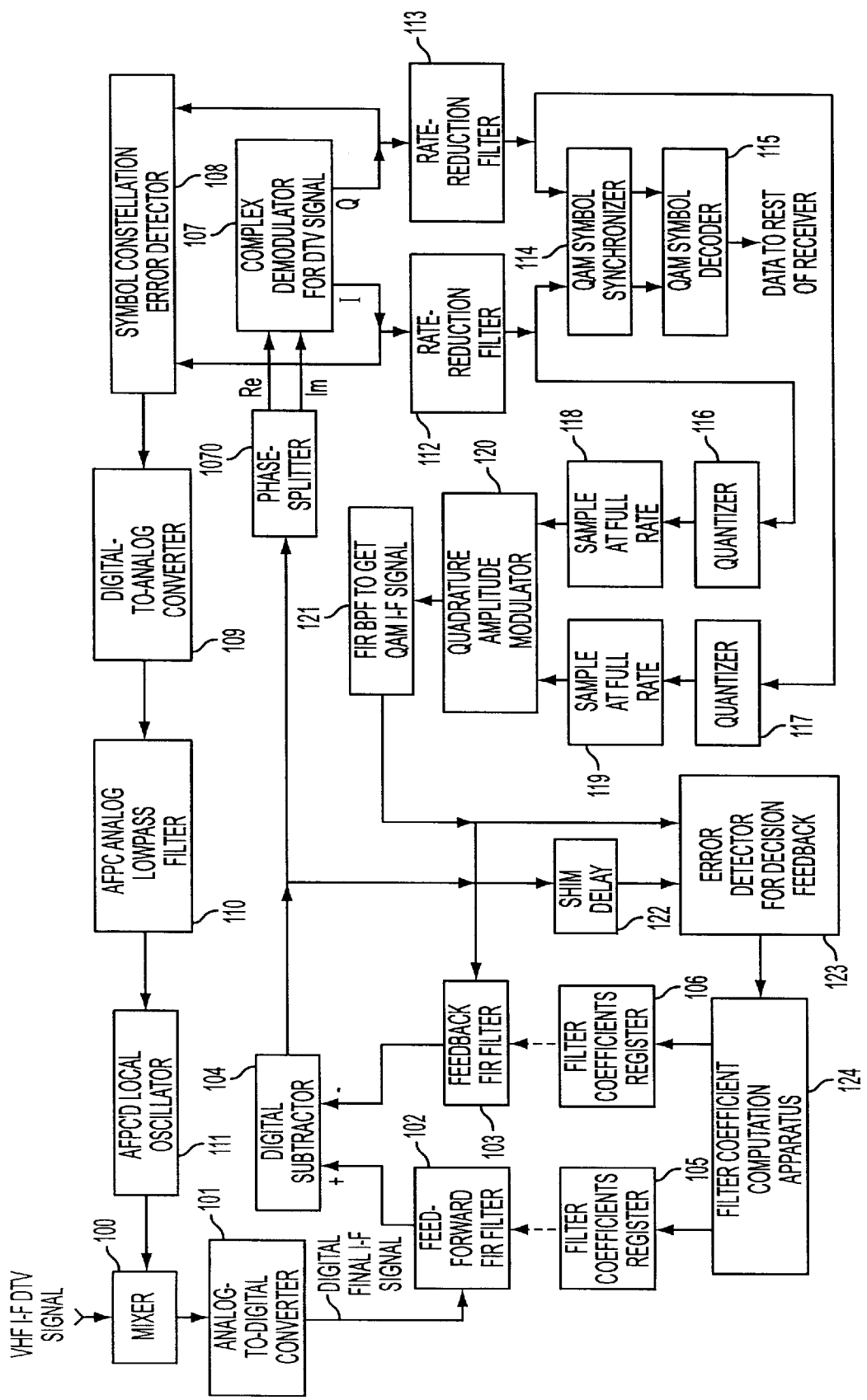
FIG. 2 is a block schematic diagram of a modification of the FIG. 1 circuitry for equalization of QAM final I-F signal, which modification provides another embodiment of the invention.

FIG. 2 shows a way for equalizing QAM final I-F signal that is an alternative to the way shown in FIG. 1. The response of the FIR digital bandpass filter 121 is applied to the feedback FIR digital filter 103 as its input signal, instead of the equalizer output signal supplied as difference output signal from the subtractor 104 being applied to the filter 103 as its input signal. This procedure reduces the noise in the input signal applied to the feedback FIR digital filter 103, which usually will help the weighting coefficients of the filters 102 and 103 in the equalizer converge more rapidly to desired values. The ability to eliminate short-delay post-ghosts with the feedback FIR digital filter 103 is sacrificed in some degree because of the increased latency in the IIR filter recursion path from subtractor 104 output port to filter 103 input port. However, if the feedforward filter FIR digital filter 102 is designed with a sufficient number of spaced taps to correct pre-ghosts a given number of microseconds earlier than the principal signal, the filter 102 will be capable of correcting post-ghosts that given number of microseconds later than the principal signal. If the latent delay through the IIR filter recursion path from subtractor 104 output port to filter 103 input port is less than this given number of microseconds, the sacrifice in ability to eliminate short-delay post-ghosts with the feedback FIR digital filter 103 is not of appreciable consequence to overall operation of the equalizer.

Figure 3:
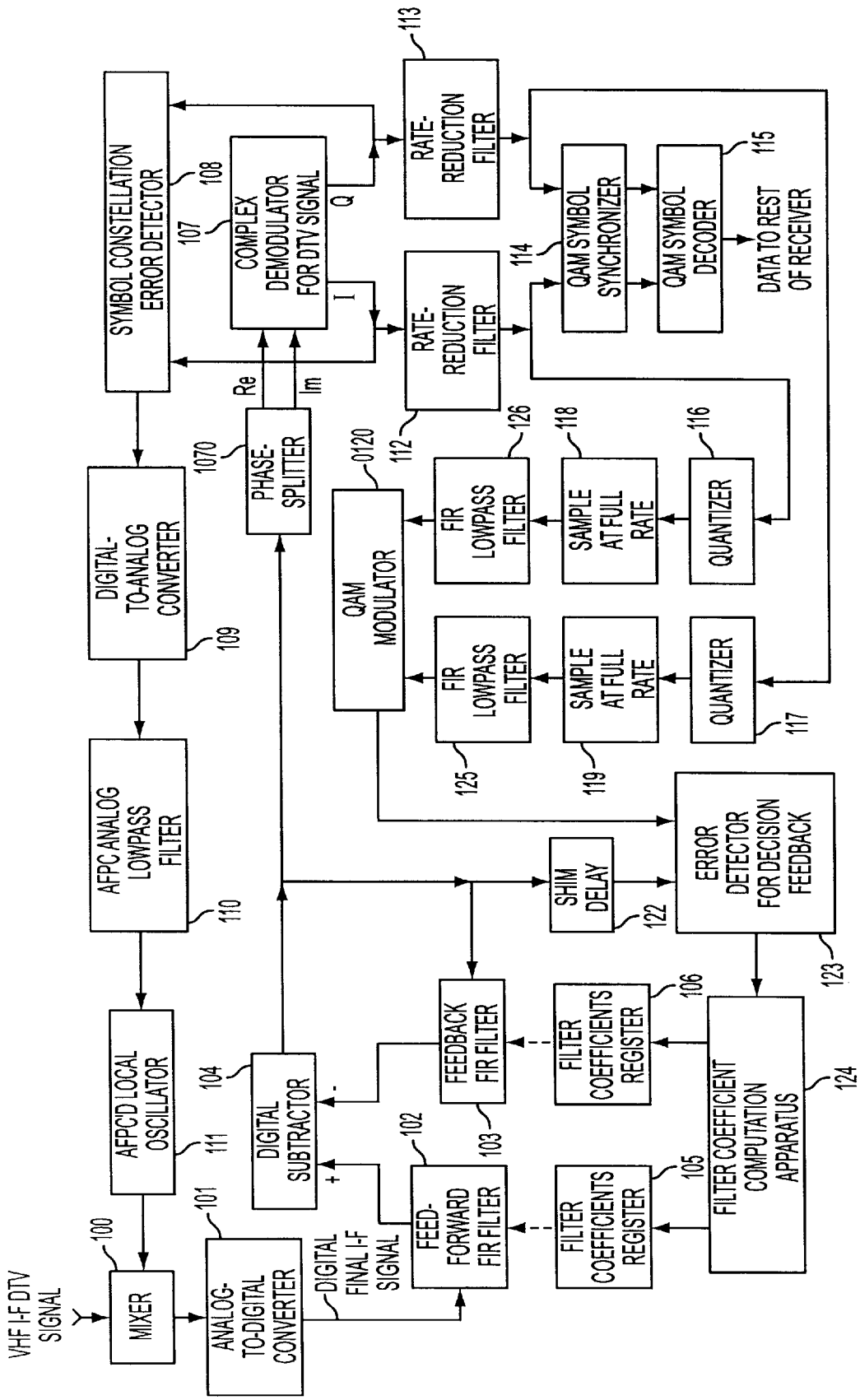
FIG. 3 is a block schematic diagrams of modified FIG. 1 circuitry that is a further embodiment of the invention.
Figure 4:
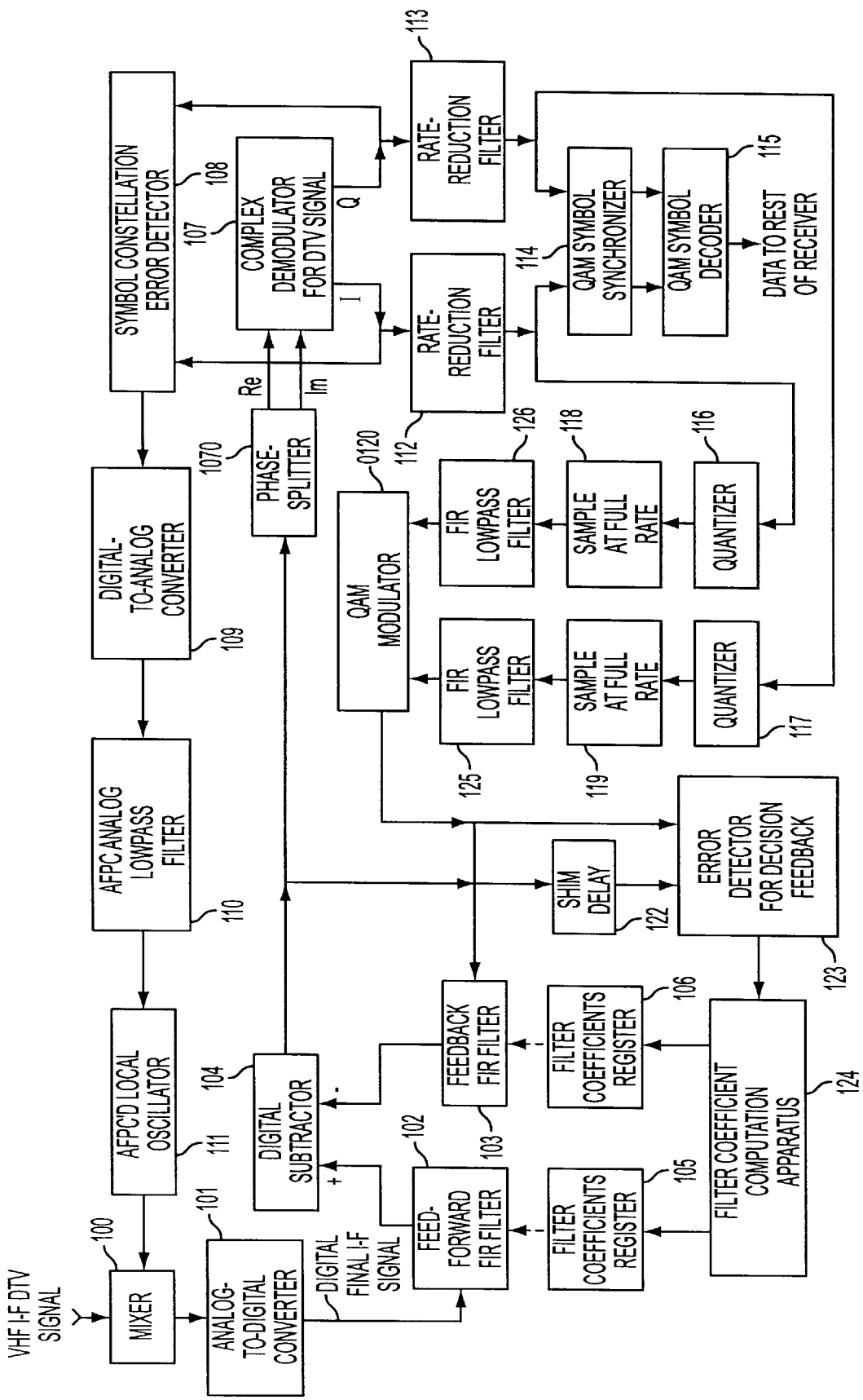
FIG. 4 is a block schematic diagrams of modified FIG. 2 circuitry that is a further embodiment of the invention.

FIGS. 3 and 4 respectively show modifications of the FIG. 1 and FIG. 2 circuitry for equalization of QAM intermediate-frequency signal. A QAM modulator 0120 shown in FIGS. 3 and 4 is generally similar to the QAM modulator 120 used in the circuitry of FIGS. 1 and 2 except for the input signals supplied thereto. In each of the FIG. 3 and FIG. 4 modifications, the bandpass filter 121 for defining the passband of the best estimate of the transmitted QAM signal is not used and is replaced by a direct connection of the QAM modulator 0120 output port to the element (s) it supplies with the best estimate of the transmitted QAM signal. The output signals from the samplers 118 and 119, which are applied directly to the QAM modulator 120 as in-phase and quadrature-phase modulating signals in the FIG. 1 circuitry, are lowpass filtered by finite-impulse-response lowpass digital filters 125 and 126 for providing the in-phase and quadrature-phase modulating signals applied to the QAM modulator 0120 in the FIG. 3 and FIG. 4 modifications.

The system functions of the digital filters 125 and 126 have Nyquist slopes that cut off at one-half the bandwidth that the best estimate of the transmitted QAM signal that the QAM modulator 0120 supplies is supposed to have. These FIR lowpass filters 125 and 126 have shorter latent delay than the corresponding FIR bandpass filter 121 that they replace, since their operation is implemented higher in the frequency spectrum than the highpass part of the bandpass filtering and does not require weighted summation of as long a succession of samples. So, using the FIR lowpass filters 125 and 126 instead of the FIR bandpass filter 121 is particularly advantageous if the best estimate of the transmitted QAM signal is applied to the feedback FIR filter 103 as input signal, since the delay available in the recursion path of the IIR filter incorporating the filter 103 can be reduced to a lower minimum value when desired for suppressing shorter-delay post-ghosts.

Figure 5:
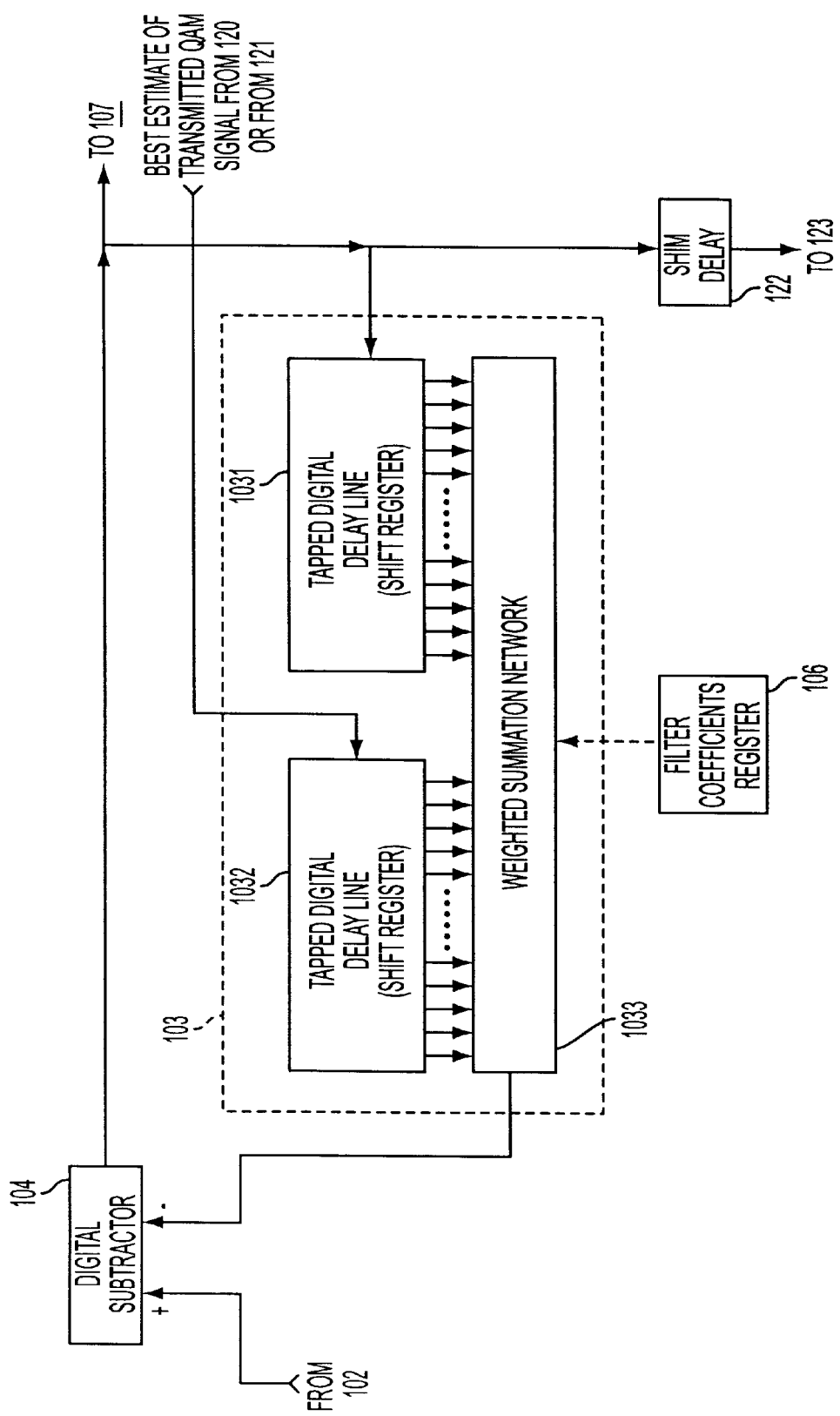
FIG. 5 is a block schematic diagram of a modification that is made to the circuitry for equalization of QAM final I-F signal in still further embodiments of the invention.

FIG. 5 shows how the feedback FIR digital filter 103 can be modified if the latent delay through the IIR filter recursion path from subtractor 104 output port to filter 103 input port requires post ghost-correction capability of the feed-forward FIR digital filter 102 in excess of the pre-ghost correction capability requirement. The digital filter 103 is usually constructed from a tapped digital delay line (i.e., shift register), which in FIG. 5 is split into two portions 1031 and 1032, and a weighted summation network 1033. The weighted summation network 1033 comprises a rank of digital multipliers for multiplying each of the tap signals from the tapped digital delay line by a respective weighting coefficient and a digital adder (e.g., a tree adder) for combining portion of the tapped the products from the digital multipliers. The digital multipliers can be realized using read-only memory to reduce latent delay through the filter 103. In the FIG. 1 or FIG. 3 circuitry the "later" tapped digital delay line or shift register 1032 would continue shifting signal from the final tap of the "earlier" tapped digital delay line or shift register 1031 receiving as its input signal the equalizer output signal from the subtractor 104 output port. In the FIG. 2 or FIG. 4 circuitry the "later" tapped digital delay line or shift register 1032 would also continue shifting signal from the final tap of the "earlier" tapped digital delay line or shift register receiving as its input signal the best estimate of the transmitted QAM signal from the bandpass filter 121 output port. In the FIG. 5 modification the "earlier" tapped digital delay line or shift register 1031 receives as its input signal the equalizer output signal without delay. The "later" tapped digital delay line or shift register 1032 receives as its input signal the best estimate of the transmitted QAM signal from the bandpass filter 121 output port, rather than the corresponding equalizer output signal that gave rise to that estimate. The FIG. 5 arrangement speeds up the convergence of the filtering coefficients for suppressing longer-delayed post-ghosts much as the FIG. 2 or FIG. 4 arrangements do.

Figure 6:
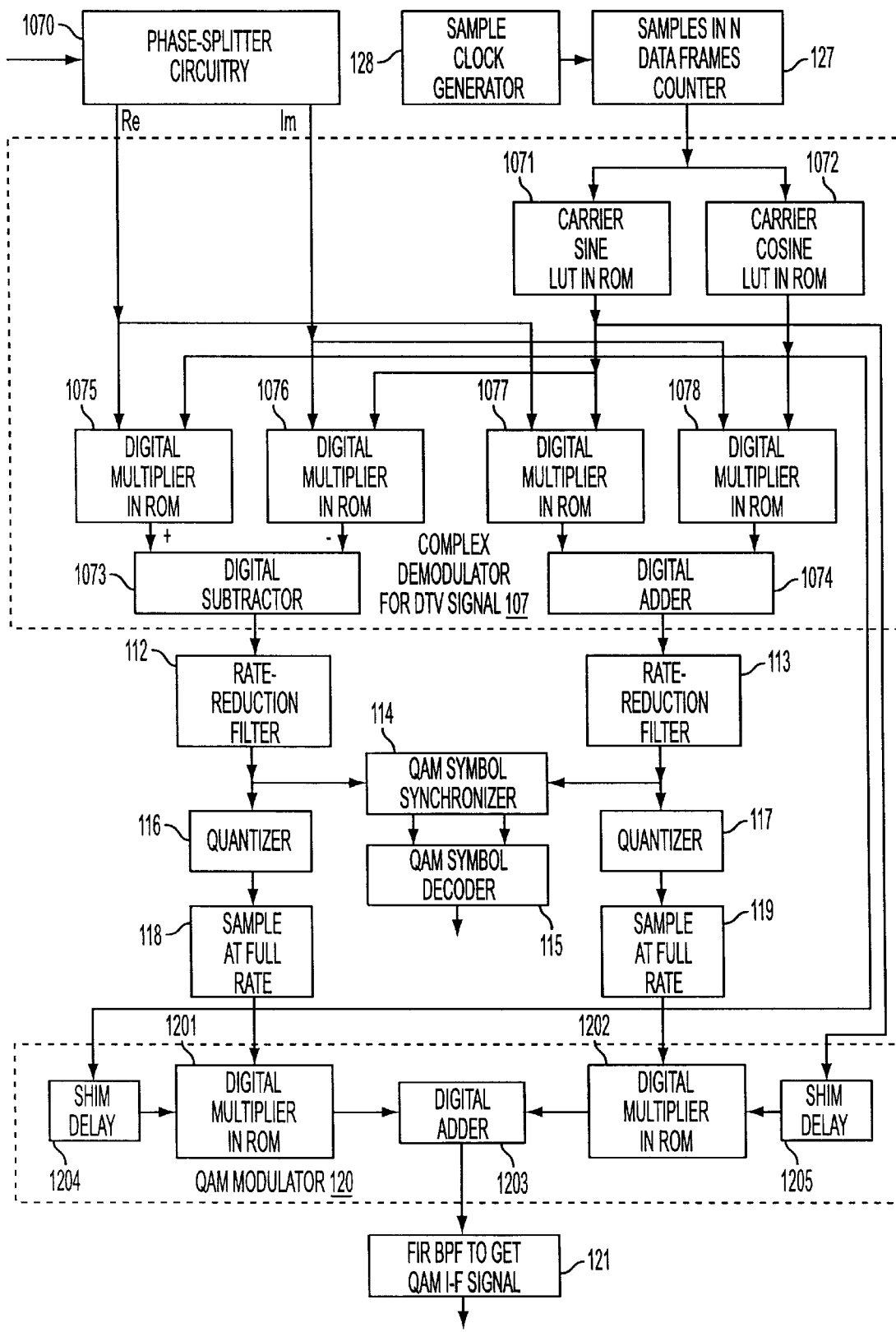
FIG. 6 is a block schematic diagram showing details of demodulator and modulator circuitry used in certain specific embodiments of the circuitry shown more generally in FIG. 1 and in FIG. 2.

FIG. 6 shows in more detail how the complex demodulator 107 and the QAM modulator 120 are constructed in specific embodiments of the FIG. 1 and FIG. 2 circuitry. The complex demodulator 107 includes a read-only memory 1071 storing a look-up table of sine values of the complex digital carrier and a read-only memory 1072 storing a look-up table of cosine values of the complex digital carrier. The ROMs 1071 and 1072 receive, as their input addressing, the less significant bits of the sample count of a counter 127 that counts the number of samples in a number N of sample frames. This counting of samples is done responsive to sample clock signals supplied from a sample clock generator 128, which sample clock signals are supplied at a sample rate that generally is in prescribed ratio greater than 1:1 to the QAM symbol rate. The locking of the sample rate to QAM symbol rate is done by conventional methods. For example, a spectral component at half symbol rate frequency is separated by a narrow bandpass filter from the response of an envelope detector to VHF I-F signal, to be raised to an even power and used as reference signal against which to phase lock a master clock oscillator.

The complex demodulator 107 includes a full complex digital multiplier comprising a digital subtractor 1073, a digital adder 1074, and four component digital multipliers 1075, 1076, 1077 and 1078. The digital subtractor 1073 differentially combines the products from the multipliers 1075 and 1076 received as its minuend and subtrahend input signals to supply as its difference output signal the in-phase (I) demodulation result applied as input signal to the rate-reduction filter 112. The digital adder 1074 sums the products from the multipliers 1077 and 1078 received as its summand input signals to supply as its sum output signal the quadrature-phase (Q) demodulation result applied as input signal to the rate-reduction filter 113. The digital multiplier 1075 multiplies the real samples of equalized digital I-F signal from the phase-splitter circuitry 1070 by the cosine component of the complex digital carrier, as read from a look-up table of cosine values of the complex digital carrier stored in the ROM 1072, to generate as a product signal one component of the in-phase demodulation result. The digital multiplier 1076 multiplies the imaginary samples of equalized digital I-F signal from the phase-splitter circuitry 1070 by the sine component of the complex digital carrier, as read from a look-up table of sine values of the complex digital carrier stored in the ROM 1071, to generate as a product signal another component of the in-phase demodulation result. The digital multiplier 1077 multiplies the real samples of equalized digital I-F signal from the phase-splitter circuitry 1070 by the sine component of the complex digital carrier, as read from a look-up table of sine values of the complex digital carrier stored in the ROM 1071, to generate as a product signal one component of the quadrature-phase demodulation result. The digital multiplier 1078 multiplies the imaginary samples of equalized digital I-F signal from the phase-splitter circuitry 1070 by the cosine component of the complex digital carrier, as read from a look-up table of cosine values of the complex digital carrier stored in the ROM 1072, to generate as a product signal another component of the quadrature-phase demodulation result. Realizing the digital multipliers 1075, 1076, 1077 and 1078 in respective read-only memories facilitates the latent delay in the multipliers being kept to just one sample epoch.

FIG. 6 shows the QAM modulator 120 including two digital multipliers 1201 and 1202, a digital adder 1203, and shim delays 1204 and 1205. The digital multiplier 1201 receives as multiplicand input signal the best estimate of transmitted in-phase modulating signal from the sampler 118 and receives as multiplier input signal the cosine component of the complex digital carrier, as delayed by digital shim delay 1204 to compensate for the latent delay through elements 1075 and 1076, 1073, 112, 116 and 118. The digital multiplier 1202 receives as multiplicand input signal the best estimate of transmitted quadrature-phase modulating signal from the sampler 119 and receives as multiplier input signal the sine component of the complex digital carrier, as delayed by digital shim delay 1205 to compensate for the latent delay through elements 1077 and 1078, 1074, 113, 117 and 119. The product output signals from the multipliers 1200 and 1201 provide balanced digital modulation of in-phase and quadrature phase (suppressed) digital carrier by best estimates of transmitted in-phase modulating signal and by best estimates of transmitted in-phase modulating signal, respectively. The digital adder 1203 sums these two components of modulation received as first and second summand input signals to supply QAM output signal as its sum output signal.

Figure 7:
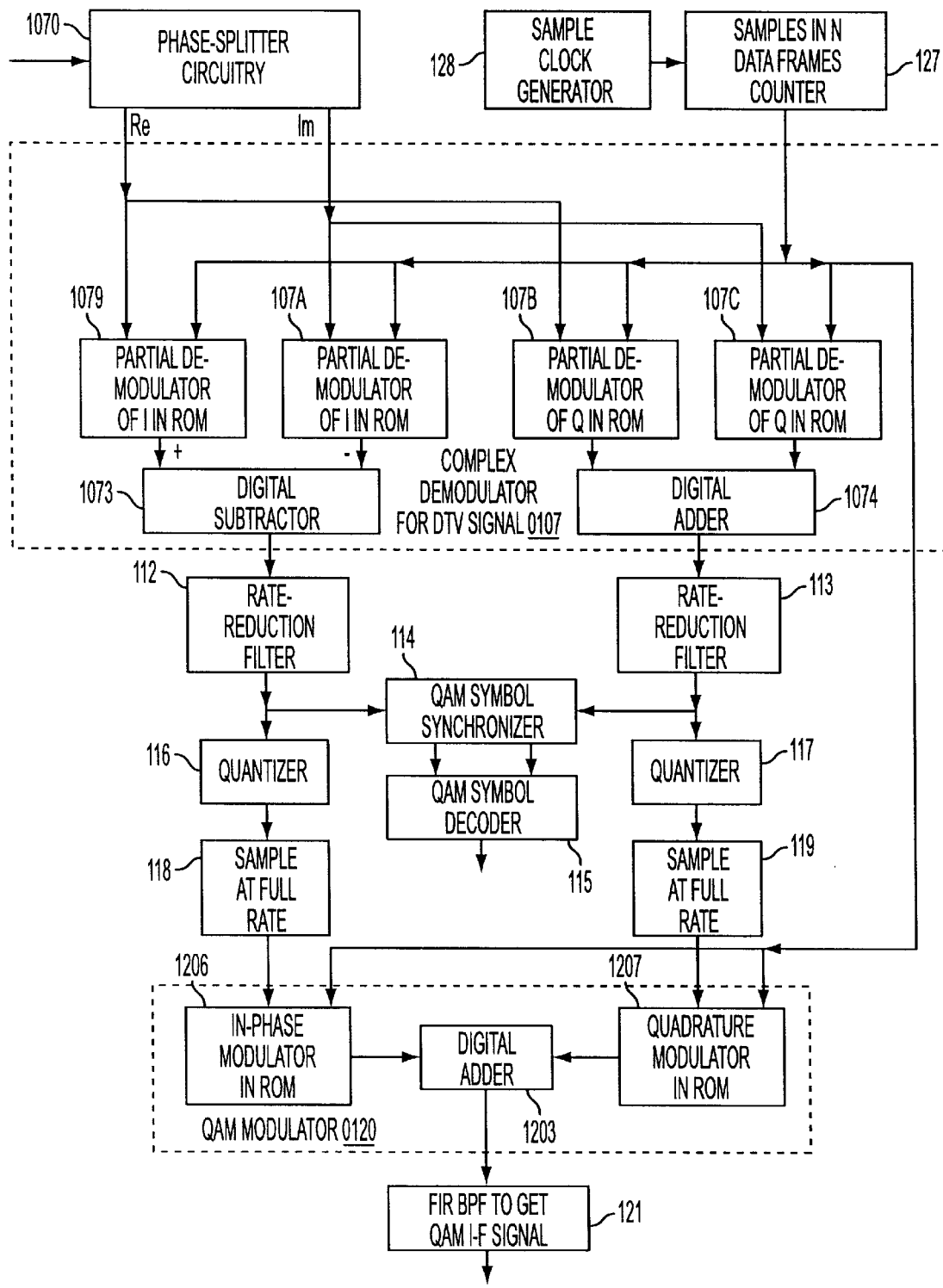
FIG. 7 is a block schematic diagram showing details of demodulator and modulator circuitry alternative to that of FIG. 6, used in certain specific embodiments of the circuitry shown more generally in FIG. 1 and in FIG. 2.

FIG. 7 shows how the complex demodulator 107 and the QAM modulator 120 are respectively replaced by a complex demodulator 0107 and a QAM modulator 00120 in other specific embodiments of the FIG. 1 and FIG. 2 circuitry. The complex demodulator 0107 consists of read-only memories 1079, 107A, 107B and 107C each partially addressed by the less significant bits of the sample count from the counter 127. Each of the ROMs 1079 and 107B receives the real samples from the phase-splitter circuitry 1070 as the rest of its input address. Each of the ROMs 107A and 107C receives the imaginary samples from the phase-splitter circuitry 1070 as the rest of its input address. The ROM 1079 stores a look-up table for performing the portion of the in-phase demodulation function carried out in FIG. 6 by the ROM digital multiplier 1075 and the ROM 1072 storing a look-up table of cosine values of the complex digital carrier. The ROM 107A stores a look-up table for performing the portion of the in-phase demodulation function carried out in FIG. 6 by the ROM digital multiplier 1076 and the ROM 1071 storing a look-up table of sine values of the complex digital carrier. The ROM 107B stores a look-up table for performing the portion of the quadrature-phase demodulation function carried out in FIG. 7 by the ROM digital multiplier 1077 and the ROM 1071 storing a look-up table of sine values of the complex digital carrier. The ROM 107C stores a look-up table for performing the portion of the quadrature-phase demodulation function carried out in FIG. 7 by the ROM digital multiplier 1078 and the ROM 1072 storing a look-up table of cosine values of the complex digital carrier.

Combining the look-up tables for a trigonometric function and for multiplication from separate ROMs to provide a combined look-up table in a single ROM avoids round-off error reading the trigonometric function ROM for addressing the multiplier ROM. Overall ROM size may be increased, however.

The QAM modulator 00120 in FIG. 7 differs from the QAM modulator 120 in that a read-only memory 1206 addressed by the best estimate of transmitted in-phase modulating signal and by the less significant bits of the sample count from the counter 127 replaces the digital multiplier 1201 and the shim delay 1204. The QAM modulator 00120 further differs from the QAM modulator 120 in that a read-only memory 1207 addressed by the best estimate of transmitted quadrature-phase modulating signal and by the less significant bits of the sample count from the counter 127 replaces the digital multiplier 1202 and the shim delay 1205. The digital adder 1203 sums the two components of modulation received from the ROMs 1206 and 1207 as first and second summand input signals to supply QAM output signal as its sum output signal.

Figure 8:
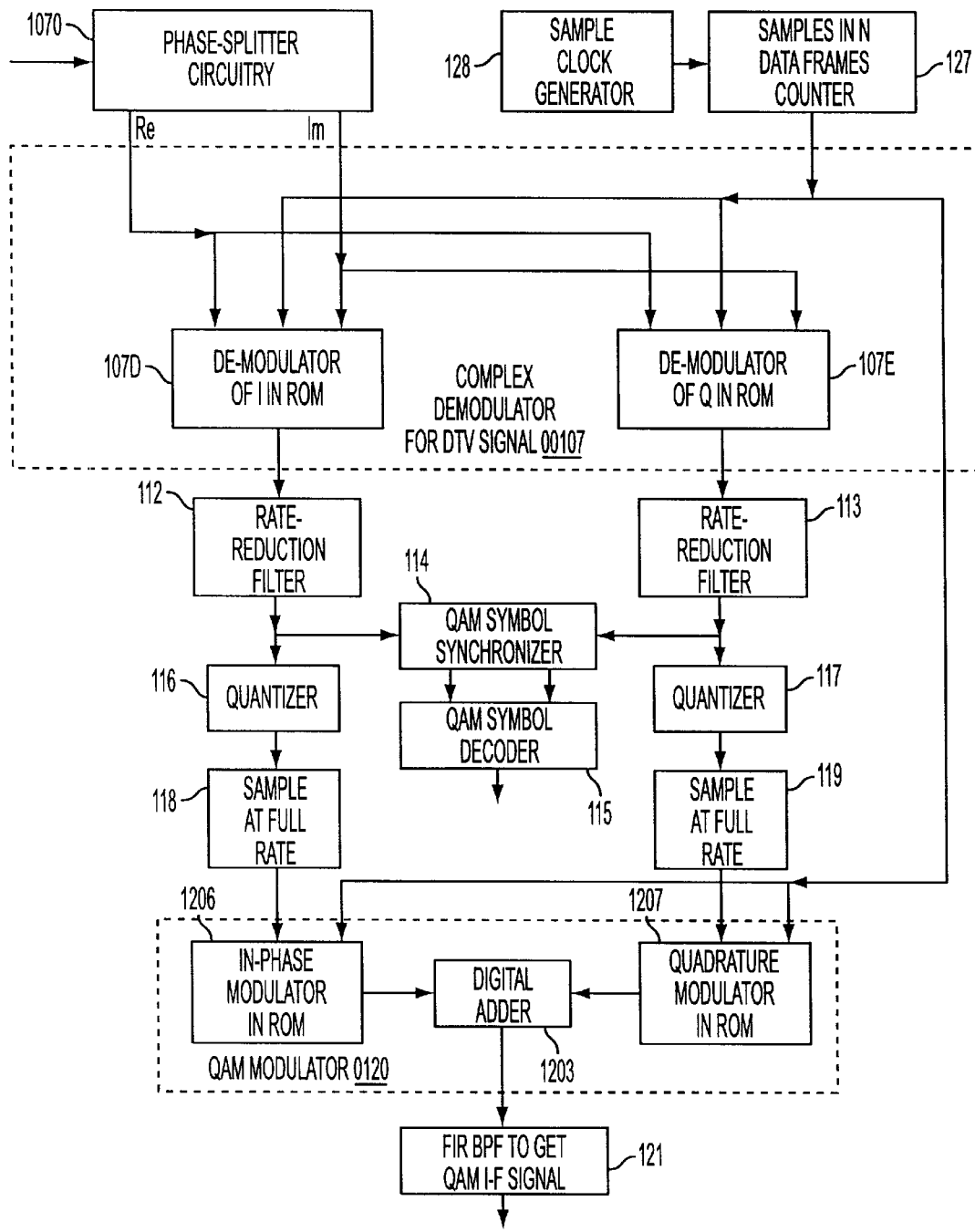
FIG. 8 is a block schematic diagram showing the FIG. 7 demodulator and modulator circuitry modified in regard to its demodulator circuitry, used in certain specific embodiments of the circuitry shown more generally in FIG. 1 and in FIG. 2.

FIG. 8 shows how the complex demodulator 107 and the QAM modulator 120 are respectively replaced by a complex demodulator 00107 and a QAM modulator 00120 in other specific embodiments of the FIG. 1 and FIG. 2 circuitry. FIG. 8 shows the complex demodulator 00120 to consist of a read-only memory 107D for performing the in-phase de-modulation of the complex final I-F signal and a read-only memory 107E for performing the quadrature-phase de-modulation of the complex final I-F signal. The ROM 107D supplies in-phase demodulation results and the ROM 107E supplies quadrature-phase demodulation results responsive to the same input addressing, so are equivalent to a single read-only memory storing both in-phase and quadrature-phase demodulation results for that input addressing. Each input address has as a partial input address component thereof the real complex final I-F signal from the phase-splitter 1070, the imaginary complex final I-F signal from the phase-splitter 1070, an d the less significant bits of the sample count from the counter 127.

Figure 9:
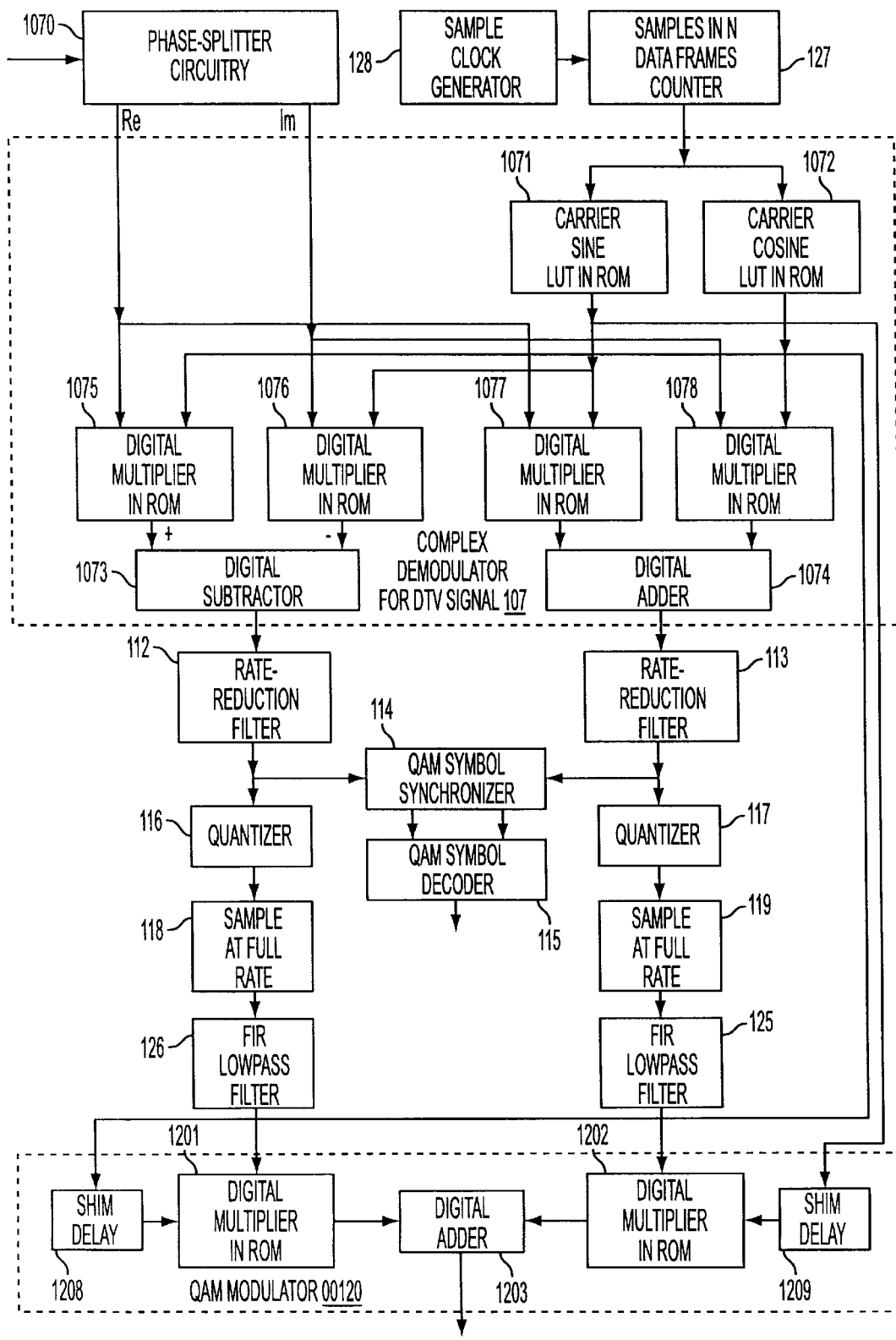
FIG. 9 is a block schematic diagram showing details of demodulator and modulator circuitry used in certain specific embodiments of the circuitry shown more generally in FIG. 3 and in FIG. 4.

FIG. 9 shows in more detail how the complex demodulator 107 and the QAM modulator 0120 are constructed in specific embodiments of the FIG. 3 and FIG. 4 circuitry. The QAM modulator 0120 is generally similar to the QAM modulator 120 of FIG. 6. However, the shim delays 1204 and 1205 are replaced by shim delays 1208 and 1209, respectively, which have longer latent delay. This longer latent delay compensates for the additional latent delay that the Nyquist-slope lowpass filters 125 and 126 respectively introduce into the in-phase and quadrature-phase modulating signals supplied to the QAM modulator 0120.

Figure 10:
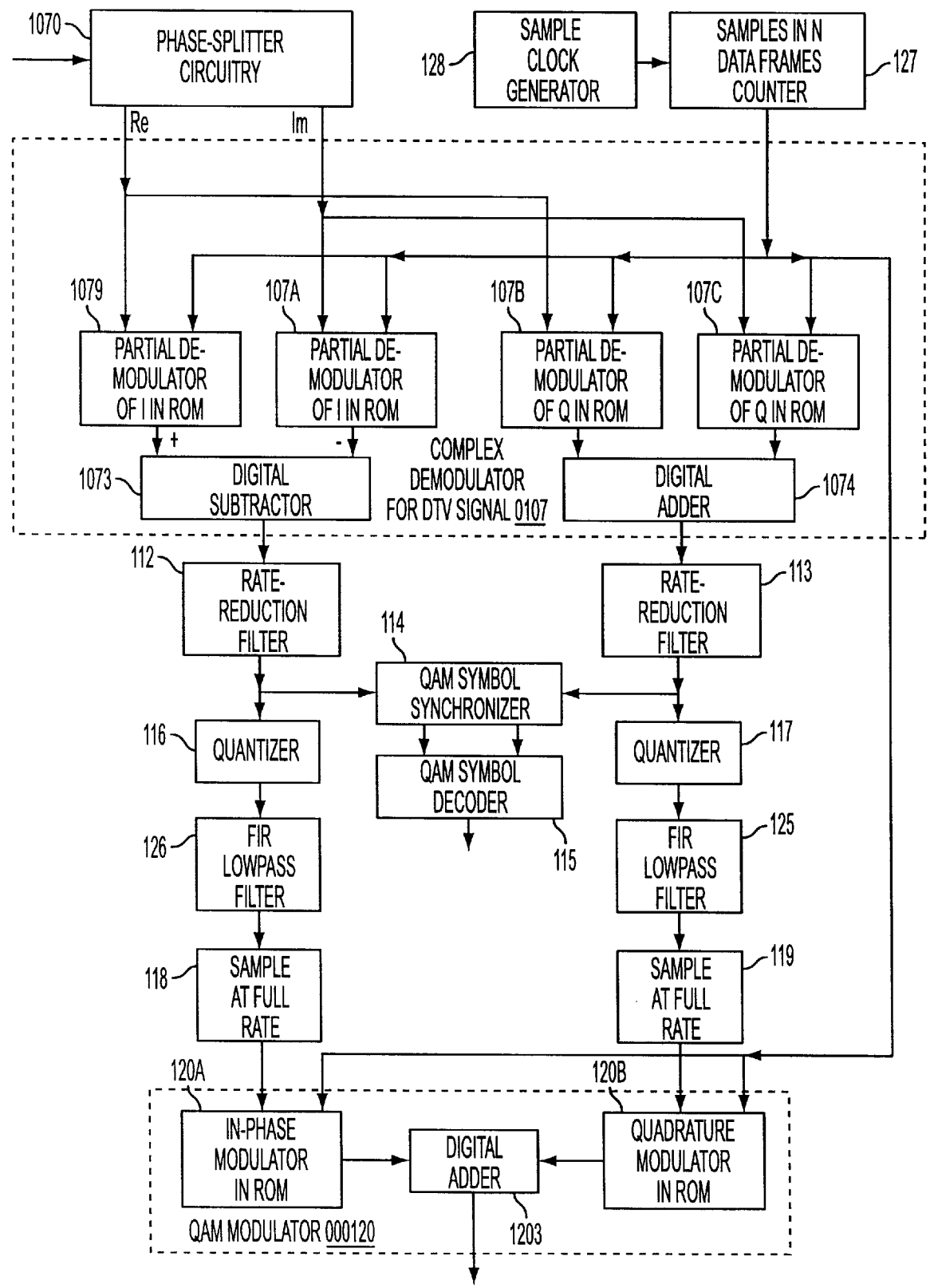
FIG. 10 is a block schematic diagram showing details of demodulator and modulator circuitry alternative to that of FIG. 9, used in certain specific embodiments of the circuitry shown more generally in FIG. 3 and in FIG. 4.

FIG. 10 shows how the complex demodulator 107 and the QAM modulator 0120 are respectively replaced by the complex demodulator 0107 and a QAM modulator 000120 in other specific embodiments of the FIG. 3 and FIG. 4 circuitry. The QAM modulator 000120 differs from the QAM modulator 0120 in that a read-only memory 120A addressed by the best estimate of transmitted in-phase modulating signal and by the less significant bits of the sample count from the counter 127 replaces the digital multiplier 1201 and the shim delay 1208. The QAM modulator 000120 further differs from the QAM modulator 0120 in that a read-only memory 120B addressed by the best estimate of transmitted quadrature-phase modulating signal and by the less significant bits of the sample count from the counter 127 replaces the digital multiplier 1202 and the shim delay 1209. The digital adder 1203 sums the two components of modulation received from the ROMs 120A and 120B as first and second summand input signals to supply QAM output signal as its sum output signal.

Figure 11:
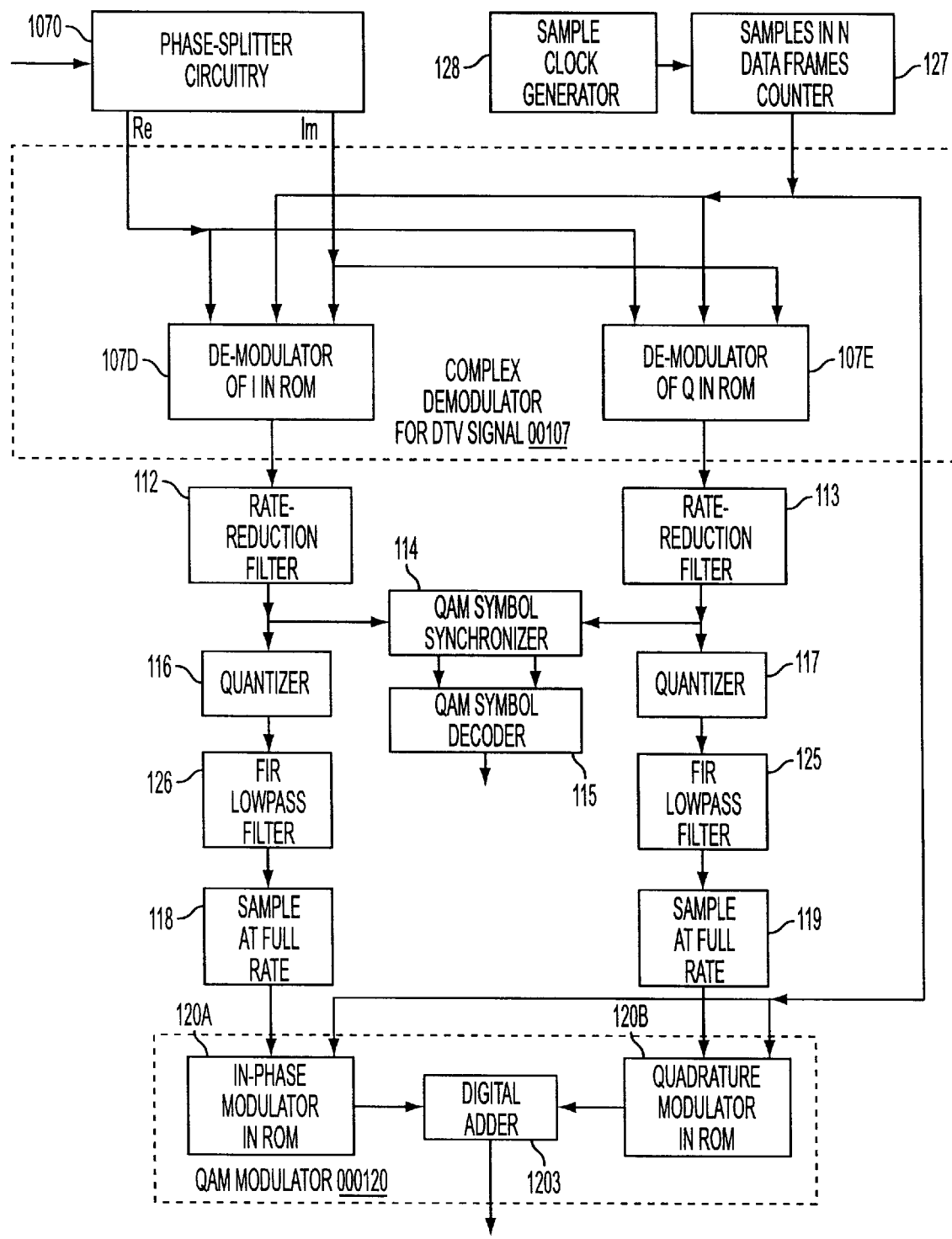
FIG. 11 is a block schematic diagram showing the FIG. 10 demodulator and modulator circuitry modified in regard to its demodulator circuitry, used in certain specific embodiments of the circuitry shown more generally in FIG. 3 and in FIG. 4.

FIG. 11 shows how the complex demodulator 107 and the QAM modulator 0120 are respectively replaced by the complex demodulator 00107 and the QAM modulator 000120 in other specific embodiments of the FIG. 3 and FIG. 4 circuitry.

Figure 12:
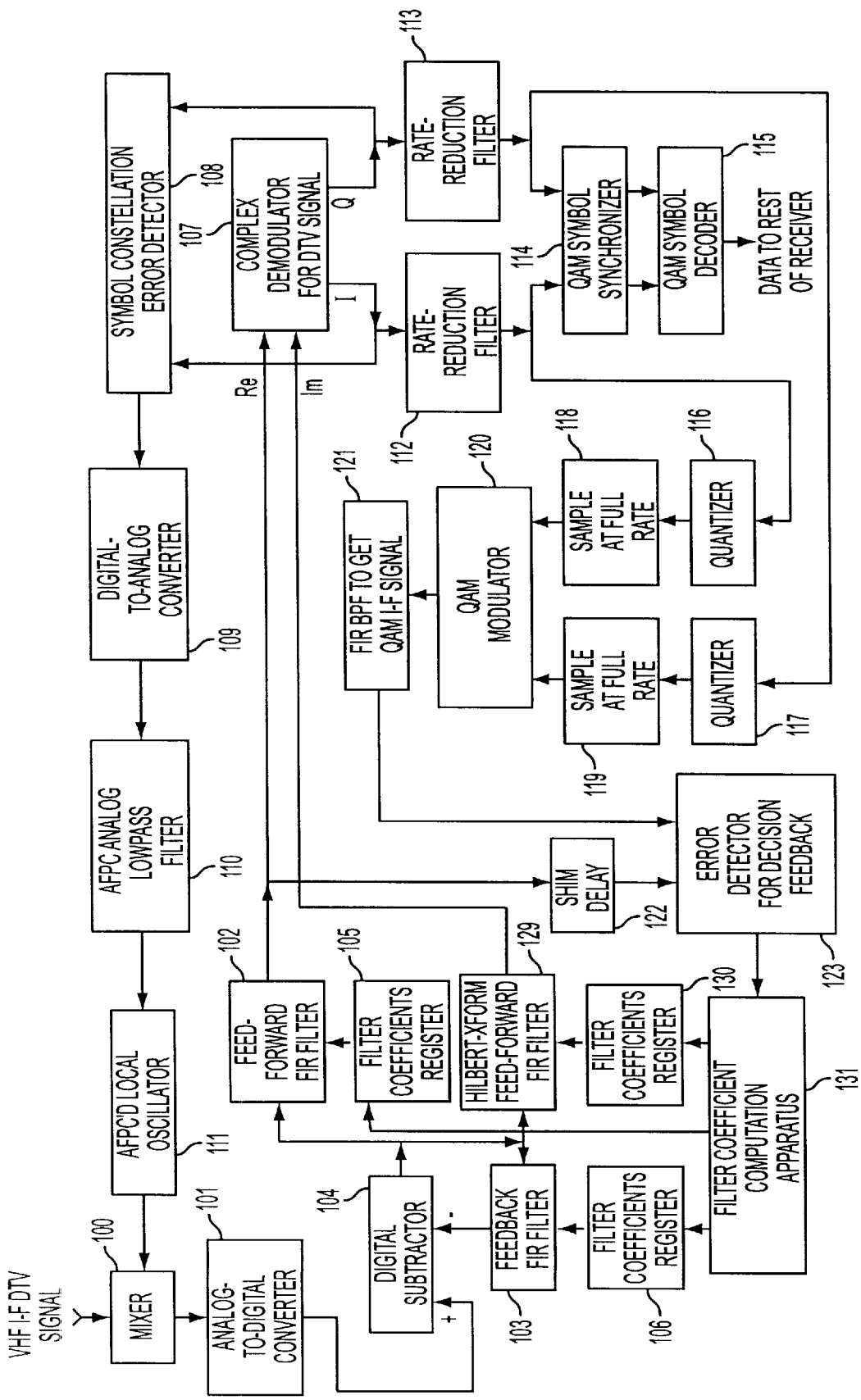
FIG. 12 is a block schematic diagram of a modification of the FIG. 1 circuitry to provide yet another embodiment of the invention, in which the order in which component IIR and FIR digital filters are cascaded in the equalizer is reversed, facilitating the Hilbert transform filter being subsumed in the FIR digital filtering.
Figure 13:
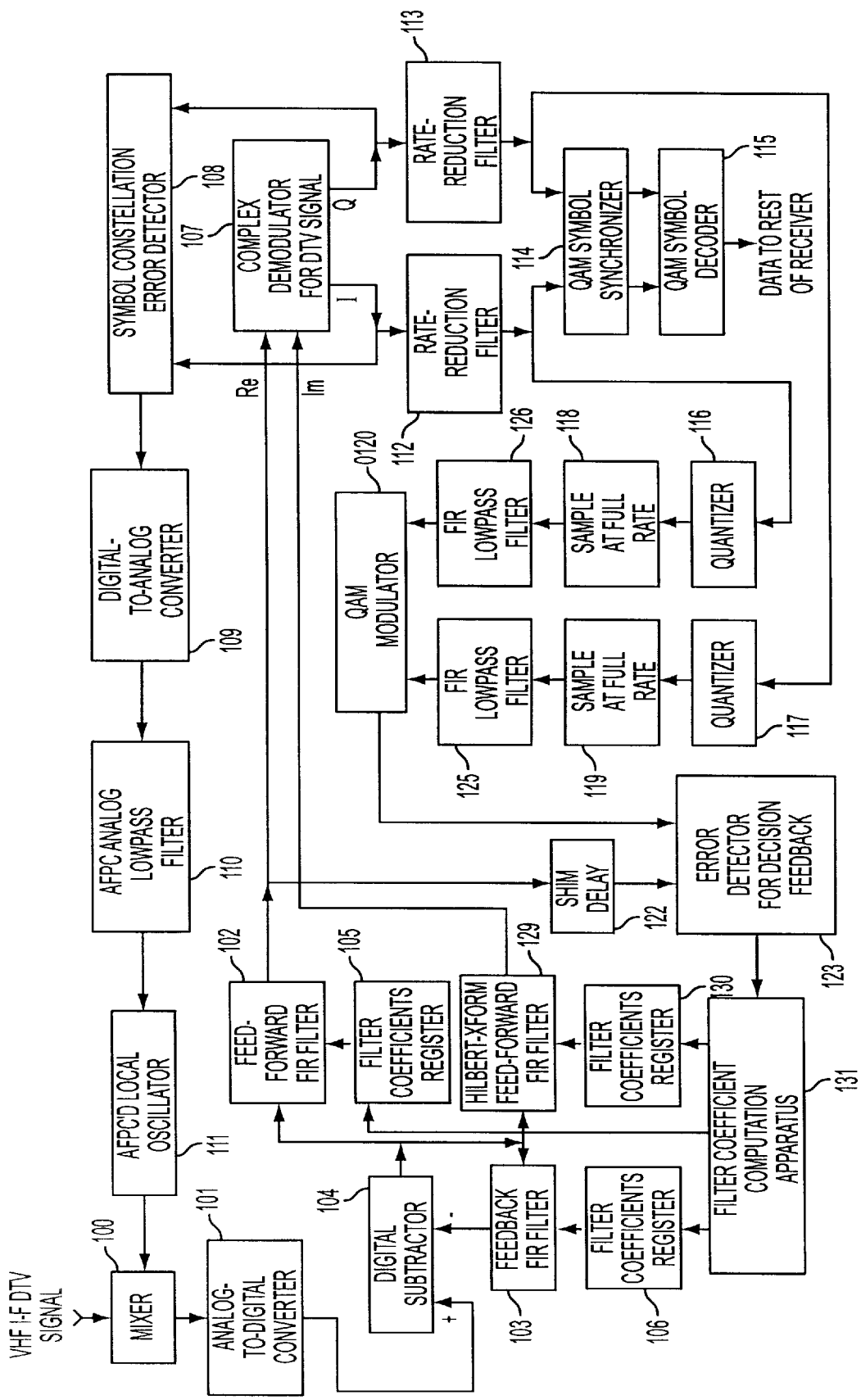
FIG. 13 is a block schematic diagram of a modification of the FIG. 3 circuitry to provide yet another embodiment of the invention, in which the order in which component IIR and FIR digital filters are cascaded in the equalizer is reversed, facilitating the Hilbert transform filter being subsumed in the FIR digital filtering.

FIGS. 12 and 13 respectively show modifications of the FIG. 1 and FIG. 3 circuitry for equalization of QAM intermediate-frequency signal. These modifications include reversing the order of cascading the feed-forward FIR digital filter 102 with the IIR filter comprising the subtractor 104 and the feedback FIR digital filter 103. This reversal of order facilitates the feed-forward FIR digital filter 102 supplying real samples of equalized digital final I-F signal to the complex demodulator 107 responsive to the subtractor 104 difference output signal, with a Hilbert-transform feedforward FIR filter 129 supplying imaginary samples of equalized digital final I-F signal to the complex demodulator 107 responsive to the subtractor 104 difference output signal. The Hilbert-transform feedforward FIR filter 129 is an adaptive FIR digital filter including a tapped digital delay line for supplying tap signals that variously delay its respective input signal, digital multipliers for multiplying the tap signals by weighting coefficients supplied from a filter coefficients register 130, and a digital adder for summing the products from the digital multipliers to generate the filter 129 response. Filter coefficient computation apparatus 131 replaces the filter coefficient computation apparatus 124, performing the functions of the apparatus 124 and additionally calculating the weighting coefficients of the adaptive Hilbert-transform feedforward FIR digital filter 129 for entry into the filter coefficients register 130. More particularly, the apparatus 131 convolves the kernel of the feed-forward FIR digital filter 102 described by the coefficients in the filter coefficients register 105 with the kernel of a hypothetical Hilbert transform filter to generate the kernel of the adaptive FIR digital filter 129. The coefficients of the kernel of the adaptive FIR digital filter 129 are entered into the filter coefficients register 130 in a block at the same the coefficients of the kernel of the feed-forward FIR digital filter 102 are entered into the filter coefficients register 105.

The adaptive Hilbert-transform feedforward FIR digital filter 129 is used in the FIGS. 12 and 13 circuitry to eliminate the phase-splitter 1070 used in the FIG. 3 and FIG. 4 circuitry, thereby to keep the delay in the AFPC loop for the local oscillator 111 as small as possible. In alternative modification of the FIG. 3 or FIG. 4 circuitry, the order of cascading of the feed-forward FIR digital filter 102 and the IIR filter comprising the subtractor 104 and the feedback FIR digital filter 103 is reversed, but the phase-splitter 1070 is retained. The input port of the phase-splitter 1070 is connected differently, being connected from the output port of the feed-forward FIR digital filter 102 to receive its response as the input signal to be phase-split. The Hilbert-transform feedforward FIR digital filter 129 and associated filter coefficients register 130 are not used in these alternative modifications of the FIG. 3 and FIG. 4 circuitry, since the phase-splitter 1070 provides the complex samples for demodulation by the complex demodulator 107.

Figure 14:
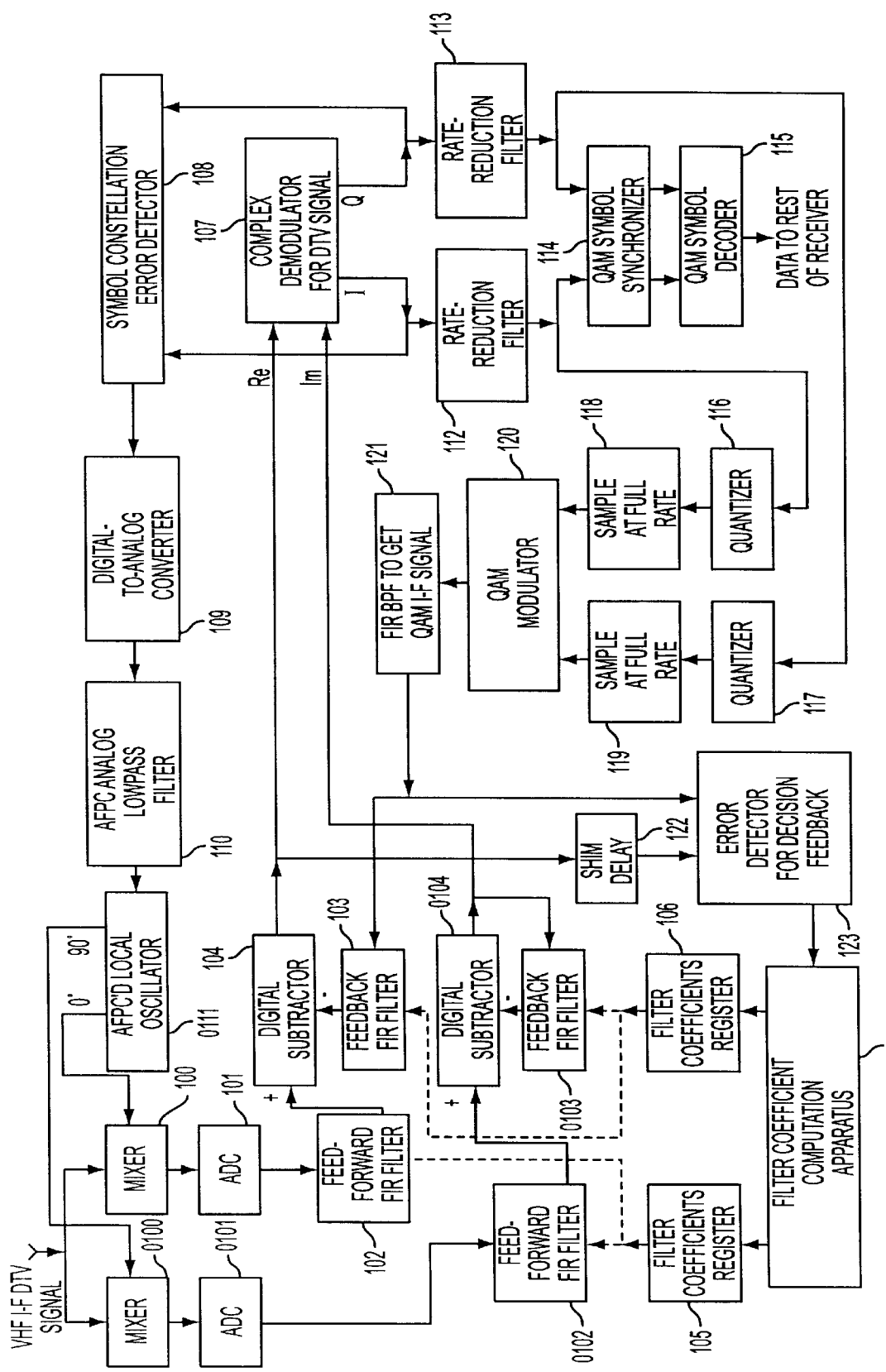
FIG. 14 is a block schematic diagram of a modification of the FIG. 2 circuitry, which modification uses a complex mixer before the equalizer for QAM final I-F signal to avoid the need for a phase-splitter before the complex demodulator.
Figure 15:
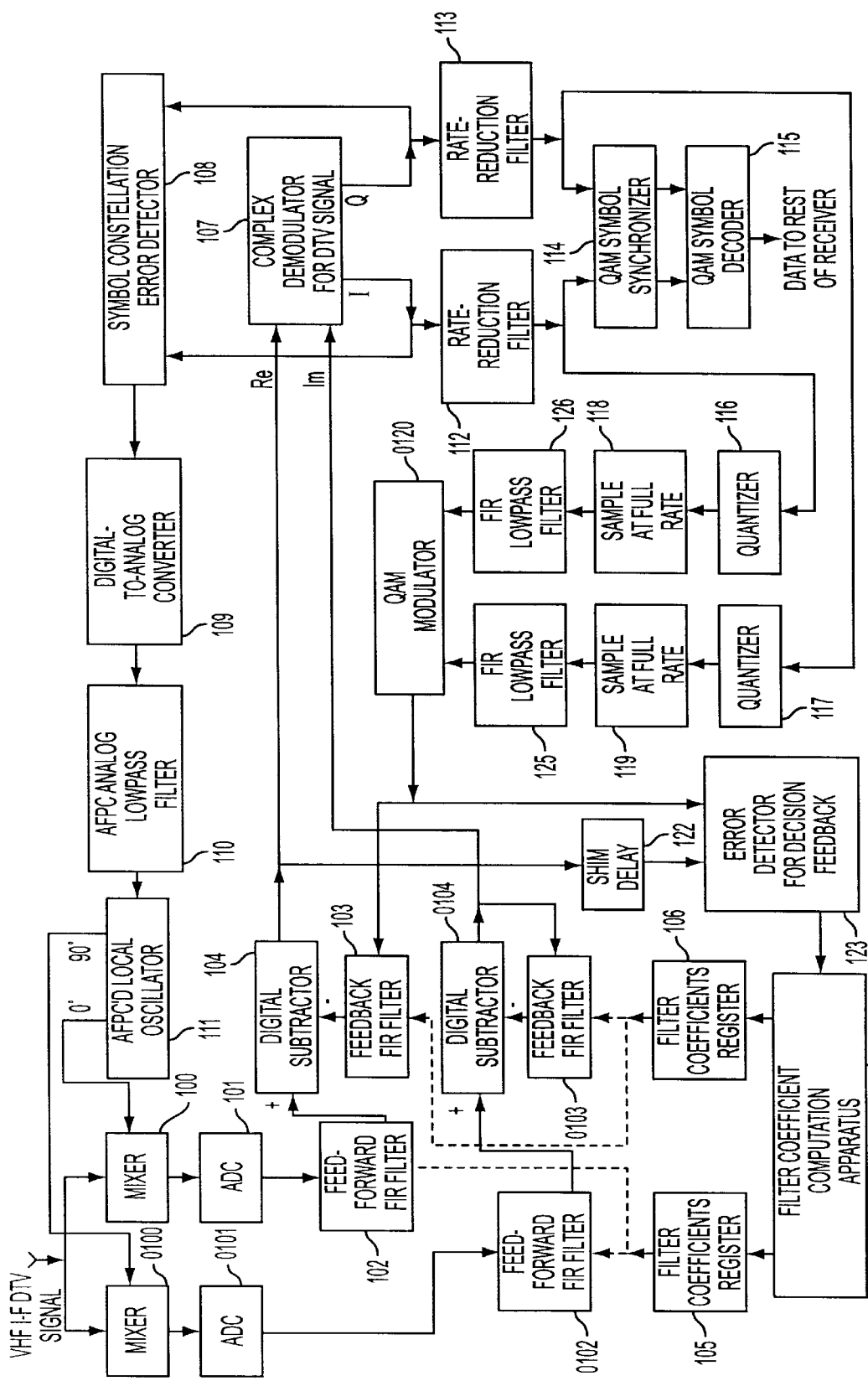
FIG. 15 is a block schematic diagram of a modification of the FIG. 4 circuitry modification, which modification uses a complex mixer before the equalizer for QAM final I-F signal to avoid the need for a phase-splitter before the complex demodulator.

FIGS. 14 and 15 respectively show modifications of the FIG. 2 and FIG. 4 circuitry for equalization of QAM intermediate-frequency signal which eliminate the phase-splitter 1070. Eliminating the phase-splitter 1070 reduces the latent delay in the IIR filter recursion path from subtractor 104 output port to filter 103 input port, so this filter can cancel multipath reception exhibiting shorter differential delay. Since the differential delay of multipaths that the feedforward FIR filter is called upon to suppress is shorter, the number of taps in the feedforward FIR filter can be reduced.

The local oscillator 111 of FIGS. 2 and 4 is replaced in FIGS. 14 and 15 by a local oscillator 0111 supplying quadrature-phase (90°) oscillations as well as supplying in-phase (0°) oscillations. The mixer 100 and a mixer 0100 are components of a complex mixer. The mixer 100 mixes the QAM final I-F signal with the in-phase oscillations to generate a stream of real samples of the QAM final I-F signal for digitization by the analog-to-digital converter 101. The mixer 0100 mixes the QAM final I-F signal with the quadrature-phase oscillations to generate a stream of imaginary samples of the QAM final I-F signal for digitization by an analog-to-digital converter 0101. The equalizer for the stream of real digital samples of the QAM final I-F signal from the analog-to-digital converter 101 comprises the feed-forward FIR digital filter 102, the feedback finite-impulse-response digital filter 103, the digital subtractor 104, the filter coefficients register 105, and the filter coefficients register 106 as previously described with regard to the FIG. 1 circuitry. The difference output signal from the subtractor 104 is the output signal of the equalizer for the stream of real digital samples, which stream of real digital samples of equalized QAM final I-F signal is supplied to the demodulator 107 instead of the delayed stream of real digital samples of equalized QAM final I-F signal that the phase-splitter 1070 supplies in the FIG. 1 and FIG. 3 circuitry.

The FIG. 14 circuitry and the FIG. 15 circuitry each include a further equalizer for the stream of imaginary digital samples of the QAM final I-F signal from the analog-to-digital converter 0101. This further equalizer shares the filter coefficients registers 105 and 106 with the equalizer for the stream of real digital samples of the QAM final I-F signal from the analog-to-digital converter 101. In addition to the filter coefficients registers 105 and 106, the further equalizer comprises a feed-forward FIR digital filter 0102 for the stream of imaginary digital samples of the QAM final I-F signal from the analog-to-digital converter 0101, a feedback FIR digital filter 0103, and a digital subtractor 0104 for differentially combining the responses of the filters 0102 and 0103 to generate a difference output signal applied to the feedback FIR filter 0103 as its input signal. The feed-forward FIR digital filters 102 and 0102 are similar in their construction and have similar filter coefficients applied to them from the filter coefficients register 105. The feedback FIR digital filters 103 and 0103 are similar in their construction and have similar filter coefficients applied to them from the filter coefficients register 106. The difference output signal from the subtractor 104 is a stream of imaginary digital samples of equalized QAM final I-F signal, which stream of imaginary digital samples of equalized QAM final I-F signal is supplied to the demodulator 107 instead of the stream of imaginary digital samples of equalized QAM final I-F signal that the phase-splitter 1070 supplies in the FIG. 2 and FIG. 4 circuitry.

Figure 16:
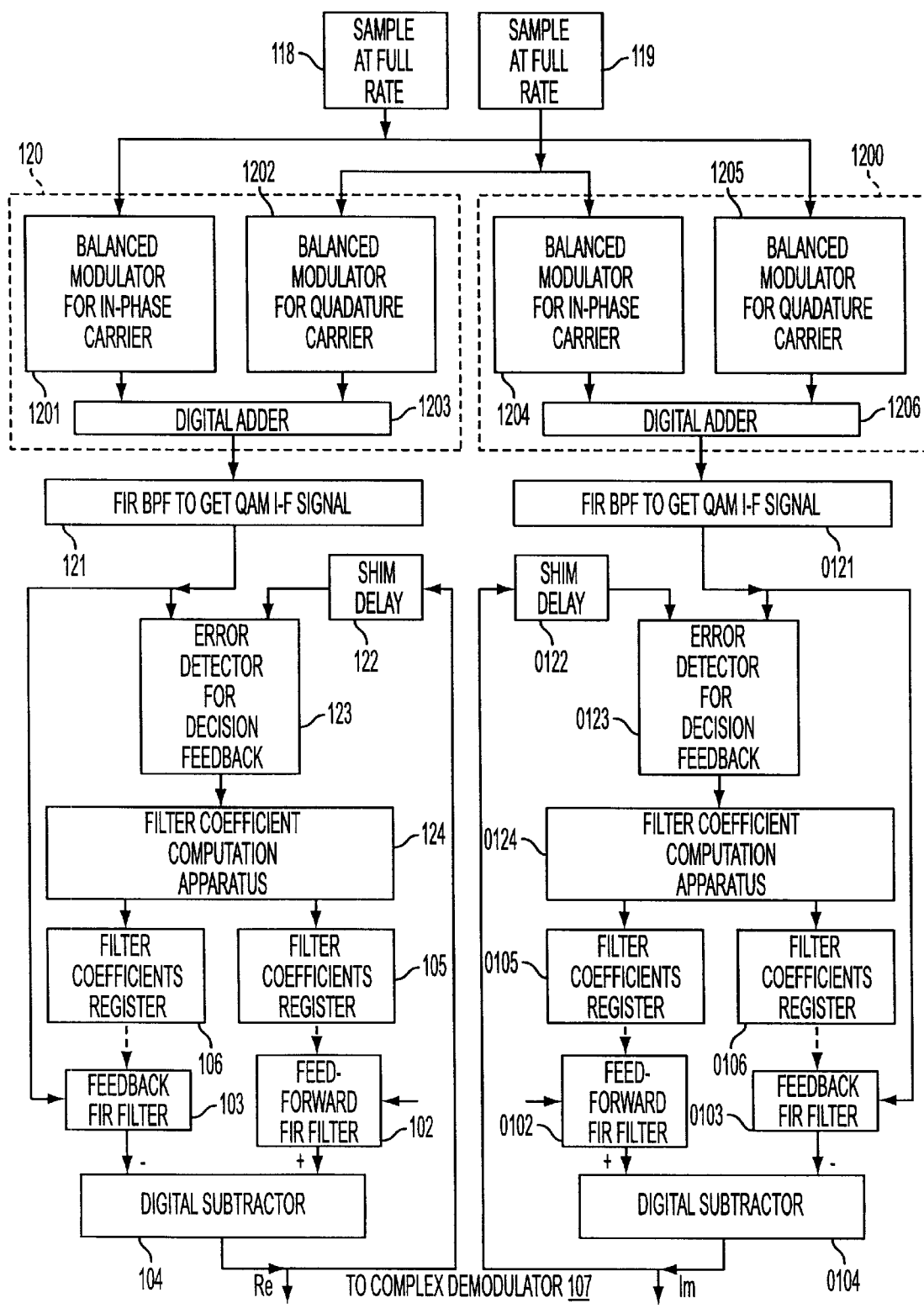
FIG. 16 is a block schematic diagram of a further modification of the FIG. 2 circuitry as modified in accordance with FIG. 14, which further modification operates the equalizer as a complex equalizer for QAM final I-F signal.
Figure 17:
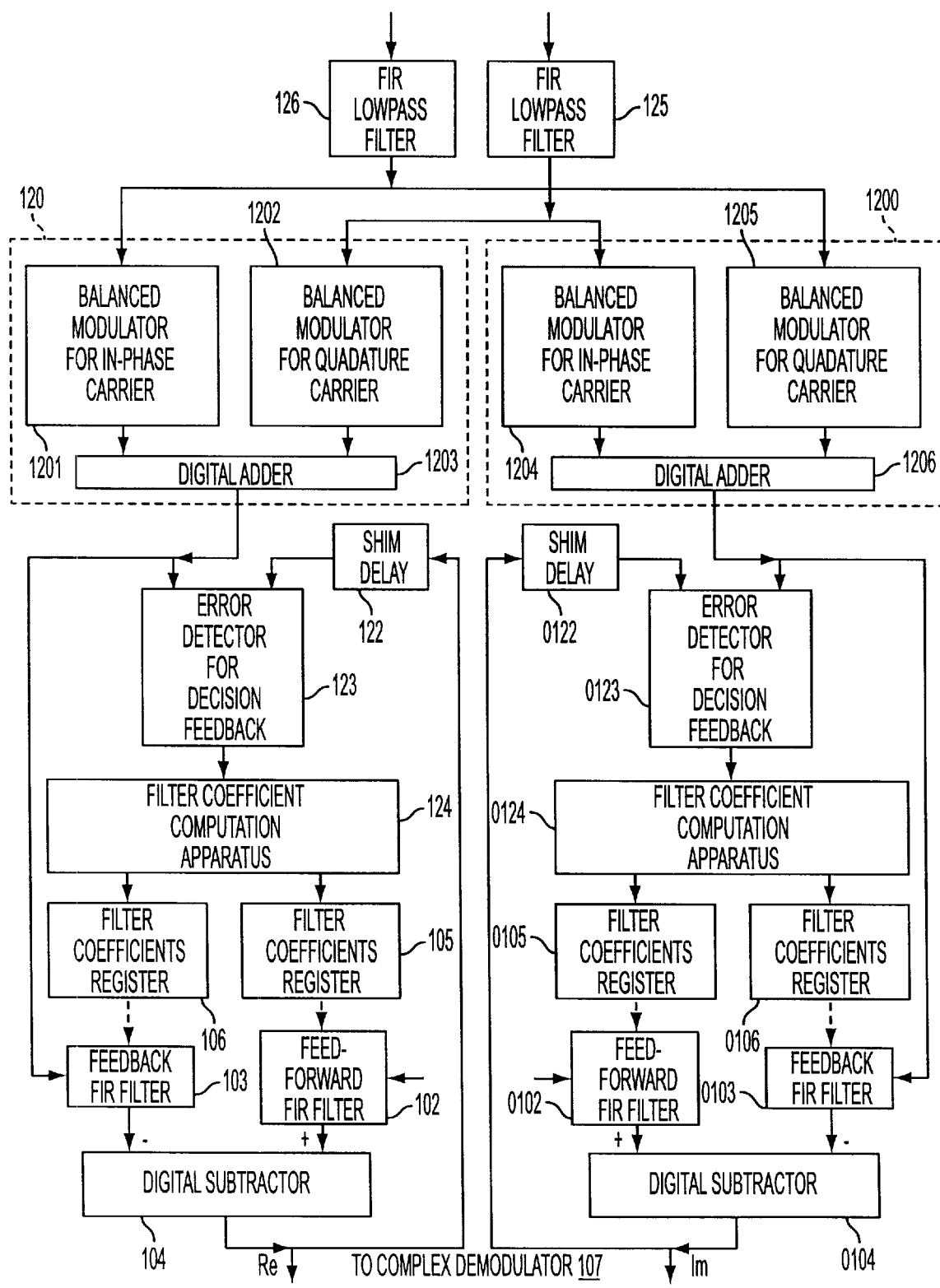
FIG. 17 is a block schematic diagram of a further modification of the FIG. 4 circuitry as modified in accordance with FIG. 15, which further modification operates the equalizer as a complex equalizer for QAM final I-F signal.

FIGS. 16 and 17 show modifications made to the circuitry of FIG. 14 and to the circuitry of FIG. 15 in order to achieve true complex equalization. The further equalizers for imaginary QAM final I-F signal in FIGS. 14 and 15 are presumed to be similar to the equalizers for real QAM final I-F signal, which presumption should be quite good if there is substantial oversampling of the QAM final I-F signal. However, true complex equalization is desirable if the QAM final I-F signal is not oversampled at least 2:1 over Nyquist rate. Complex equalization requires that the filter coefficients for the feed-forward FIR filter 0102 and the feedback FIR filter 0103 be computed independently from the filter coefficients for the feed-forward FIR filter 102 and the feedback FIR filter 103. In FIGS. 16 and 17 the independently computed filter coefficients for the filters 0102 and 0103 are stored in filter coefficients registers 0105 and 0106, respectively, rather than in registers 105 and 106.

FIG. 16 shows modifications that are introduced into the circuitry of FIG. 14 to provide for complex equalization. These modifications include incorporation of a further QAM modulator 1200 and a further FIR digital bandpass filter 0121 for supplying a bandpass response to the modulator 1200 output signal. The QAM modulator 1200 employs a suppressed carrier in quadrature with the suppressed carrier employed by the QAM modulator 0120. The FIR digital bandpass filters 121 and 0121 have identical structures and identical system characteristics. The difference signal from the digital subtractor 0104 is delayed by digital shim delay 0122 for comparison with the filter 0121 response in a further error detector 0123. The error detector 0123 generates the decision feedback signal from which the filter coefficients for the feed-forward FIR filter 0102 and the feedback FIR filter 0103 are computed by filter coefficient computation apparatus 0124 for insertion into the registers 0105 and 0106, respectively. The filter coefficient computation apparatus 0124 is similar to the filter coefficient computation apparatus 124 in structure and operation. Indeed, the two apparatuses can be realized within the same microcomputer operated on a time-division-multiplex basis.

FIG. 16 shows the QAM modulator 0120 to include the balanced amplitude modulator 1206 for modulating the in-phase (0°) digital carrier with the sampler 118 response, the balanced amplitude modulator 1207 for modulating the quadrature-phase (90°) digital carrier with the sampler 119 response, and the digital adder 1203. The digital adder 1203 sums the output signals of the balanced amplitude modulators 1206 and 1207 to generate the output signal that the QAM modulator 0120 supplies as input signals to the feedback filter 103 and to the error detector 123. FIG. 16 shows the QAM modulator 1200 to include a balanced amplitude modulator 120C for modulating the quadrature-phase (90°) digital carrier with the sampler 118 response, a balanced amplitude modulator 120D for modulating the in-phase (0°) digital carrier with the sampler 119 response, and a digital subtractor 120E. The subtractor 120E subtracts the output signal of the balanced amplitude modulator 120D from the output signal of the balanced amplitude modulator 120C to generate the output signal that the QAM modulator 1200 supplies as input signals to the feedback filter 0103 and to the error detector 0123.

FIG. 17 shows modifications that are introduced into the circuitry of FIG. 15 to provide for complex equalization, including the incorporation of a further QAM modulator 01200 that employs a suppressed carrier in quadrature with the suppressed carrier employed by the QAM modulator 000120. Limiting the bandwidth of the output signal from the further QAM modulator 1200 in modified FIG. 14 circuitry requires the bandpass filter 0121 besides the bandpass filter 121 used for limiting the bandwidth of the QAM modulator 0120 output signal. The circuitry of FIG. 15 is preferable for modification to provide for complex equalization since the lowpass FIR filters 125 and 126 can be used both for limiting the bandwidth of the QAM modulator 000120 output signal and for limiting the bandwidth of the QAM modulator 01200 output signal.

FIG. 17 shows the QAM modulator 000120 to include the balanced amplitude modulator 120A for modulating the in-phase (0°) digital carrier with the FIR lowpass filter 125 response, the balanced amplitude modulator 120B for modulating the quadrature-phase (90°) digital carrier with the FIR lowpass filter 126 response, and the digital adder 1203. The digital adder 1203 sums the output signals of the balanced amplitude modulators 120A and 120B to generate the output signal that the QAM modulator 01200 supplies as input signals to the feedback filter 103 and to the error detector 123. FIG. 17 shows the QAM modulator 01200 to include a balanced amplitude modulator 120F for modulating the quadrature-phase (90°) digital carrier with the FIR lowpass filter 125 response, a balanced amplitude modulator 1210 for modulating the in-phase (0°) digital carrier with the FIR lowpass filter 126 response, and the digital subtractor 120E. The subtractor 120E subtracts the output signal of the balanced amplitude modulator 1210 from the output signal of the balanced amplitude modulator 120F to generate the output signal that the QAM modulator 01200 supplies as input signals to the feedback filter 0103 and to the error detector 0123.

The equalization filters of FIGS. 16 and 17 are modified in further embodiments of the invention so that the feedback FIR digital filters 103 and 0103 receive, as their respective input signals, the difference output signals of the digital subtractors 104 and 0104, rather than the responses of the bandpass digital filters 121 and 0121. The order in which the FIR and IIR sections of each of the modified equalization filters are connected in cascade is reversed in equivalents of these further embodiments of the invention.

One skilled in the art will understand that the shim delay 122 has somewhat different delay in the various circuitry shown in FIGS. 1–4 and 12–17.

Figure 18:
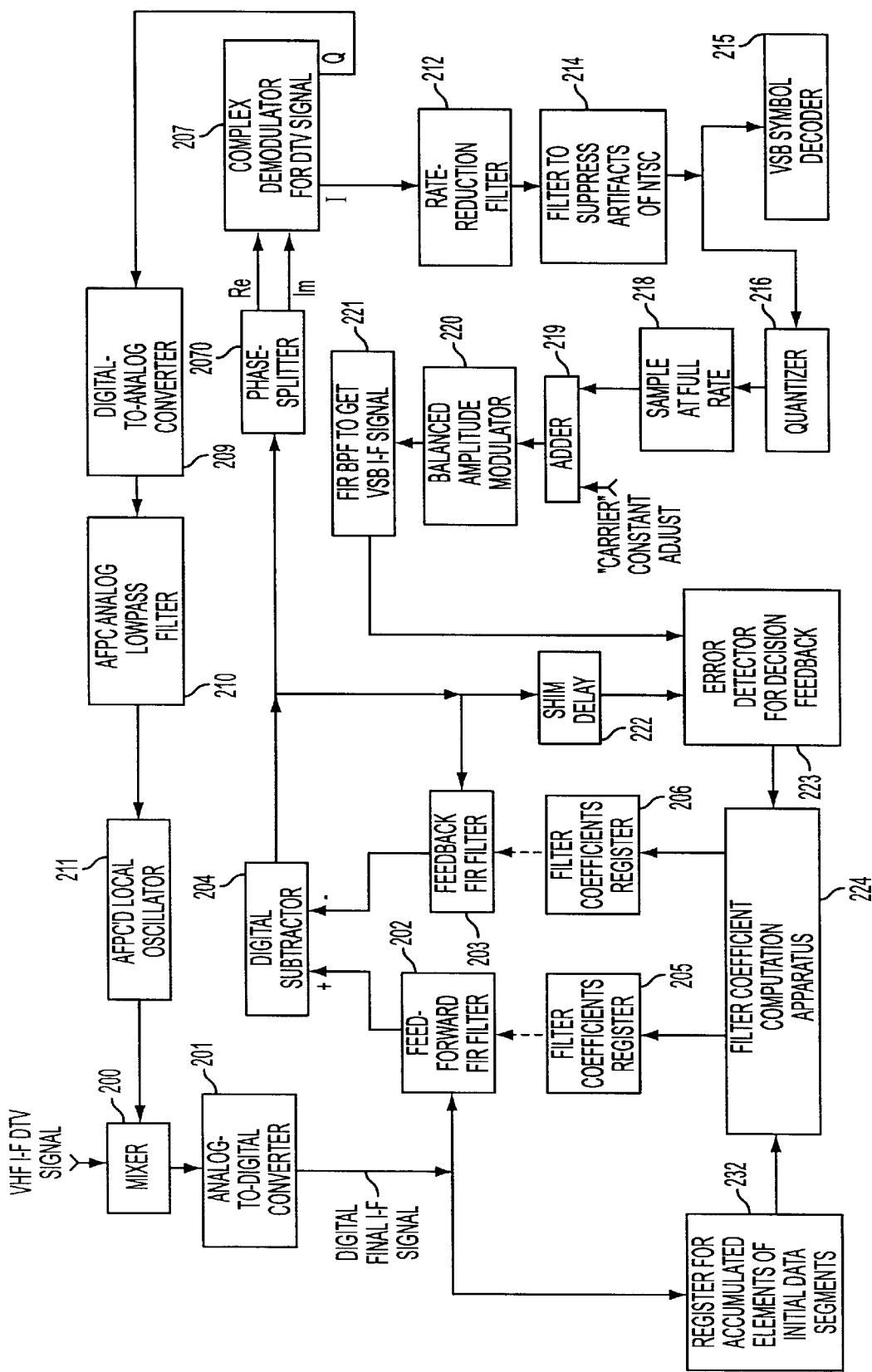
FIG. 18 is a block schematic diagram of circuitry for equalization of VSB final I-F signal, which circuitry is an embodiment of the invention.

The FIG. 18 circuitry for equalizing VSB signal receives a VHF intermediate-frequency VSB signal as a first input signal for a mixer 200. The mixer 200 is used for down-converting the frequencies of the VSB signal to a final intermediate-frequency signal in a frequency band offset in its entirety from zero frequency by no more than a few megahertz. By way of specific example, a VSB signal having a symbol rate of $10.76*10^6$ symbols per second and occupying a bandwidth of 6 MHz can be down-converted in frequency to place its carrier at 7.17 MHz in the final intermediate-frequency signal. The lowest lower-frequency sideband in the final I-F signal will be at 1.48 kHz, so Hilbert transform filtering of the digitized final I-F signal is practical.

The final intermediate-frequency signal is digitized by an analog-to-digital converter 201. The digitized final intermediate-frequency signal is viewed as being the input signal of the equalizer for the VSB signal as converted to final intermediate-frequency band. Within the equalizer the digitized final I-F signal is applied as input signal to a feed-forward finite-impulse-response digital filter 202. The output signal from the feed-forward FIR digital filter 202 and the output signal from a feedback finite-impulse-response digital filter 203 are applied as minuend and subtrahend input signals, respectively, of a digital subtractor 204. The FIR digital filter 202 is an adaptive filter including a tapped digital delay line for supplying tap signals that variously delay its respective input signal, digital multipliers for multiplying the tap signals by weighting coefficients supplied from a filter coefficients register 205, and a digital adder for summing the products from the digital multipliers to generate the filter 202 response. The FIR digital filter 203 is an adaptive filter including a tapped digital delay line for supplying tap signals that variously delay its respective input signal, digital multipliers for multiplying the tap signals by weighting coefficients supplied from a filter coefficients register 206, and a digital adder for summing the products from the digital multipliers to generate the filter 203 response. The difference output signal from the subtractor 204 is viewed as being the output signal of the equalizer for the VSB final I-F signal. In FIG. 18 this output signal of the equalizer is directly applied to the feedback FIR digital filter 203 as the input signal thereof.

The equalized VSB final I-F signal that the subtractor 204 supplies as difference output signal is applied as input signal to a phase-splitter 2070, which responds to supply a stream of imaginary samples of equalized VSB final I-F signal and to supply a stream of real samples of equalized VSB final I-F signal with similar latent delay. These streams of samples are applied as complex input signal to a complex demodulator 207 that synchrodynes the equalized VSB final I-F signal to baseband in the digital regime. The complex demodulator 207 supplies an in-phase (I) synchronous detection result and a quadrature phase (Q) synchronous detection result as real and imaginary components of demodulated VSB signal. The lower frequency portions of the Q signal provide an error signal responsive to misphasing of the one-dimensional VSB symbol constellation. The Q signal is supplied to a digital-to-analog converter 209 for conversion to an analog signal applied as input signal to a lowpass filter 210. The lowpass response from the filter 210 is applied to a local oscillator 211 as an automatic frequency and phase control signal. Controlled oscillations from the oscillator 211 are supplied as second input signal to the mixer 200 for heterodyning with the VHF I-F signal supplied as first input signal to the mixer 200 to generate the final I-F signal supplied to the ADC 201.

The AFPC loop is operative to adjust the frequency and phase of the local oscillator 211 and consequently of the final I-F signal such that the I signal from the complex demodulator 207 corresponds to the real component of the baseband VSB symbol code as originally transmitted. The I signal from the complex demodulator 207 is supplied to a rate-reduction filter 212, which supplies I signal with sample rate reduced to symbol rate. The real component of the baseband VSB symbol code as reproduced from the I signal is supplied to a VSB symbol decoder 215, which is a trellis decoder of Viterbi type, for example.

The derivation of the error signal used in the decision-feedback loop will be considered next. The I signal from the rate-reduction filter 212 is supplied to a quantizer 216, which quantizer provides noise-free estimates of the real components of the baseband VSB symbol code as originally transmitted. The I signal from the rate-reduction filter 212 can be applied directly to the quantizer 216 as its input signal, which will be preferred when NTSC analog television broadcasting is no longer done. FIG. 18 shows the I signal from the rate-reduction filter 212 being applied as input signal to a filter 214 for suppressing NTSC artifacts in its response applied as input signal to the quantizer 216, which connection is preferred so long as NTSC analog television broadcasting is done.

A sampler 218 re-samples these best estimates of the transmitted I signal from the quantizer 216, the re-sampled being to the oversampling rate used by the ADC 201 and the equalizer thereafter. FIG. 18 shows the best estimates of the transmitted I signal as re-sampled by the sampler 218 being applied as one of the two summand input signals to a digital adder 219, the sum output signal of which is supplied as an in-phase modulating signals to a balanced amplitude-modulator 220. The other of the two summands supplied to the adder 219 is a digital level. The balanced amplitude-modulator can comprise a digital multiplier in ROM multiplying suitably delayed response to the digital carrier used in the demodulator 207 by the sum output signal of the adder 219.

The quantizer 216 can have decision thresholds that take into account the presence of the direct component that should result from the synchronous detection of the pilot carrier. In such case the digital level added to the sampler 218 output signal by the adder 219 can be zero-valued. Or in equivalent circuitry, the adder 219 is dispensed with, and the sampler 218 output signal is applied directly to the balanced amplitude-modulator 220. Preferably, however, the adder 219 adds a digital level to the sampler 218 output signal such that the equalizer boosts the level of pilot carrier the equalizer applies to the complex demodulator 207. This will improve the oscillator 211 AFPC loop performance.

In another arrangement that uses the adder 219, the direct component in the quantizer 216 input signal is filtered to suppress the direct component, so the decision thresholds are symmetrically disposed around baseline. In such case the digital level added to the sampler 218 output signal by the adder 219 has a value different from zero to cause a pilot carrier to appear in the output signal from the balanced amplitude-modulator 220. Boosting the value of this pilot carrier somewhat above normal value will boost the level of pilot carrier the equalizer applies to the complex demodulator 207 to improve the oscillator 211 AFPC loop performance.

In a modification of the FIG. 18 apparatus in which the balanced amplitude-modulator 220 is implemented using read-only memory (ROM), the amplitude of pilot carrier in the balanced amplitude-modulator 220 can be set by the values stored in ROM, the adder 219 dispensed with, and the sampler 218 output signal applied directly to the balanced amplitude-modulator 220 as a partial address for the ROM therein.

The double-sideband amplitude-modulation (DSB AM) output signal from the modulator 220 is supplied to an FIR digital bandpass filter 221, the bandpass response from which is constrained to a prescribed bandwidth with prescribed slopes through a lower cut-off frequency and through an upper cut-off frequency, the slope that is remote from carrier frequency being the Nyquist slope for the received VSB transmission. The response of the digital bandpass filter 221 suppresses the one of the amplitude-modulation sidebands in the modulator 220 output signal corresponding to the sideband that is suppressed in the received VSB signal as translated to the final I-F band. The response of the digital bandpass filter 221 is the best estimate of the transmitted VSB signal. The equalizer output signal from the subtractor 204 is delayed by shim delay 222 before being differentially compared with the best estimate of the transmitted VSB signal in an error detector 223 that generates the decision-feedback error signal.

The decision-feedback error signal is supplied to filter coefficient computation apparatus 224, which is substantially the same as that employed in prior-art baseband equalizers using adaptive filters adjusted in accordance with a decision-feedback method. The decision-feedback error signal, while developed by differentially comparing final I-F signals rather than baseband signals, is suited for applying equalization to final I-F signal. In order for the adaptive procedures to converge in a more stable manner, the designer may desire to defer the modification of filter coefficients in response to samples of the equalizer output signal including a current sample until the current sample no longer affects modification of filter coefficients appreciably. This delay can be introduced by delaying the decision-feedback error signal from the error detector 223, or the filter coefficient computation apparatus 224 may delay the application of calculated filter coefficients to the filter coefficients registers 205 and 206.

FIG. 18 shows a register 232 for accumulating corresponding samples of initial data segments of data frames. The accumulation results are available to the filter coefficient computation apparatus 224 for use as training signal when a channel is tuned for the first time or when changes in multipath distortion have been so severe that the continuous adjustment of filter coefficients by decision-feedback methods is disrupted. The failure of decision feedback to track change in multipath distortion can be discerned from the error signals from the error detector 223 going outside normal range. The register 232 for accumulating corresponding samples of initial data segments of data frames differs from the registers used in the prior art for accumulating corresponding samples of initial data segments of data frames in that the accumulated samples are of digital I-F signal before its demodulation, rather than the samples being of in-phase baseband signal resulting from the demodulation of the digital I-F signal. The filter coefficient computation apparatus 224 characterizes the reception channel somewhat differently than is done in prior-art filter coefficient computation apparatus using a training signal for initialization of equalizer filter coefficients. The discrete Fourier transform (DFT) of the received training signal and its ghosts is calculated before demodulation, rather than after. The DFT is divided term-by-term by the DFT of the ideal training signal as it should appear in VSB modulation of digital carrier in the digital I-F signal, which latter DFT is stored in read-only memory within the computation apparatus 224. The DFT resulting from this term-by-term division characterizes the reception channel, and thereafter the calculation of filter coefficients from the complex congugate of the DFT characterizing the reception channel is performed similarly to how it is done in prior-art filter coefficient computation apparatus.

Figure 19:
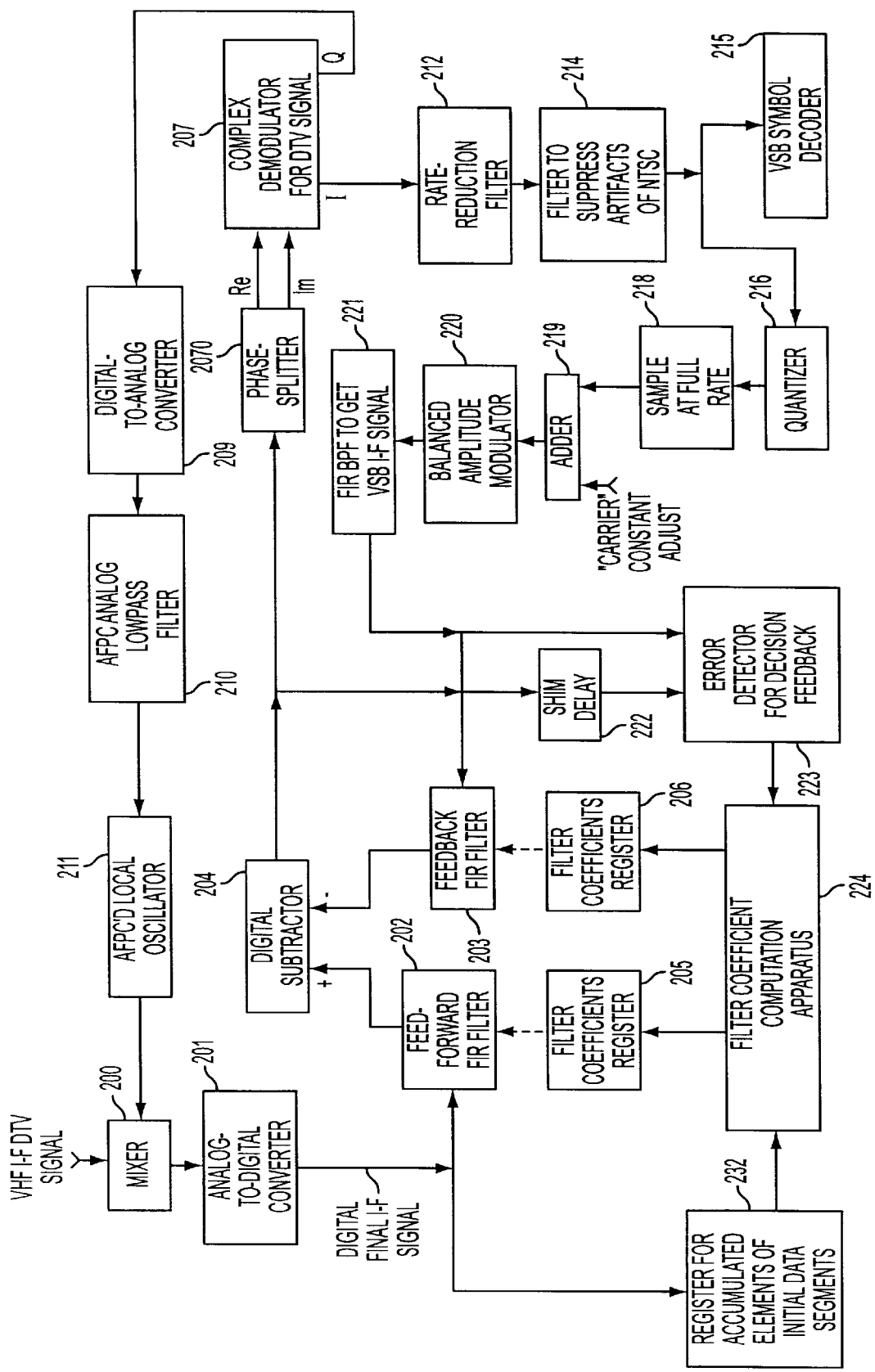
FIG. 19 is a block schematic diagram of a modification of the FIG. 18 circuitry for equalization of VSB final I-F signal, which modification provides another embodiment of the invention.

FIG. 19 shows a way for equalizing VSB final I-F signal that is an alternative to the way shown in FIG. 18. The response of the FIR digital bandpass filter 221 is applied to the feedback FIR digital filter 203 as its input signal, instead of the equalizer output signal supplied as difference output signal from the subtractor 204 being applied to the filter 203 as its input signal. This procedure reduces the noise in the input signal applied to the feedback FIR digital filter 203, which usually will help the weighting coefficients of the filters 202 and 203 in the equalizer converge more rapidly to desired values. The ability to eliminate short-delay post-ghosts with the feedback FIR digital filter 203 is sacrificed in some degree because of the increased latency in the IIR filter recursion path from subtractor 204 output port to filter 203 input port. However, if the feedforward filter FIR digital filter 202 is designed with a sufficient number of spaced taps to correct pre-ghosts a given number of microseconds earlier than the principal signal, the filter 202 will be capable of correcting post-ghosts that given number of microseconds later than the principal signal. If the latent delay through the IIR filter recursion path from subtractor 204 output port to filter 203 input port is less than this given number of microseconds, the sacrifice in ability to eliminate short-delay post-ghosts with the feedback FIR digital filter 203 is not of appreciable consequence to overall operation of the equalizer.

Figure 20:
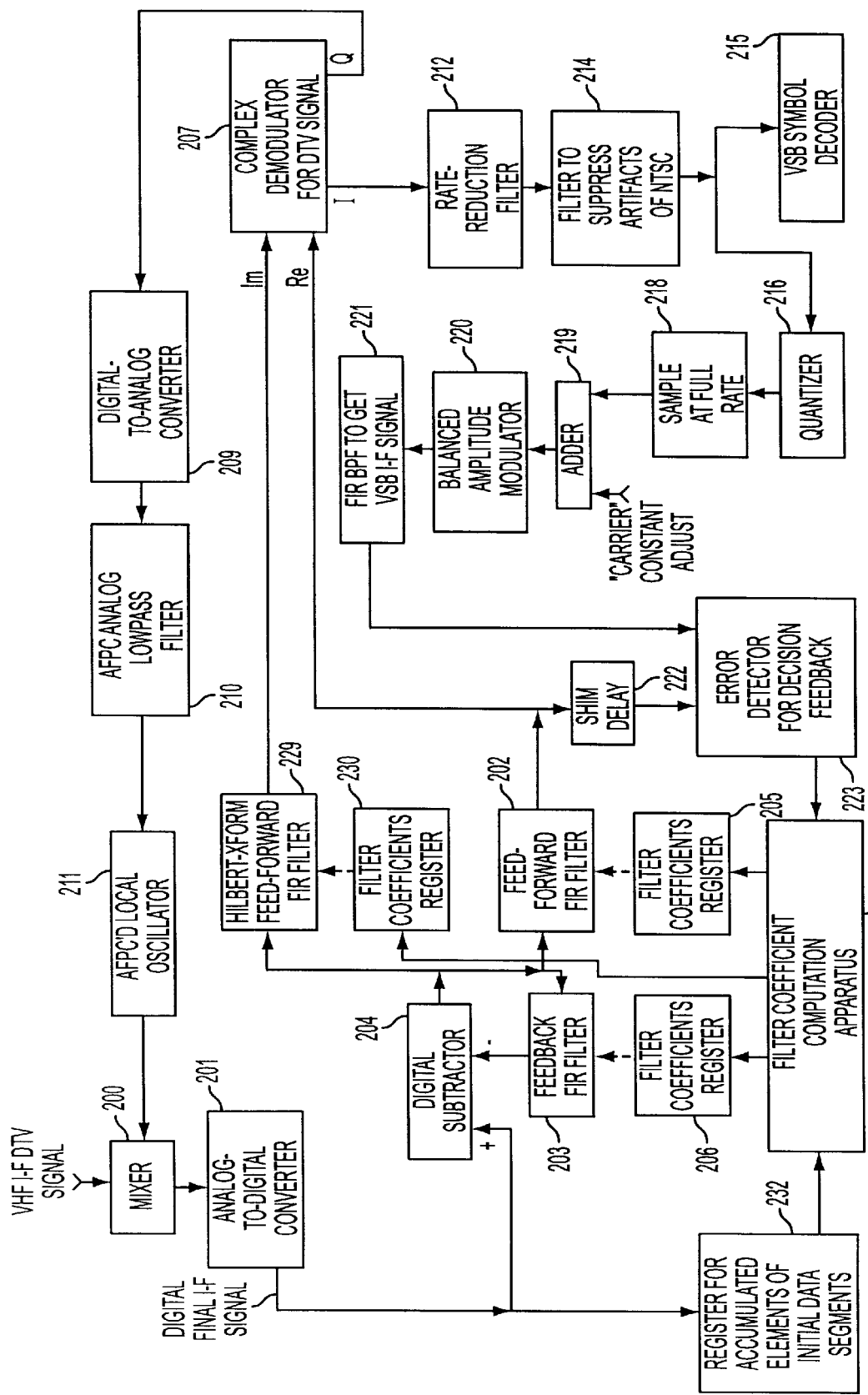
FIG. 20 is a block schematic diagram of a modification of the FIG. 19 circuitry to provide yet another embodiment of the invention, in which the order in which component IIR and FIR digital filters are cascaded in the equalizer is reversed, facilitating the Hilbert transform filter being subsumed in the FIR digital filtering.

FIG. 20 shows modifications of the FIG. 18 circuitry for equalization of VSB intermediate-frequency signal which reverses the order of cascading of the feed-forward FIR digital filter 202 and the IIR filter comprising the subtractor 204 and the feedback FIR digital filter 203. This facilitates the feed-forward FIR digital filter 202 supplying real samples of equalized digital final I-F signal to the complex demodulator 207 responsive to the subtractor 204 difference output signal, with a Hilbert-transform feedforward FIR filter 229 supplying imaginary samples of equalized digital final I-F signal to the complex demodulator 207 responsive to the subtractor 204 difference output signal. The Hilbert-transform feedforward FIR filter 229 is an adaptive FIR digital filter including a tapped digital delay line for supplying tap signals that variously delay its respective input signal, digital multipliers for multiplying the tap signals by weighting coefficients supplied from a filter coefficients register 230, and a digital adder for summing the products from the digital multipliers to generate the filter 229 response. Filter coefficient computation apparatus 231 replaces the filter coefficient computation apparatus 224, performing the functions of the apparatus 224 and additionally calculating the weighting coefficients of the adaptive Hilbert-transform feedforward FIR digital filter 229 for entry into the filter coefficients register 230. More particularly, the apparatus 231 convolves the kernel of the feed-forward FIR digital filter 202 described by the coefficients in the filter coefficients register 205 with the kernel of a hypothetical Hilbert transform filter to generate the kernel of the adaptive FIR digital filter 229. The coefficients of the kernel of the adaptive FIR digital filter 229 are entered into the filter coefficients register 230 in a block at the same the coefficients of the kernel of the feed-forward FIR digital filter 202 are entered into the filter coefficients register 205.

The adaptive Hilbert-transform feedforward FIR digital filter 229 is used in the FIG. 20 circuitry to eliminate the phase-splitter 2070 and thereby keep the delay in the AFPC loop for the local oscillator 211 as small as possible. In alternative modification of the FIG. 18 circuitry, the order of cascading of the feed-forward FIR digital filter 202 and the IIR filter comprising the subtractor 204 and the feedback FIR digital filter 203 is reversed, but the phase-splitter 2070 is retained. The input port of the phase-splitter 2070 is connected differently, being connected from the output port of the feed-forward FIR digital filter 202 to receive its response as the input signal to be phase-split. The Hilbert-transform feedforward FIR digital filter 229 and associated filter coefficients register 230 are not used in this alternative modification of the FIG. 18 circuitry, since the phase-splitter 2070 provides the complex samples for demodulation by the complex demodulator 207.

Figure 21:
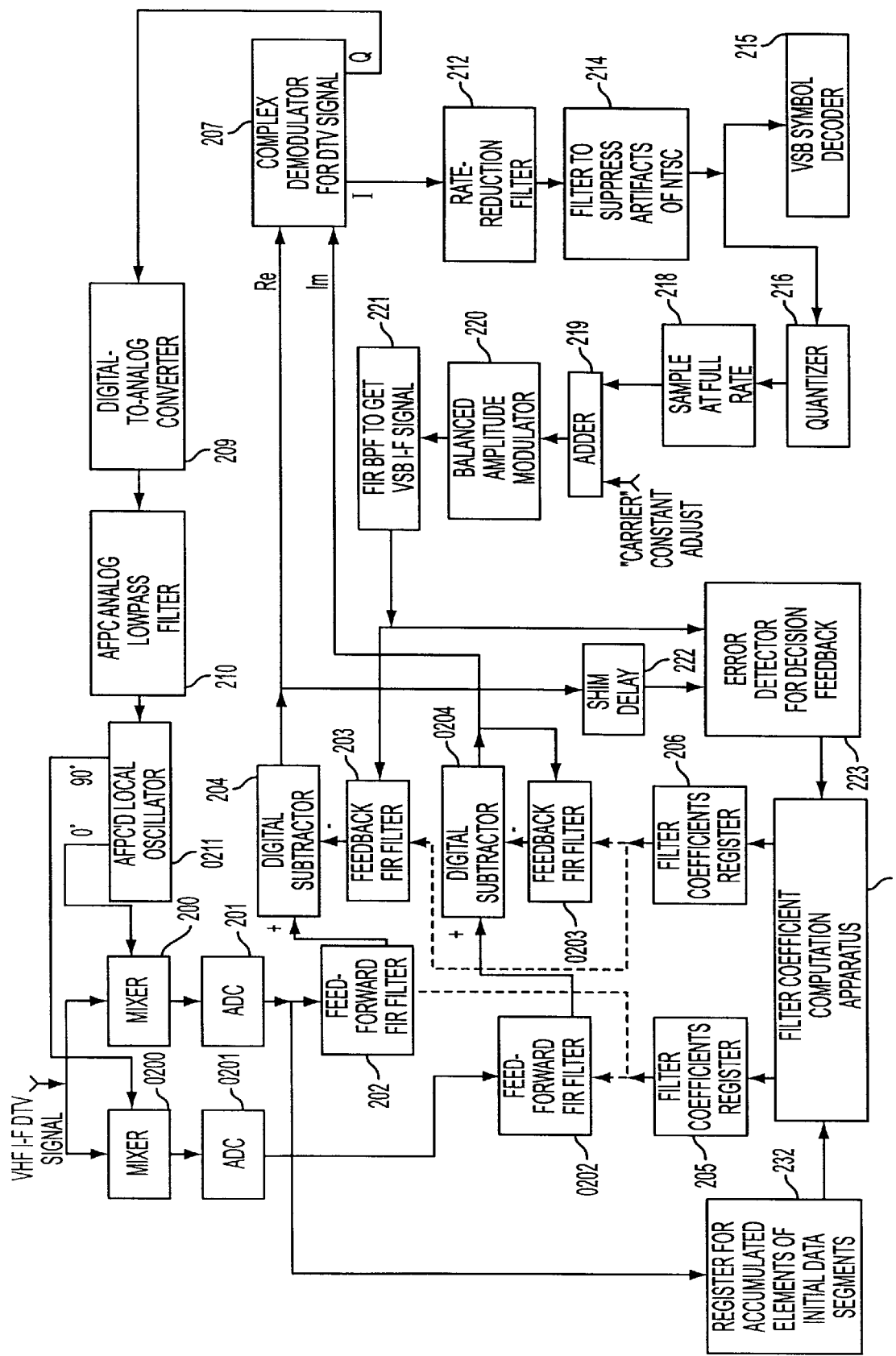
FIG. 21 is a block schematic diagram of a modification of the FIG. 19 circuitry, which modification uses a complex mixer before the equalizer for VSB final I-F signal to avoid the need for a phase-splitter before the complex demodulator.

FIG. 21 shows a modification of the FIG. 18 circuitry for equalization of VSB I-F signal which eliminates the phase-splitter 2070. The local oscillator 211 of FIG. 18 is replaced in FIG. 21 by a local oscillator 0211 supplying quadrature-phase (90°) oscillations as well as supplying in-phase (0°) oscillations. The mixer 200 and a mixer 0200 are components of a complex mixer. The mixer 200 mixes the VSB final I-F signal with the in-phase oscillations to generate a stream of real samples of the VSB final I-F signal for digitization by the analog-to-digital converter 201. The mixer 0200 mixes the VSB final I-F signal with the quadrature-phase oscillations to generate a stream of imaginary samples of the VSB final I-F signal for digitization by an analog-to-digital converter 0201. The equalizer for the stream of real digital samples of the VSB final I-F signal from the analog-to-digital converter 201 comprises the feed-forward FIR digital filter 202, the feedback finite-impulse-response digital filter 203, the digital subtractor 204, the filter coefficients register 205, and the filter coefficients register 206 as previously described with regard to the FIG. 18 circuitry. The difference output signal from the subtractor 204 is the output signal of the equalizer for the stream of real digital samples, which stream of real digital samples of equalized VSB final I-F signal is supplied to the demodulator 207 instead of the delayed stream of real digital samples of equalized VSB final I-F signal that the phase-splitter 2070 supplies in the FIG. 18 circuitry.

The FIG. 21 circuitry includes a further equalizer for the stream of imaginary digital samples of the VSB final I-F signal from the analog-to-digital converter 0201. This further equalizer shares the filter coefficients registers 205 and 206 with the equalizer for the stream of real digital samples of the VSB final I-F signal from the analog-to-digital converter 201. In addition to the filter coefficients registers 205 and 206, the further equalizer comprises a feed-forward FIR digital filter 0202 for the stream of imaginary digital samples of the VSB final I-F signal from the analog-to-digital converter 0201, a feedback FIR digital filter 0203, and a digital subtractor 0204 for differentially combining the responses of the filters 0202 and 0203 to generate a difference output signal applied to the feedback FIR filter 0203 as its input signal. The feed-forward FIR digital filters 202 and 0202 are similar in their construction and have similar filter coefficients applied to them from the filter coefficients register 205. The feedback FIR digital filters 203 and 0203 are similar in their construction and have similar filter coefficients applied to them from the filter coefficients register 206. The difference output signal from the subtractor 204 is a stream of imaginary digital samples of equalized VSB final I-F signal, which stream of imaginary digital samples of equalized VSB final I-F signal is supplied to the demodulator 207 instead of the stream of imaginary digital samples of equalized VSB final I-F signal that the phase-splitter 2070 supplies in the FIG. 18 circuitry.

Figure 22:
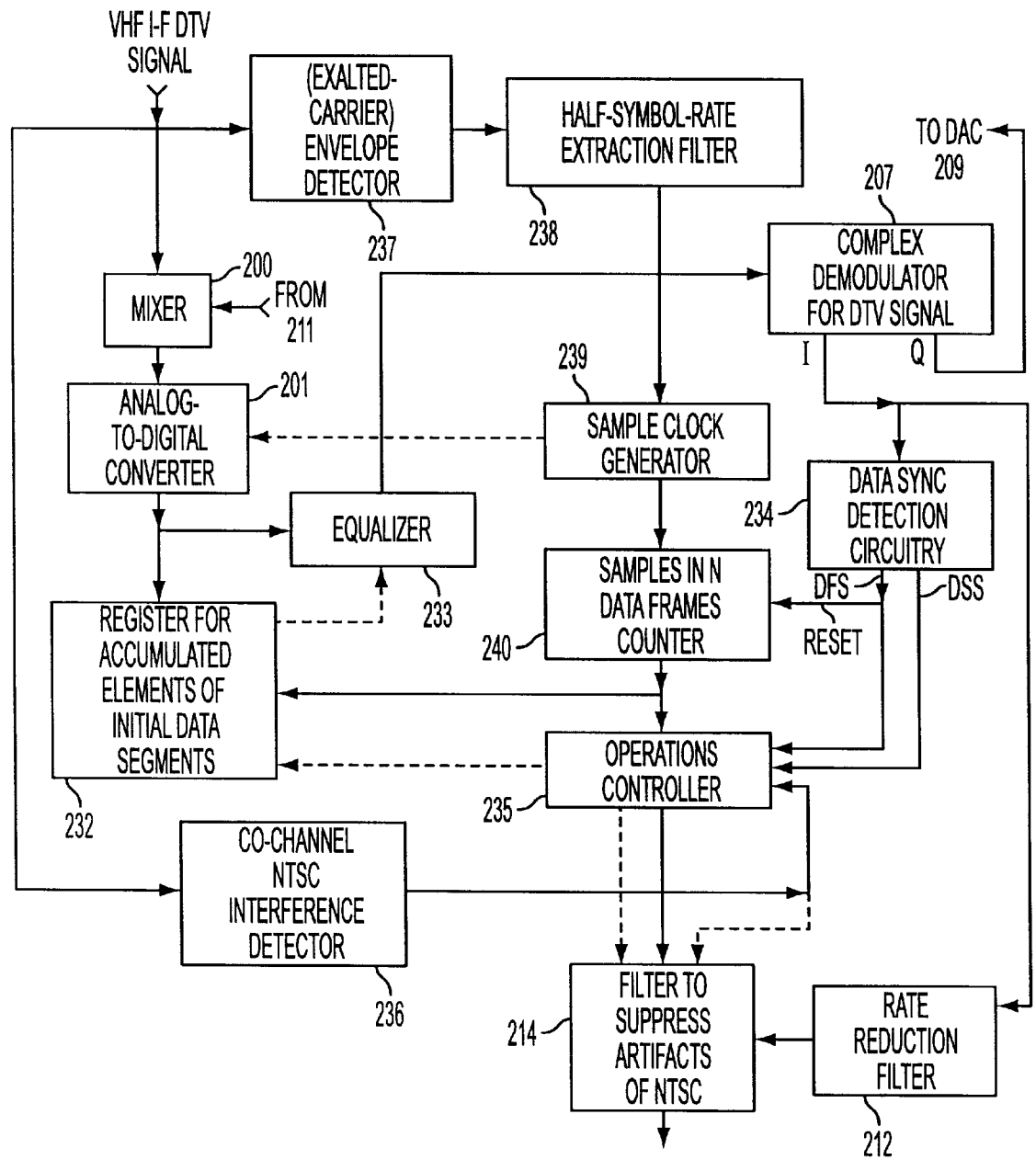
FIG. 22 is a block schematic diagram of circuitry used with the FIG. 18, 19, 20 and 21 circuitry to acquire training signal from the data field synchronizing segments of the VSB final I-F signal.

FIG. 22 shows in more detail how the timing of register 232 operation is arranged for. The equalizer 233 is the equalizer for VSB digital final I-F signal supplied from the ADC 201, as that equalizer is described in connection with FIG. 18, 19, 20 or 21 of the drawing. The equalizer 233 supplies its response, equalized VSB digital I-F signal to the complex demodulator 207 for demodulation resulting in the in-phase (I) baseband signal and the quadrature (Q) baseband signal. Data sync detection circuitry 234 contains match filter circuitry for detecting the presence of data field sychronizing (DFS) codes in the initial data segments of data fields of the I baseband signal and match filter circuitry for detecting the presence of data segment sychronizing (DSS) codes in the four initial symbols of each data segment in the I baseband signal. In U.S. Pat. No. 5,594,506 issued Jan. 14, 1997 and entitled "LINE SYNC DETECTOR FOR DIGITAL TELEVISION RECEIVER" J. Yang describes a preferred form of the match filter circuitry for detecting the presence of DSS codes in the I baseband signal. Indications of the occurrence of DFS and DSS codes are supplied to an operations controller 235 that controls the operation of the register 232 for accumulating corresponding samples of initial data segments of data frames.

FIG. 22 shows the VHF I-F signal supplied to the mixer 200 also being supplied to a co-channel NTSC interference detector 236, which determines whether or not the VSB DTV signal is accompanied by significant amounts of co-channel NTSC interference—i.e., enough co-channel NTSC signal to cause the bit error rate in the data decoded from the VSB DTV signal to exceed the error-correction capabilities of the trellis and Reed-Solomon decoding procedures. The co-channel NTSC interference detector 236 supplies the operations controller 235 the single-bit indication of whether the VSB DTV signal is not accompanied by significant amounts of co-channel NTSC interference. In FIG. 19 this single-bit indication is also supplied to the filter 214 to suppress artifacts of NTSC so that the filter can be disabled when co-channel NTSC interference is insignificant; this improves symbol decoder performance under noisy reception conditions.

An envelope detector 237, preferably of an exalted-carrier type, responds to VHF I-F DTV signal to supply the detected envelope variations to a bandpass filter 238, which filter 238 separates spectral component at one-half the 10.76 MHz VSB DTV symbol frequency. This separated spectral component is supplied to a sample clock generator 239 for controlling the rate at which the generator 239 supplies sampling clock signals to the ADC 201 and to a sample counter 240. The sample clock generator 239 also supplies clock signals at reduced rate to the rate-reduction filter 212 and elements in the NTSC-artifact-suppression filter 214. However, to avoid clutter that might interfere with understanding more important relationships amongst the elements in FIG. 22, these connections are not explicitly shown in FIG. 22.

The sample counter 240 counts the sampling clock signals over a plurality N in number of data frames. N is preferably twelve. Artifacts of co-channel NTSC interference tend to average to lower value respective to the result of accumulating DFS signals, when accumulation is done over a cycle of six data frames or a plurality of such six-data-frame cycles. Significant gains in signal-to-noise ratio are achieved by accumulating DFS signals over twelve data frames as compared to accumulating them over six data frames. Gains in signal-to-noise ratio are less pronounced when accumulating DFS signals over higher multiples of six data frames.

The DFS signal from the data sync detection circuitry 234 is arranged to reset to prescribed value the portion of the count that the sample counter 240 supplies which describes data fields count, data segments within data field count, VSB symbols within data segment count, and samples within VSB symbol count. The portion of the count that the sample counter 240 supplies which describes data frames count is allowed to accumulate continuously on a modulo-N basis. Less significant bits of the sample count from the counter 240 are arranged to be descriptive of the sample count per data segment and are supplied to the register 232 for addressing purposes. At least portions of the sample count from the counter 240 are supplied to the operations controller 235. In the FIG. 22 circuitry the operations controller 235 responds to DSS indications from the data sync detection circuitry 234, or to specific values of data sync detection circuitry 234, to condition the NTSC-artifact-suppression filter 214 to insert noise-free data segment sync signal generated within the operations controller 235 into the filter 214 response for replacing data segment sync signal obtained by IIR filtering.

The operations controller 235 controls the accumulation of initial data segments in the register 232. While the initial data segments being accumulated are in VSB modulated final I-F carrier format, rather than baseband format, the accumulation procedures are similar to those usually employed with baseband signals. This is because the 7.17 MHz digital carrier frequency has eight cycles in twelve VSB symbol epochs and the number of symbol epochs in a data field is a multiple of twelve, so the digital carrier currently has the same phase as it had an integral number of data fields previously, assuming the same VSB DTV signal continued to be received. The operations controller 235 responds to the data segment count being indicative that the initial data segment of a data field is being received for conditioning the register 232 for read-accumulate-and-write-back-in operation on a sample-by-sample basis responsive to addressing by the less significant bits of the sample count from the counter 240 that descriptive of the sample count per data segment. The operations controller 235 responds to the data frame count rolling over to zero for conditioning the register 232 for a simply write-over operation on a sample-by-sample basis responsive to addressing by the less significant bits of the sample count from the counter 240 that descriptive of the sample count per data segment. During the data field in the last data frame of each cycle of operation, the accumulation results are read as training signal to the filter coefficient computation apparatus 224.

The further equalizer for imaginary VSB final I-F signal in FIG. 21 is presumed to be similar to the equalizer for real VSB final I-F signal, which presumption should be quite good if there is substantial oversampling of the VSB final I-F signal. However, true complex equalization is possible and is desirable if the VSB final I-F signal is not oversampled at least 2:1 over Nyquist rate.

Figure 23:
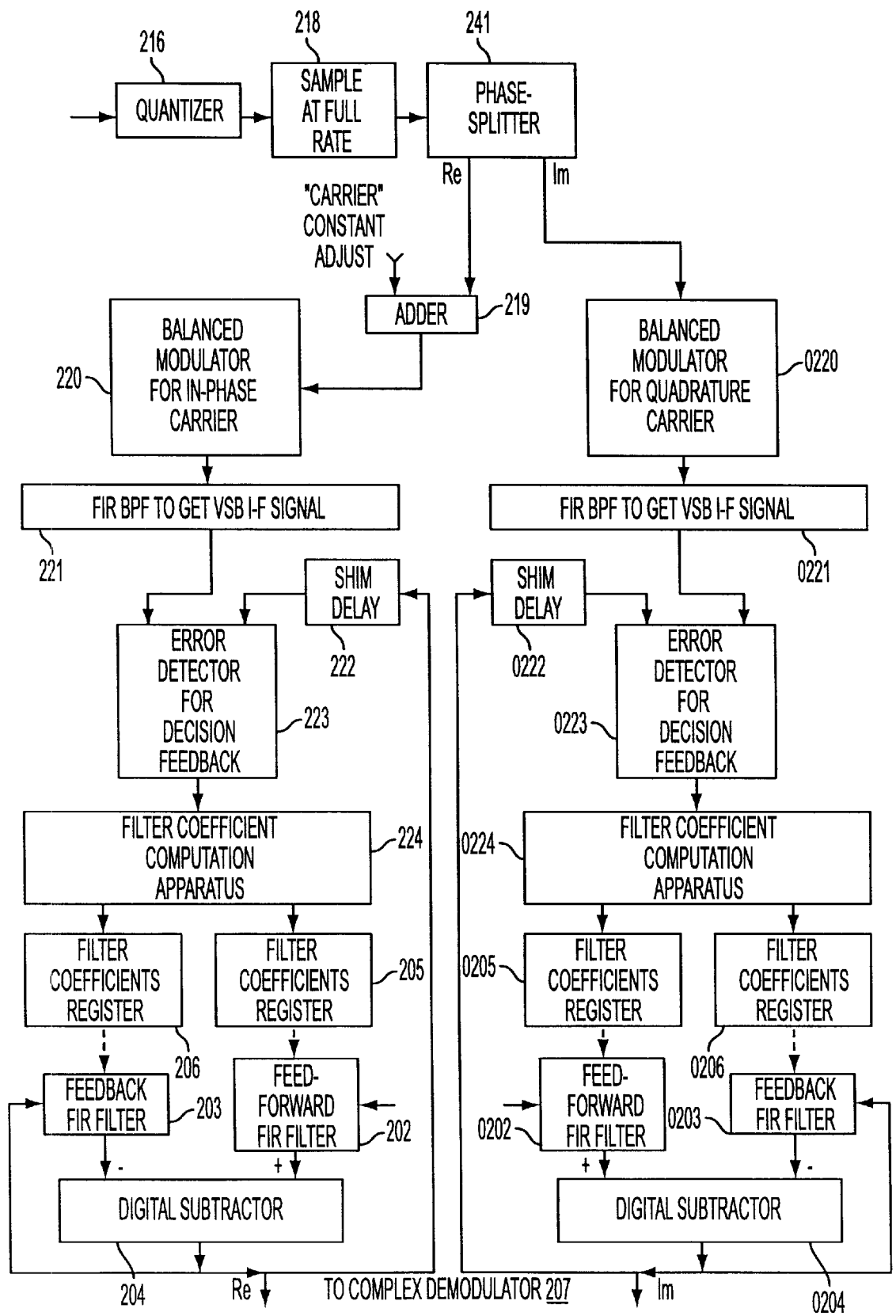
FIG. 23 is a block schematic diagram of a further modification of the FIG. 19 circuitry as modified in accordance with FIG. 21, which further modification operates the equalizer as a complex equalizer for VSB final I-F signal.

FIG. 23 shows modifications that are introduced into the circuitry of FIG. 21 to provide for complex equalization. These modifications include the incorporation of a further balanced amplitude modulator 0220, a further FIR digital bandpass filter 0221 for supplying a bandpass response to the modulator 0220 output signal, and a phase-splitter 241 for the response of the sampler 218. The imaginary response from the phase-splitter 241 is supplied to the further balanced amplitude modulator 0220 as modulating signal. The real response from the phase-splitter 241 is supplied as a summand input signal to the adder 219, the sum output signal from which adder 219 is supplied to the balanced amplitude modulator 220 as modulating signal. The balanced amplitude modulator 0220 employs a suppressed carrier in quadrature with the suppressed carrier employed by the balanced amplitude modulator 220. The FIR digital bandpass filters 221 and 0221 have identical structures and identical system characteristics. The difference signal from the digital subtractor 0204 is delayed by digital shim delay 0222 for comparison with the filter 0221 response in a further error detector 0223. The error detector 0223 generates the decision feedback signal from which the filter coefficients for the feed-forward FIR filter 0202 and the feedback FIR filter 0203 are computed by filter coefficient computation apparatus 0224 for insertion into filter coefficient registers 0205 and 0206, respectively. The filter coefficient computation apparatus 0224 is similar to the filter coefficient computation apparatus 224 in structure and operation. The two apparatuses can be realized within the same microcomputer operated on a time-division-multiplex basis.

Since the phase-splitter 241 is operative at baseband, the latent delay therethrough tends to be substantial, of the order of ten microseconds or so, which is longer than the latent delay through each of the feedforward FIR filters 202 and 0202 needs to be in order to suppress pre-ghosts. So, it is preferable to exclude the phase-splitter 241 from the recursion paths in the IIR filter portions of the equalizer for VSB final I-F signal. Accordingly, FIG. 23 shows the difference output signals from the subtractors 204 and 205 are applied as input signals to the feedback FIR filters 203 and 0203, respectively. Alternatively, the responses of bandpass filters 221 and 0221 are applied as input signals to the feedback FIR filters 203 and 0203, respectively, and the feedforward FIR filters 202 and 0202 are designed to provide more taps.

Figure 24:
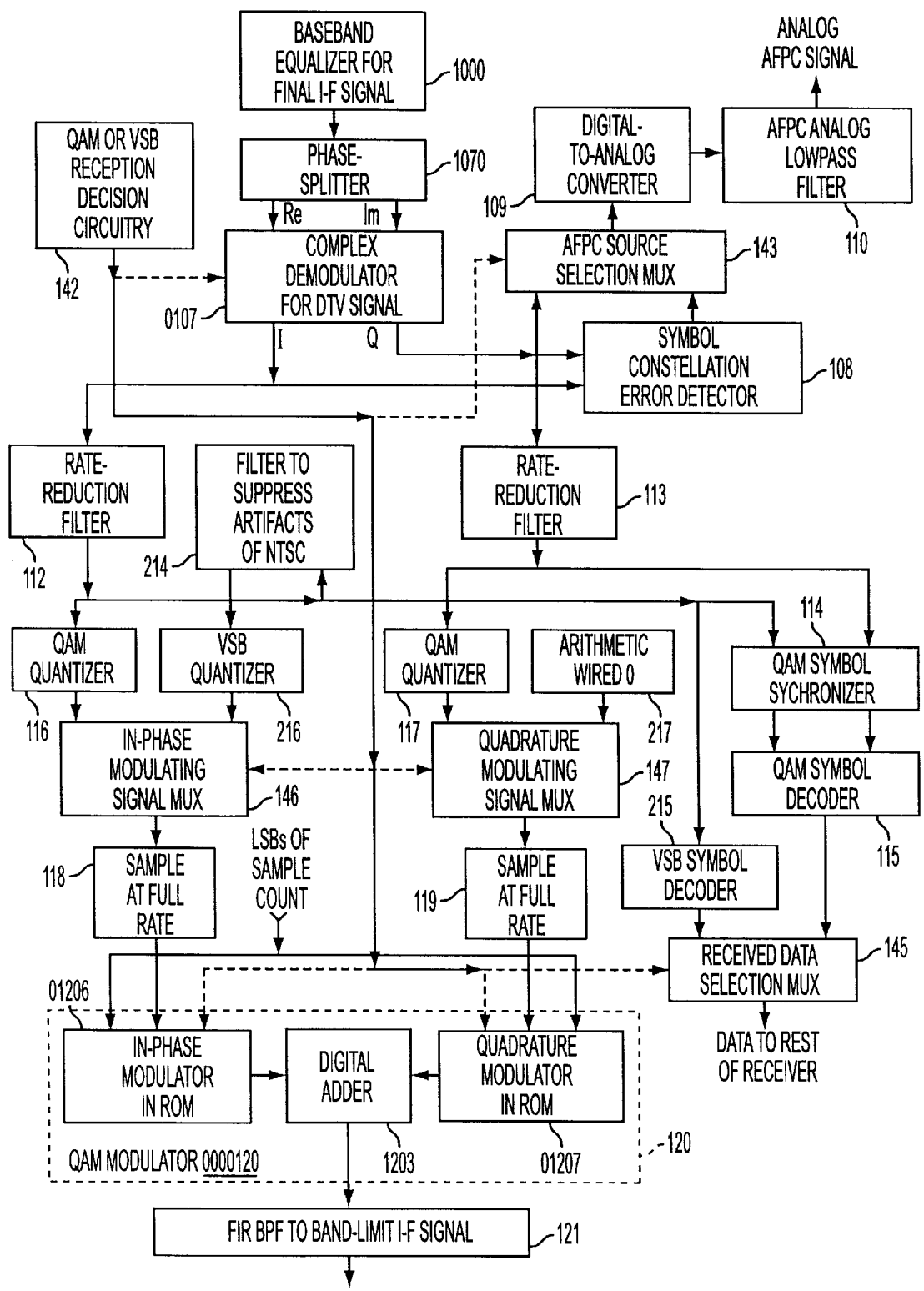
FIG. 24 is a block schematic diagram of modifications that are made to the FIG. 1 or FIG. 2 circuitry so that an equalizer can equalize final I-F signal no matter if it is a QAM DTV signal as employed in cablecasting or a VSB DTV signal as specified terrestrial broadcasting.

FIG. 24 shows modifications that are made to the FIG. 1 or FIG. 2 circuitry so that an equalizer 1000 comprising elements 102–106 and 122–124 can equalize final I-F signal no matter if it is a QAM DTV signal as employed in cablecasting or a VSB DTV signal as employed in terrestrial broadcasting. The elements 100–106, 109–112, 118, 121–124 and 1070 in the FIG. 1 circuitry and FIG. 2 circuitry correspond to the elements 200–206, 209–212, 218, 221–224 and 2070 in the FIG. 18 circuitry and FIG. 19 circuitry.

FIG. 24 shows decision circuitry 142, which generates a bit indicative of whether the received DTV signal is a QAM signal or is a VSB signal. This bit is arbitrarily assumed for purposes of description to have a logic ZERO value during QAM reception and a logic ONE value during VSB reception. The decision circuitry 142 can be of a type in which the DTV viewer decides reception conditions with a switch, or of any of a variety of known types in which the nature of the signal currently being received is automatically determined. For example, decision circuitry 142 can be of a type in which the presence of the VSB DTV pilot carrier is detected to distinguish VSB DTV reception from QAM DTV reception.

The real samples of the equalizer 1000 response are supplied to a phase-splitter 1070, which responds to supply a stream of imaginary samples of equalized final I-F signal and a stream of real samples of equalized VSB final I-F signal with similar latent delay. These streams of samples are applied as complex input signal to a complex demodulator 0107 that synchrodynes the equalized final I-F signal to baseband in the digital regime. The bit indicative of whether the received DTV signal is a QAM signal or is a VSB signal is supplied to the complex demodulator 0107 to determine whether demodulation by digital synchrodyne will be done with respect to the QAM carrier or with respect to the VSB carrier. Suppose the in-phase digital synchrodyne to baseband and the quadrature-phase digital synchrodyne to baseband are performed using read-only memory. Then, the bit that the decision circuitry 142 generates indicative of whether a QAM DTV signal or a VSB DTV signal is currently being received is applied to the read-only memory as an address extension for selecting whether digital synchrodyne to baseband will be done with respect to the QAM carrier or with respect to the VSB carrier.

The in-phase (I) and quadrature-phase (Q) ouput signals from the complex demodulator 0107 are supplied as input signals to the symbol constellation error detector 108, which during QAM DTV signal reception develops an error signal responsive to mis-phasing of the two-dimensional QAM symbol constellation. The bit indicative of whether the received DTV signal is a QAM signal or is a VSB signal controls an AFPC source selection multiplexer 143. The multiplexer 143 selects a digital error signal supplied to a digital-to-analog converter 109 for conversion to an analog signal, which is applied as input signal to a lowpass filter 110. The filter 110 response is AFPC signal for application to the local oscillator 111 (not shown in FIG. 24). Responsive to the bit that the decision circuitry 142 supplies being a ZERO, which is indicative of QAM DTV signal reception, the AFPC source selection multiplexer 143 selects the output signal from the the symbol constellation error detector 108 for application to the digital-to-analog converter 109 as its input signal. Responsive to the bit that the decision circuitry 142 supplies being a ONE, which is indicative of VSB DTV signal reception, the AFPC source selection multiplexer 143 selects the Q output signal from the complex demodulator 0107 for application to the digital-to-analog converter 109 as its input signal.

In FIG. 24, as in FIG. 1 or 2, the in-phase (I) and quadrature-phase (Q) output signals from the complex demodulator 0107 are applied as input signals to the rate-reduction filters 112 and 113, respectively, which supply I and Q signals with sample rate reduced to symbol rate. The I and Q signals from the rate-reduction filters 112 and 113 are supplied to the QAM symbol synchronizer 114 that determines which of the real and imaginary components of the baseband QAM symbol code each of the I and Q signals corresponds to. The baseband QAM symbol code as reproduced from the I and Q signals are supplied to the QAM symbol decoder 115, which is a trellis decoder of Viterbi type, for example. In FIG. 24 the I signal from the rate-reduction filter 112 is also supplied to the VSB symbol decoder 215, which is a trellis decoder of Viterbi type, for example. Responsive to the bit that the decision circuitry 142 supplies being a ZERO, which is indicative of QAM DTV signal reception, a data selection multiplexer 145 selects data from the QAM symbol decoder 115 to be supplied to the remaining portions of the receiver including the Reed-Solomon forward-error correction decoder, the data de-randomizer, etc. Responsive to the bit that the decision circuitry 142 supplies being a ONE, which is indicative of VSB DTV signal reception, the data selection multiplexer 145 selects data from the VSB symbol decoder 215 to be supplied to the remaining portions of the receiver.

The I and Q signals from the rate-reduction filters 112 and 113 are supplied to a quantizer 116 and to a quantizer 117, respectively, which quantizers provide noise-free estimates of the real and imaginary components of the baseband QAM symbol code as originally transmitted. The I signal from the rate-reduction filter 112 is also supplied to a quantizer 216, which provides noise-free estimates of the baseband VSB symbol code as originally transmitted. FIG. 24 shows this being done with the I signal from the rate-reduction filter 112 being applied as input signal to a filter 214 for suppressing NTSC artifacts in its response applied as input signal to the quantizer 216, which connection is preferred so long as NTSC analog television broadcasting is done. Multiplexers 146 and 147, which are controlled by the bit that the decision circuitry 142 supplies, select in-phase and quadrature-phase modulating signals to the sampler 118 and the sampler 119, respectively. Responsive to the bit that the decision circuitry 142 supplies being a ZERO, which is indicative of QAM DTV signal reception, the multiplexer 146 reproduces the quantizer 116 output signal as the in-phase modulating signal that the multiplexer 146 supplies to the sampler 118 to be over-sampled to match the sample rate through the equalizer 1000. Responsive to the ZERO bit, the multiplexer 147 reproduces the quantizer 117 output signal as the quadrature-phase modulating signal that the multiplexer 147 supplies to the sampler 119 to be oversampled to match the sample rate through the equalizer 1000. Responsive to the bit that the decision circuitry 142 supplies being a ONE, which is indicative of VSB DTV signal reception, the multiplexer 146 reproduces the quantizer 216 output signal as the in-phase modulating signal that the multiplexer 146 supplies to the sampler 118. Responsive to the ONE bit, the multiplexer 147 reproduces arithmetic zero signal applied by input wiring 217 as the quadrature-phase modulating signal that the multiplexer 147 supplies to the sampler 119.

QAM modulator 0000120 that differs from the QAM modulator 0120 of FIGS. 6 and 7 in that the in-phase balanced modulator ROM 1206 and the quadrature-phase balanced modulator ROM 1207 are replaced by an in-phase balanced modulator ROM 01206 and an quadrature-phase balanced modulator ROM 01207. The in-phase balanced modulator ROM 01206 is only partially addressed by the sampler 118 response, and the quadrature-phase balanced modulator ROM 01207 is only partially addressed by the sampler 119 response. The remainder of each of the ROM 01206 and ROM 01207 addresses is the single bit indicative of whether the received DTV signal is a QAM signal or is a VSB signal that the decision circuitry 142 supplies.

Responsive to the bit that the decision circuitry 142 supplies being a ZERO, which is indicative of QAM DTV signal reception, the ROM 01206 generates an in-phase double-sideband amplitude-modulation (DSB AM) signal with carrier at the middle of the final I-F band, responsive to the sampler 118 response as in-phase modulating signal. The ROM 01207 generates a quadrature-phase DSB AM signal with carrier at the middle of the final I-F band, responsive to the sampler 119 response as quadrature-phase modulating signal. The adder 103 sums the in-phase and quadrature-phase components of a QAM signal that the ROMs 01206 and 01207 respectively generate. The resulting QAM signal, which is supplied as input signal to the FIR bandpass filter 121, has a suppressed carrier at the middle of the final I-F band. The FIR bandpass filter 121 response is a QAM signal with symmetrical Nyquist slope responses.

Responsive to the bit that the decision circuitry 142 supplies being a ONE, which is indicative of VSB DTV signal reception, the ROM 01206 generates a double-sideband AM signal with carrier near the edge of the final I-F band responsive to the sampler 118 response as an in-phase modulating signal. Responsive to the bit that the decision circuitry 142 supplies being a ONE, ROM 01207 supplies arithmetic zero output signal to the adder 1203, conditioning the adder 1203 to reproduce the ROM 01206 DSB AM output signal in its sum output signal. The FIR bandpass filter 121 response to the ROM 01206 DSB AM output signal is a VSB signal with a Nyquist slope response near the edge of the final I-F signal more remote from pilot carrier frequency and a slope response through the region around the pilot carrier frequency.

Minor modifications are possible in the way that the balanced modulator in ROM 01207 is caused to supply arithmetic zero summand signal to the adder 1203 during VSB DTV reception. In one modification, since the multiplexer 147 supplies arithmetic zero during VSB DTV reception, ROM 01207 is replaced by the ROM 1207 which receives the multiplexer 147 output signal and less significant bits of sample count as its complete input addressing, without its input addressing including the bit that the decision circuitry 142 supplies. In an alternative modification, the ROM 01207 is conditioned by its input addressing to supply arithmetic zero summand signal to the adder 1203 during VSB DTV reception, the quantizer 117 output signal is continuously applied to the sampler 119 as its input signal, and the multiplexer 147 is dispensed with.

Figure 25:
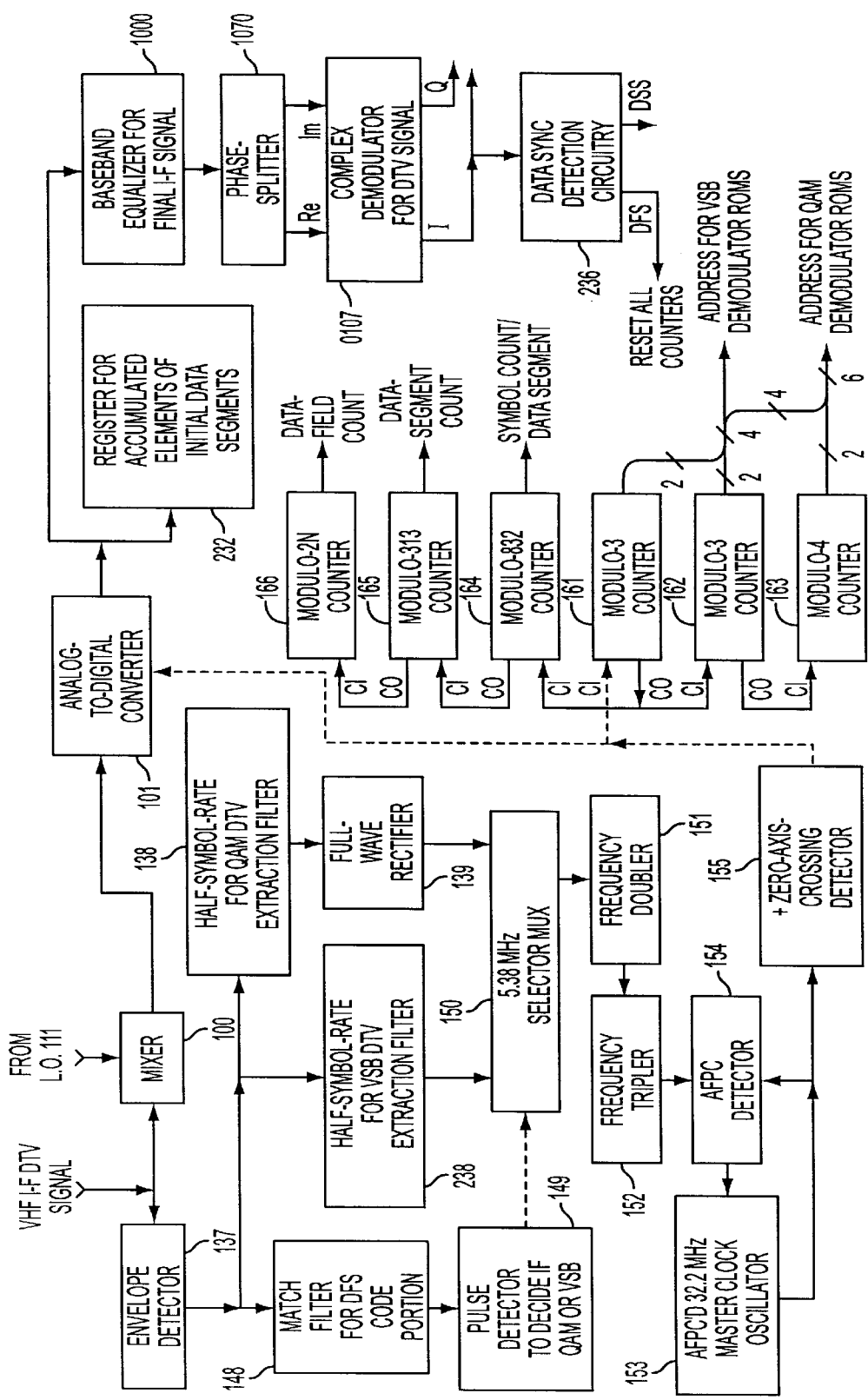
FIG. 25 is a block schematic diagram of details of sample clock generator and sample counter circuitry used in the FIG. 1 or FIG. 2 circuitry modified in accordance with FIG. 24.

FIG. 25 shows details of the sample clock generator and sample counter circuitry used in the FIG. 1 or FIG. 2 circuitry modified in accordance with FIG. 24. The sample clock generator is synchronized using a spectral line method. Accordingly, the VHF I-F signal supplied to the mixer 100 for downconversion is also supplied to an envelope detector 134, which detects envelope variations containing half-the-symbol-frequency components for received DTV signals, whether they be QAM or VSB in nature. The narrow bandpass filter 238 extracts the 5.38 MHz half-the-symbol-frequency components appearing in the detected envelope when VSB DTV signals are being received. A narrow bandpass filter 138 extracts the 2.69 MHz half-the-symbol-frequency components appearing in the detected envelope when QAM DTV signals are being received, a frequency-doubler amplifier 139 responds to these 2.69 MHz half-the-symbol-frequency components to generate a 5.38 MHz signal.

In the FIG. 25 circuitry a determination as to whether the DTV signal currently being received is a VSB DTV signal or is a QAM DTV signal is made and is used for selecting whether 5.38 MHz spectral line is to be taken from the narrow bandpass filter 238 response or from the frequency-doubler amplifier 139 response. To achieve this goal, the envelope detector 134 response is supplied to a match filter 148 for a portion of DFS code that repeats from data field to data field. The presence of the pulses of substantial energy that appear in the match filter 148 response during VSB reception are detected by a pulse detector 149 to provide an indication of whether a VSB DTV signal or is a QAM DTV signal is currently being received. By way of example, the pulse detector 149 comprises a short-pulse-elimination filter followed by a pulse stretcher that fills the intervals between pulses of substantial energy, in turn followed by a threshold detector. The pulse detector 149 supplies its indication of whether a VSB DTV signal or is a QAM DTV signal is currently being received to a 5.38 MHz source selection multiplexer 150 as its control signal. Responsive to indication that a VSB DTV signal is currently being received, the multiplexer 150 reproduces as its output signal the 5.38 MHz spectral line from the narrow bandpass filter 238 response. Responsive to indication that a QAM DTV signal is currently being received, the multiplexer 150 reproduces as its output signal the 5.38 MHz spectral line from the frequency-doubler amplifier 139 response.

The 5.38 MHz spectral line in the multiplexer 150 output signal is applied as input signal to a frequency-doubler amplifier 151 to generate a 10.76 MHz spectral line. The 10.76 MHz spectral line is supplied as input signal to a frequency-tripler amplifier 152 to generate a 32.28 MHz signal. The 32.28 MHz signal and 32.28 MHz oscillations from a master clock oscillator 153 are supplied to a detector 154 that generates an automatic frequency and phase control (AFPC) signal for the master clock oscillator 153. The 32.28 MHz oscillations from the master clock oscillator 153 are also supplied to a positive-zero-axis-crossing detector 155 to generate $32.28*10^6$ samples per second clock signal pulses. These clock pulses are supplied to the ADC 101 that digitizes the final I-F signal supplied from the mixer 100.

These clock pulses are also supplied to a modulo-three counter 161 as carry-in (CI) signal for counting, to count modulo-three the number of samples per symbol epoch. The carry-out (CO) signal from the modulo-three counter 161 is supplied to another modulo-three counter 162 as its carry-in (CI) signal. The bits of the counts from the modulo-three counters 161 and 162 correspond to a modulo-nine count in coded form. Digital carrier ROMs for the 7.17 MHz VSB carrrier frequency could be addressed by a modulo-nine sample count, with samples from four cycles of the 7.17 MHz VSB carrrier frequency being stored in each of the digital carrier ROMs. Alternatively, if VSB demodulator ROMs are used, they could be addressed by a modulo-nine sample count. However, to save hardware that would be needed for re-coding the bits of the counts from the modulo-three counters 161 and 162 to a modulo-nine count, the ROMs are instead addressed directly by the bits of the counts from the modulo-three counters 161 and 162, with the data stored in the ROM being re-allocated to suitable addressed storage locations.

The carry-out (CO) signal from the modulo-three counter 162 is supplied to a modulo-four counter 163 as its carry-in (CI) signal. The bits of the counts from the counters 161, 162 and 163 correspond to a modulo-18 count in coded form. Digital carrier ROMs for the 4.48 MHz QAM carrrier frequency could be addressed by a modulo-18 sample count, with samples from five cycles of the 4.48 MHz QAM carrrier frequency being stored in each of the digital carrier ROMs. Alternatively, if QAM demodulator ROMs are used, they could be addressed by a modulo-18 sample count. However, to save hardware that would be needed for re-coding the bits of the counts from the counters 161, 162 and 163 to a modulo-18 count, such a ROM is instead addressed directly by the bits of the counts from the counters 161, 162 and 163, with the data stored in the ROM being re-allocated to suitable addressed storage locations.

The carry-out (CO) signal from the modulo-three counter 161 is also supplied to a modulo-832 counter 164 as its carry-in (CI) signal. The modulo-832 counter 164 counts the symbol epochs in each data segment. The carry-out (CO) signal from the modulo-832 counter 164 is supplied to a modulo-313 counter 165 as its carry-in (CI) signal. The modulo-313 counter 165 counts the data segments in each data field. The carry-out (CO) signal from the modulo-313 counter 165 is supplied to a modulo-2N counter 166 as its carry-in (CI) signal. The modulo-2N counter 166 counts the data fields in each cycle of N data frames. The counts from the counters 164, 165 and 166 are used to implement the extraction of training signal from the digitized final I-F signal. The counter 164 count of the symbol epochs in each data segment is used for addressing the register 232 during writing. The count from the modulo-313 counter 165 identifying the initial data segment in each data field is supplied to the register 232 as a WRITE ENABLE signal. The count from the modulo-2N counter 166 controls the accumulation within the register 232.

The combined sample count provided by combining the respective counts from the counters 161, 162, 163, 164, 165 and 166 has to be synchronized with the received signal. This can be done by resetting the counters to prescribed combined sample count responsive to the occurrence of portion of DFS code that repeats from data field to data field, which occurrence is determined from the response of a matched filter. The match filter 148 response to the envelope detector 137 demodulation output signal can be used for resetting the combined sample count from the counters 161, 162, 163, 164, 165 and 166. Alternatively, a match filter for a portion of DFS code that repeats from data field to data field may be arranged to respond to the in-phase (I) output signal from the complex demodulator used to demodulate the currently received signal. This alternative reduces the possibilities of inaccuracies in the synchronization of the combined sample count from the counters 161, 162, 163, 164, 165 and 166.

The filter 214 used in FIGS. 18, 19, 20, 21 for suppressing NTSC artifacts in demodulated ATSC VSB DTV signal can be of various types. U.S. Pat. No. 5,132,797 issued Jul. 21, 1992 to R. W. Citta and entitled "CO-CHANNEL INTERFERENCE FILTER FOR DIGITAL HIGH DEFINITION TELEVISION RECEIVER" describes filtering for reducing artifacts of co-channel interfering NTSC analog television signals in digital television signals converted to baseband. So does U.S. Pat. No. 5,162,900 issued Nov. 10, 1992 to R. W. Citta and entitled "CO-CHANNEL INTERFERENCE FILTER FOR TELEVISION RECEIVER". A comb filter for rejecting the artifacts in baseband symbol coding generates a comb filter response subject to intersymbol distortion. The comb filter response is supplied to an intersymbol interference filter, the response of which provides baseband symbol coding without intersymbol distortion and with reduced NTSC artifacts to the data slicer used to implement symbol decoding. Data slicing results from the data slicer are fed back to the intersymbol interference filter for linear combination with the comb filter response to remove intersymbol distortion before data slicing. This allows the use of a data slicer having 2M amplitude bins or slicing ranges, 2M being the number of levels in baseband symbol coding before comb filtering which generates a (4M−1)-level response. M is a positive integer having a value of four in over-the-air signals transmitted in accordance with the ATSC Digital Television Standard and having a value of eight in cablecast signals transmitted in accordance with that standard.

The Citta apparatus not only requires a delay element in the comb filter, but also requires a corresponding delay element in the intersymbol interference filter. When the delay required of each of these delay elements is only a few symbols, this is not too serious a shortcoming. But comb filtering over several NTSC scan lines is doubly expensive in the costs of delay elements.

U.S. Pat. No. 5,748,266 issued May 5, 1998 to A. L. R. Limberg and entitled "DIGITAL TELEVISION RECEIVER WITH ADAPTIVE FILTER CIRCUITRY FOR SUPPRESSING NTSC CO-CHANNEL INTERFERENCE" describes the response of a comb filter for rejecting the artifacts in baseband symbol coding being supplied directly to a data slicer, with intersymbol interference being corrected for in the data slicing results. A data slicer having (4N−1) amplitude bins or slicing ranges is required when intersymbol interference is corrected for in the data slicing results. The range of amplitude in each of the amplitude bins or slicing ranges of the data slicer is halved compared with the range of amplitude in each of the amplitude bins or slicing ranges of a data slicer used for symbol decoding baseband symbol coding that has not been comb filtered. This reduction in the range of amplitude in each of the amplitude bins or slicing ranges makes error in data slicing owing to NTSC artifacts or noise more likely to occur than in a scheme in which intersymbol interference is corrected for before the data slicer.

The type of filter 214 for suppressing NTSC artifacts that currently is preferred by the inventors is one described by A. L. R. Limberg in a concurrently filed United States patent application Ser. No. 60/089,920 entitled "DTV RECEIVER SYMBOL DECODING CIRCUITRY WITH CO-CHANNEL NTSC ARTIFACTS SUPPRESSION FILTER BEFORE DATA SLICER". FIGS. 26, 27, 28, 29 and 30 accompanying this specification correspond to FIGS. 1, 2, 9, 10 and 11 of Limberg's concurrently filed application except for differences in some of the numbers used for identifying certain elements.

Figure 26:
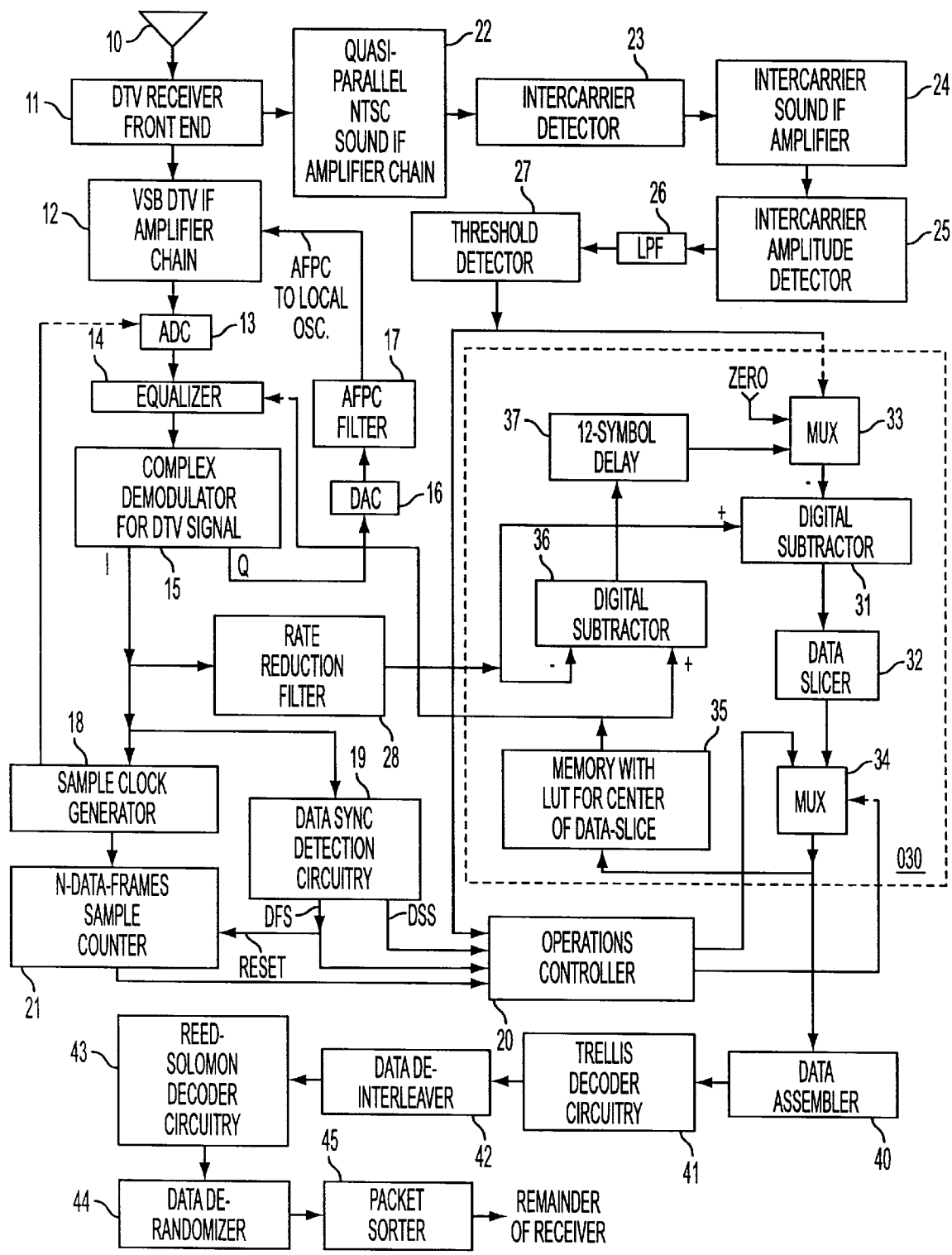
FIG. 26 is a block schematic diagram of a digital television signal receiver including an equalizer for VSB final I-F signal in accordance with the invention, and further including an adaptive co-channel NTSC artifacts suppression filter that uses a revised estimate of NTSC artifacts accompanying symbol code twelve epochs earlier as a preliminary estimate of NTSC artifacts accompanying current symbol code.

FIG. 26 shows portions of a VSB DTV signal receiver including an equalizer for VSB final I-F signal in accordance with the invention, and further including an adaptive co-channel NTSC artifacts suppression filter that uses a revised estimate of NTSC artifacts accompanying symbol code twelve epochs earlier as a preliminary estimate of NTSC artifacts accompanying current symbol code. The FIG. 26 VSB DTV signal receiver is used for recovering error-corrected data, which data are suitable for recording by a digital video cassette recorder or for MPEG-2 decoding and display in a television set. The FIG. 26 VSB DTV signal receiver is shown as receiving television broadcast signals from a receiving antenna 10, but can receive the signals from a cable network instead. The television broadcast signals are supplied as input signal to "front end" electronics 11. The "front end" electronics 11 generally include a radio-frequency amplifier and first detector for converting radio-frequency television signals to intermediate-frequency television signals, supplied as input signal to an intermediate-frequency (I-F) amplifier chain 12 for vestigial-sideband DTV signals. The VSB DTV signal receiver is preferably of plural-conversion type with the I-F amplifier chain 12 including an I-F amplifier for amplifying DTV signals as converted to an ultra-high-frequency band by the first detector, a second detector for converting the amplified DTV signals in the UHF band to a very-high-frequency band, and a further I-F amplifier for amplifying the DTV signals as converted to the VHF band. Since demodulation to baseband is performed in the digital regime, the I-F amplifier chain 12 further includes a third detector for converting the amplified DTV signals to a final intermediate-frequency band closer to baseband for digitization by an analog-to-digital converter 13. Preferably, until such time as NTSC analog television broadcasting is discontinued, the I-F amplifier chain 12 includes filtering for suppressing in its response the frequency-modulated sound carrier of any co-channel interfering analog TV signal. Removing the FM sound carrier of any co-channel interfering analog TV signal in the I-F amplifier chain 12 prevents artifacts of that carrier being generated when the final intermediate-frequency signal is detected to recover baseband symbols and forestalls such artifacts interfering with data-slicing of those baseband symbols during symbol decoding. Using surface-acoustic-wave (SAW) filters and trap filtering in the I-F amplifier chain 12 to prevent the generation of such artifacts reduces their interference with data-slicing of baseband symbols during symbol decoding better than can be accomplished by simple comb-filtering before data-slicing.

The final I-F output signals from the I-F amplifier chain 12 as digitized by the ADC 13 are supplied to equalizer circuitry 14. A complex demodulator 15 demodulates the equalized vestigial-sideband amplitude-modulation DTV signal in the final intermediate-frequency band to recover an I-channel baseband signal by digital in-phase synchronous detection and a Q-channel baseband signal by digital quadrature-phase synchronous detection. The Q-channel baseband signal is converted to analog form by a digital-to-analog converter 16, and the resulting analog signal is filtered by a lowpass filter 17 to develop an automatic frequency and phase control (AFPC) signal for controlling the frequency and phase of a local oscillator developing oscillations for use in the frequency downconversion procedures carried out in the I-F amplifier chain 12. The AFPC of this local oscillator reduces the lower-frequency Q-channel baseband signal samples to arithmetic zero values. The time constant of the lowpass filter 17 is long enough to suppress any oscillatory tendency in the AFPC loop arising from delay in the equalizer circuitry 14. Since delays shorter than 40 microseconds or so are generally of concern, the lowpass filter 17 can have a passband as wide as one or two kilohertz, sufficient to permit the AFPC of a local oscillator with crystal-stabilized natural frequency.

The I-channel baseband signal from the complex demodulator 15 is supplied to a sample clock generator 18 as a synchronizing input signal. The I-channel baseband signal contains a component of signal at half-symbol frequency. This component is selected by finite-impulse-response (FIR) digital bandpass filtering and squared. The squared response is selected by FIR digital bandpass filtering that selects for symbol frequency. Oscillations from a controlled clock oscillator oscillating at a multiple of symbol frequency are frequency divided for comparison to the selected symbol frequency to develop a control signal supplied to the clock oscillator to complete an AFPC loop locking the frequency and phase of the frequency-divided oscillations to the selected symbol frequency. Clock signals from the frequency divider chain in the sample clock generator 18 are supplied to the ADC 13 to time its sampling of the final I-F frequency signal supplied to the ADC 13 from the I-F amplifier chain 12. In order for the sampling of the final I-F frequency signal to be timed so as to minimize intersymbol distortion in the equalized I-channel response, the ADC 13 performs sampling at a multiple of twice symbol rate.

The I-channel baseband signal from the complex demodulator 15 is supplied as input signal to data sync detection circuitry 19. The data sync detection circuitry 19 supplies an operations controller 20 with data segment synchronizing (DSS) signal responsive to a data segment synchronizing code at the beginning of each data segment. The data sync detection circuitry 19 also supplies the operations controller 20 with data field synchronizing (DFS) signal responsive to data field synchronizing code in the first data segment of each data field. A sample counter 21 counts the samples in each data frame, and its count is reset to prescribed values responsive to the DFS signals. The count from the sample counter 21 is supplied to the operations controller 20 to be used for timing certain operations.

The FIG. 26 DTV signal receiver includes circuitry for determining whether or not the I-channel baseband signal from the complex demodulator 15 is accompanied by artifacts of NTSC co-channel interference of sufficient strength as to cause uncorrectable error in data-slicing that signal directly, without further processing. The circuitry for evaluating the strength of the NTSC artifacts is of a general type described in U.S. Pat. No. 5,801,790 issued Sep. 1, 1998 to A. L. R. Limberg and entitled "USING INTERCARRIER SIGNALS FOR DETECTING NTSC INTERFERENCE IN DIGITAL TV RECEIVERS". The DTV signal, as converted to I-F by the DTV receiver "front end" electronics 11, is supplied to an I-F amplifier chain 22 of quasi-parallel type for NTSC sound signals. The amplifier stages in the I-F amplifier chain 22 for NTSC sound signals correspond to similar amplifier stages in the I-F amplifier chain 12 for DTV signals, having substantially linear gain and having the same automatic gain control as the corresponding amplifier stages in the DTV I-F amplifier chain 12. The frequency selectivity of the quasi-parallel I-F amplifier chain 22 is such as to emphasize response within ±250 kHz of NTSC audio carrier and within ±950 kHz or so of NTSC video carrier. The filtering procedures to establish the frequency selectivity of the I-F amplifier chain 22 can be carried out by SAW filtering in a UHF I-F amplifier if plural-conversion receiver circuitry is used. The response of the I-F amplifier chain 22 is supplied to an intercarrier detector 23 which uses the modulated NTSC video carrier as an exalted carrier for heterodyning the NTSC audio carrier to generate intercarrier sound intermediate-frequency signal with a 4.5 MHz carrier frequency. This intercarrier sound I-F signal is amplified by an intercarrier-sound intermediate-frequency amplifier 24, which 4.5 MHz I-F amplifier 24 supplies amplified intercarrier sound I-F signal to an intercarrier amplitude detector 25 followed by a lowpass filter 26 with a long time constant, and the resulting substantially direct voltage response is supplied to a threshold detector 27. The threshold in the threshold detector 27 is exceeded only if the NTSC co-channel interference is of sufficient strength as to cause uncorrectable error in data-slicing The I-channel baseband signal from the complex demodulator 15 is supplied to a rate-reduction filter 28 that supplies samples at symbol rate to an adaptive co-channel NTSC artifacts suppression filter 30 comprising elements 31–37. The rate-reduction filter 28 is preferably designed not to pass zero-frequency component as caused by synchrodyning of the pilot carrier accompanying the VSB DTV signal. The rate-reduction filter 28 response is supplied as minuend input signal to a digital subtractor 31 in the filter 30, which subtractor 31 supplies its difference output signal to a data slicer 32 in the filter 30. A two-input multiplexer 33 in the filter 30 supplies a selected one of its input signals to the subtractor 31 as subtrahend input signal.

Each sample of I-channel baseband signal in the rate-reduction filter 28 response is resolved to eight or more bits and is, in effect, a digital description of an analog symbol exhibiting one of eight levels when over-the-air broadcasts are being received or one of sixteen levels when cablecasts are being received. The I-channel baseband signal is carefully gain-controlled by any one of several known methods, so the ideal step levels for symbols are known. This facilitates operation of the data slicer 32, particularly if data slicing is of the so-called "hard" type in which the boundaries between data slices are immutable. One method of gain control, preferred because the speed of response of such gain control is exceptionally rapid, regulates the direct component of the I-channel baseband signal supplied from the complex demodulator 15 to a normalized level of +1.25 where 2 is the interval between levels of baseband symbol coding. This method of gain control resembles that described by C. B. Patel et alii in U.S. Pat. No. 5,573,454 issued Jun. 3, 1997, entitled "AUTOMATIC GAIN CONTROL OF RADIO RECEIVER FOR RECEIVING DIGITAL HIGH-DEFINITION TELEVISION SIGNALS", and incorporated herein by reference.

When the threshold detector 27 output signal indicates that artifacts of NTSC co-channel interference accompanying baseband symbol code in the rate-reduction filter 28 response are insubstantial and unlikely to affect data-slicing results, the multiplexer 33 is conditioned to reproduce its first input signal, a wired arithmetic zero, as its output signal which is supplied to the digital subtractor 31 as subtrahend input signal. Accordingly, the rate-reduction filter 28 response received as minuend input signal by the subtractor 31 is reproduced in its difference signal supplied to the data-slicer 32. The data-slicer 32 supplies 3-parallel-bit groups as symbol decoding results as first input signal to a two-input multiplexer 34.

When the threshold detector 27 output signal indicates that artifacts of NTSC co-channel interference accompanying baseband symbol code in the rate-reduction filter 28 response are substantial and likely to affect data-slicing results, the multiplexer 33 is conditioned to reproduce its second input signal in its output signal supplied to the digital subtractor 31 as subtrahend input signal. The second input signal of the multiplexer 33 is a predicted estimate of the current value of the artifact of NTSC co-channel interference accompanying baseband symbol code in the rate-reduction filter 28 response, which the subtractor 31 subtracts from the rate-reduction filter 28 response it receives as minuend input signal. The difference signal from the subtractor 31 comprises baseband symbol code with substantially no accompanying artifacts of NTSC co-channel interference and is supplied to the data-slicer 32 as its input signal. The difference signal from the subtractor 31 is supplied to the equalizer circuitry 14 for analysis to determine the changes that should be made in the weighting coefficients of its component filters, so that artifacts of NTSC co-channel interference have reduced effect on equalization.

During data portions of all data segment segments except the initial ones of data fields the operations controller 20 responds to the sample count from the counter 21 to condition the multiplexer 34 to reproduce as its output signal the symbol decoding results from the data-slicer 32 supplied to the multiplexer 34 as its first input signal. At times that the data sync detection circuitry 19 should detect data field synchronization information DFS or data segment synchronization information DSS, the operations controller 20 responds to the sample count from the counter 21 to condition the multiplexer 34 to reproduce as its output signal a second input signal supplied to the multiplexer 34 from read-only memory (ROM) within the operations controller 20. This second input signal to the multiplexer 34 comprises the correct values of data field synchronization code in the initial data segment of the data field and the correct values of data segment synchronization code in each and every data segment. When the threshold detector 27 output signal indicates that artifacts of NTSC co-channel interference accompanying baseband symbol code in the rate-reduction filter 28 response are substantial and are likely to affect data-slicing results, conditioning the multiplexer 34 to reproduce correct values of DFS and DSS codes in its output signal curtails running errors in the final symbol decoding results that the multiplexer 34 supplies to the data assembler 40, which running errors may arise owing to inaccurate estimates of the artifacts accompanying baseband symbol code in the rate-reduction filter 28 response.

The output signal from the multiplexer 34, which comprises the final symbol decoding results in 3-parallel-bit groups, are assembled by a data assembler 40 for application to trellis decoder circuitry 41. Trellis decoder circuitry 41 conventionally employs twelve trellis decoders. The trellis decoding results are supplied from the trellis decoder circuitry 41 to convolutional de-interleaver circuitry 42. Circuitry 42 supplies bytes of Reed-Solomon error-correction coding to Reed-Solomon decoder circuitry 43, which performs Reed-Solomon decoding to generate an error-corrected byte stream supplied to a data de-randomizer 44. Elements 20, 34, and 40–44 are contributory to the circuitry for extracting error-corrected symbol decoding results responsive to the groups of bits the data slicer supplies as data slicing results. The data de-randomizer 44 supplies reproduced data to a data packet sorter 45 which directs each successively received data packet to an appropriate portion of the remainder (not shown) of the receiver. The remainder of a DTV signal receiver in a television set will include an audio decoder, an MPEG-2 decoder and so forth. The remainder of a DTV signal receiver incorporated in a digital tape recorder/reproducer will include circuitry for converting the data to a form for recording.

In FIG. 26 the predicted estimate of the artifacts currently accompanying baseband symbol code in the rate-reduction filter 28 response is based on a revised estimate of the artifacts of NTSC co-channel interference accompanying a baseband symbol twelve symbol epochs earlier. The symbol decoding results supplied from the multiplexer 34 address a memory 35 storing a look-up table of the center values for data slices. A digital subtractor 36 receives the rate-reduction filter 28 response as minuend input signal. Responsive to the current three-bit symbol decoding result from the multiplexer 34, the memory 35 supplies the subtractor 36 as its subtrahend input signal the center value of the data slice that the input signal to the data-slicer 32 is assumed to be in. The difference output signal from the subtractor 36 is a revised estimate of the artifacts currently accompanying baseband symbol code in the rate-reduction filter 28 response. This revised estimate does not affect the data-slicing results already supplied by the data-slicer 32, but is saved for use as a predicted estimate of the artifacts accompanying baseband symbol code in the rate-reduction filter 28 response twelve symbol epochs later. That is, the difference output signal from the subtractor 36 is applied to delay circuitry 37 for delaying that signal twelve symbol epochs before application as second input signal to the multiplexer 33. For example, a shift register clocked at symbol rate can provide the delay circuitry 37.

Figure 27:
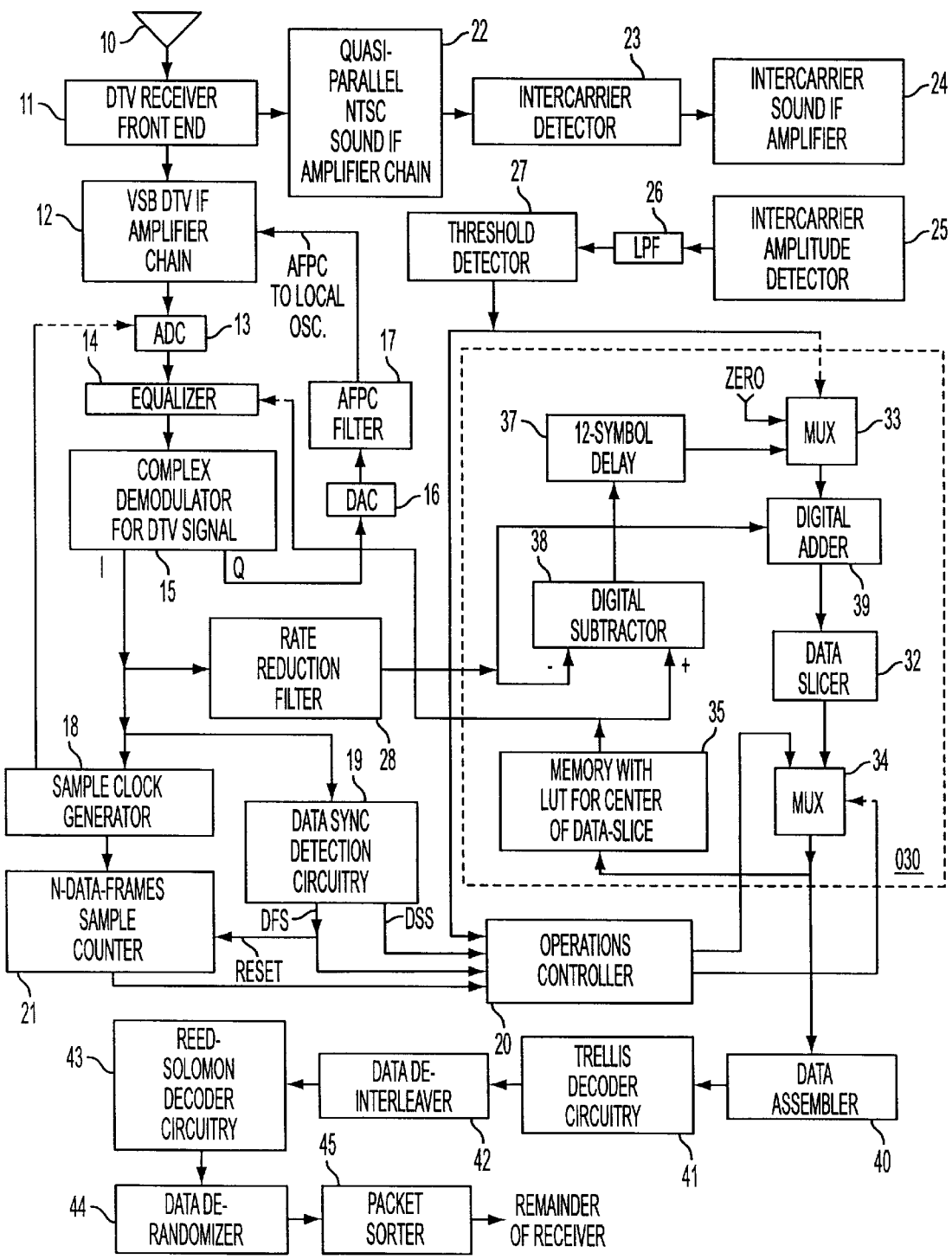
FIG. 27 is a block schematic diagram of an equivalent of the FIG. 26 DTV signal receiver using a somewhat different adaptive co-channel NTSC artifacts suppression filter.

FIG. 27 shows an equivalent of the FIG. 26 DTV signal receiver, in which the adaptive co-channel NTSC artifacts suppression filter 30 is replaced by an adaptive co-channel NTSC artifacts suppression filter 038. Filter 030 differs from filter 30 in that the subtractor 36 is replaced by a subtractor 38, and in that the subtractor 31 is replaced by a two-input digital adder 39. The rate-reduction filter 28 response is applied to the subtractor 38 as subtrahend input signal, rather than as minuend input signal, and the best estimate of currently transmitted signal is supplied from the ROM 35 to the subtractor 38 as minuend input signal, rather than as subtrahend input signal. The difference output response of the subtractor 38 is applied to the delay circuitry 37, which delays that signal twelve symbol epochs before application as second input signal to the multiplexer 33. The rate-reduction filter 28 response and the prediction of current NTSC artifact supplied by the multiplexer 33 are applied as summand input signals to the adder 39. The sum output response of the adder 39 is applied to the data slicer 32 as its input signal.

Figure 28:
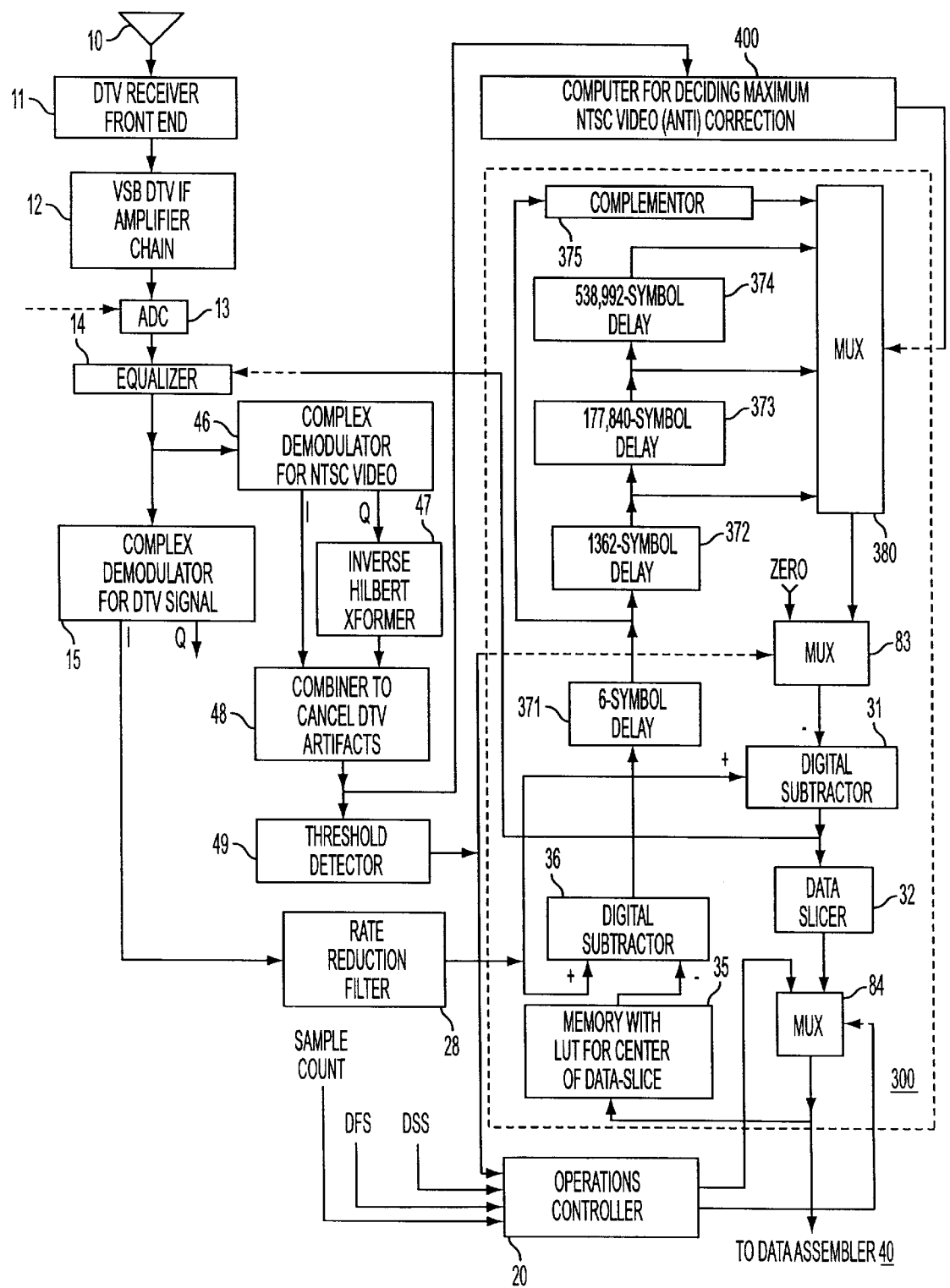
FIG. 28 is a block schematic diagram of a digital television signal receiver including an equalizer for VSB final I-F signal in accordance with the invention, and further including an adaptive co-channel NTSC artifacts suppression filter that uses a revised estimate of NTSC artifacts accompanying symbol code a selected number of symbol epochs earlier as a preliminary estimate of NTSC artifacts accompanying current symbol code.

FIG. 28 shows a DTV signal receiver in which the data-slicer is preceded by an adaptive co-channel NTSC artifacts suppression filter 300 that uses a revised estimate of NTSC artifacts accompanying symbol code a selected number of symbol epochs earlier as a preliminary estimate of NTSC artifacts accompanying current symbol code. The filter 300 differs from the adaptive co-channel NTSC artifacts suppression filter 30 in the FIG. 26 DTV signal receiver in the way that the revised estimate of current NTSC artifacts supplied from the subtractor 36 is applied to the multiplexer 33. In the FIG. 26 DTV signal receiver the predicted estimate can be founded on a revised estimate from six symbol epochs earlier, from 1368 symbol epochs earlier, from 179,208 symbol epochs earlier, or from 718,200 symbol epochs earlier. The revised estimate of NTSC artifact accompanying a current symbol is generated by the digital subtractor 36. This revised estimate is delayed 718,200 symbol epochs by the cascaded six-symbol-epoch delay circuitry 371, 1362-symbol-epoch delay circuitry 372, 177,840-symbol-epoch delay circuitry 373 and 538,992-symbol-epoch delay circuitry 374 to generate a predicted estimate of NTSC artifact accompanying the 718,200$^{th}$ symbol after the current symbol. This revised estimate is delayed 179,208 symbol epochs by the cascaded six-symbol-epoch delay circuitry 371, 1362-symbol-epoch delay circuitry 372 and 177,840-symbol-epoch delay circuitry 373 to generate a predicted estimate of NTSC artifact accompanying the 179,208$^{th}$ symbol after the current symbol. The revised estimate of NTSC artifact accompanying a current symbol is delayed 179,208 symbol epochs by the cascaded six-symbol-epoch delay circuitry 371 and 1362-symbol-epoch delay circuitry 372 to generate a predicted estimate of NTSC artifact accompanying the 1368$^{th}$ symbol after the current symbol. The revised estimate of NTSC artifact accompanying a current symbol is delayed six symbol epochs by the six-symbol-epoch delay circuitry 371 and the six-symbol-epoch-delayed revised estimate is complemented by a complementor 375 to generate a predicted estimate of NTSC artifact accompanying the sixth symbol after the current symbol. A multiplexer 380 receives the predicted estimates of NTSC artifact accompanying the current symbol as generated six and 1368 and 179,208 and 718,200 symbol epochs earlier. The multiplexer 380 is controlled by multiplexer control signals from a special-purpose computer 400 to select one of these predicted estimates as first input signal for the multiplexer 33. Selection is done according to which estimate is determined least likely to be in error, which determination the computer 400 makes based on baseband NTSC video signal correlation measurements.

The response of the equalizer circuitry 14 is supplied to a complex demodulator 46 that demodulates the equalized vestigial-sideband amplitude-modulation NTSC signal in the final intermediate-frequency band to recover an I-channel baseband video signal by digital in-phase synchronous detection and a Q-channel baseband video signal by digital quadrature-phase synchronous detection. The quadrature NTSC video signal should be zero-valued, but will not be, owing to the presence of co-channel DTV interfering signal and the single-sideband character of higher frequency components of the composite video signal. There is also co-channel DTV interfering signal present in the in-phase NTSC video signal, which should be removed so baseband NTSC video signal correlation measurements will not be affected by the co-channel DTV interference. The NTSC complex demodulator 46 supplies quadrature NTSC video signal to a digital filter 47 having inverse Hilbert transform response to that signal. The filter 47 response is linearly combined with the in-phase NTSC video signal in a linear combiner 48 comprising a digital adder (or subtractor) so as to suppress co-channel DTV interference in a filtered in-phase NTSC video signal that the combiner 48 supplies to a threshold detector 49 and to the computer 400. The bandwidth of this filtered in-phase NTSC video signal is about 750 kilohertz, being attributable to those components of the NTSC co-channel interfering signal that are double sideband in nature.

The threshold detector 27 of the FIG. 26 VSB DTV signal receiver is replaced in the FIG. 28 DTV signal receiver by the threshold detector 49 responding to the filtered in-phase NTSC video signal. When the in-phase NTSC video signal from the combiner 48 is of a level sufficient to generate artifacts that cause significant error during data slicing of DTV signals, the threshold detector 49 supplies the multiplexer 93 a control signal that conditions the multiplexer 93 for supplying predicted estimates of NTSC artifact levels to the subtractor 91 as subtrahend signal. When the in-phase NTSC video signal from the combiner 48 is of a lesser level, the threshold detector 49 supplies the multiplexer 93 a control signal that conditions the multiplexer 93 to supply a zero-valued subtrahend signal to the subtractor 91.

The complex demodulator 15 for DTV signal advantageously uses complex digital carrier generated from sine/cosine look-up tables stored in read-only memory, using techniques of the sort first described by C. B. Patel et alii in U.S. Pat. No. 5,479,449 issued Dec. 15, 1995 and entitled "DIGITAL VSB DETECTOR WITH BANDPASS PHASE TRACKER, AS FOR INCLUSION IN AN HDTV RECEIVER". The complex demodulator 46 for NTSC signal generates complex NTSC video carrier in the analog regime and then digitizes it, since it is impractical to generate this complex carrier from sine/cosine look-up tables stored in read-only memory in addition to the complex digital carrier for DTV demodulation.

Figure 29:
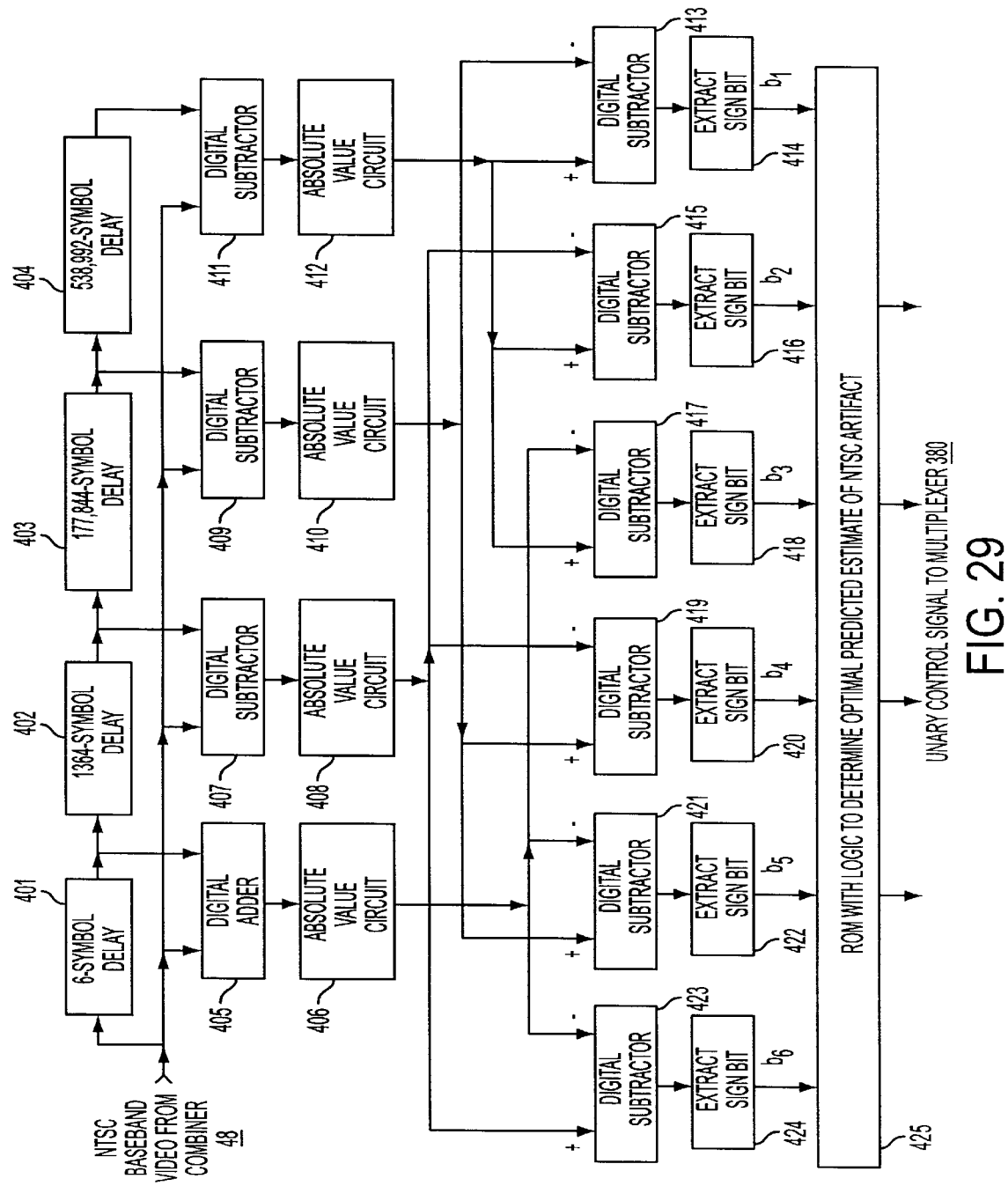
FIG. 29 is a block schematic diagram showing in greater detail a computer for selecting which of various revised estimates of NTSC artifacts accompanying previous symbol code digital television signal receiver is to be used in the FIG. 28 DTV signal receiver as a preliminary estimate of NTSC artifacts accompanying current symbol code.

FIG. 29 shows in detail a possible construction for the computer 400. The filtered in-phase NTSC video signal from the combiner 48 is supplied to a cascade connection of six-symbol-epoch delay circuitry 401, 1362-symbol-epoch delay circuitry 402 and 177,840-symbol-epoch delay circuitry 403 and 538,992-symbol-epoch delay circuitry 404. A digital adder 405 sums the response of the delay circuitry 401 with the filtered in-phase NTSC video signal from the combiner 48, and an absolute value circuit 406 responds to the resulting sum to generate a measure of the lack of anticorrelation of NTSC co-channel interference in symbols six symbol epochs apart. A digital subtractor 407 differentially combines the response of the delay circuitry 402 with the filtered in-phase NTSC video signal from the combiner 48, and an absolute value circuit 408 responds to the resulting difference to generate a measure of the lack of correlation of NTSC co-channel interference in symbols 1368 symbol epochs apart. Another digital subtractor 409 differentially combines the response of the delay circuitry 403 with the filtered in-phase NTSC video signal from the combiner 48, and an absolute value circuit 410 responds to the resulting difference to generate a measure of the lack of correlation of NTSC co-channel interference in symbols 179,208 symbol epochs apart. Yet another digital subtractor 411 differentially combines the response of the delay circuitry 404 with the filtered in-phase NTSC video signal from the combiner 48, and an absolute value circuit 412 responds to the resulting difference to generate a measure of the lack of correlation of NTSC co-channel interference in symbols 718,200 symbol epochs apart.

A digital subtractor 413 receives the response of the absolute value circuit 412 as subtrahend input signal, receives the response of the absolute value circuit 410 as minuend input signal, and has wiring 414 to extract the sign bit of its difference signal. This sign bit is supplied to a read-only memory 425 as a first bit $b_1$ of its address input. The bit $b_1$ is a logic ONE when the correlation of NTSC co-channel interference in symbols 718,200 symbol epochs apart is higher than the correlation of NTSC co-channel interference in symbols 179,208 symbol epochs apart, and is a logic ZERO when the correlation of NTSC co-channel interference in symbols 718,200 symbol epochs apart is lower than or equal to the correlation of NTSC co-channel interference in symbols 179,208 symbol epochs apart.

A digital subtractor 415 receives the response of the absolute value circuit 412 as subtrahend input signal, receives the response of the absolute value circuit 408 as minuend input signal, and has wiring 416 to extract the sign bit of its difference signal. This sign bit is supplied to the read-only memory 425 as a second bit $b_2$ of its address input. The bit $b_2$ is a logic ONE when the correlation of NTSC co-channel interference in symbols 718,200 symbol epochs apart is higher than the correlation of NTSC co-channel interference in symbols 1368 symbol epochs apart, and is a logic ZERO when the correlation of NTSC co-channel interference in symbols 718,200 symbol epochs apart is lower than or equal to the correlation of NTSC co-channel interference in symbols 1368 symbol epochs apart.

A digital subtractor 417 receives the response of the absolute value circuit 412 as subtrahend input signal, receives the response of the absolute value circuit 406 as minuend input signal, and has wiring 418 to extract the sign bit of its difference signal. This sign bit is supplied to the read-only memory 425 as a third bit $b_3$ of its address input. The bit $b_3$ is a logic ONE when the correlation of NTSC co-channel interference in symbols 718,200 symbol epochs apart is higher than the anticorrelation of NTSC co-channel interference in symbols six symbol epochs apart, and is a logic ZERO when the correlation of NTSC co-channel interference in symbols 718,200 symbol epochs apart is lower than or equal to the anticorrelation of NTSC co-channel interference in symbols six symbol epochs apart.

A digital subtractor 419 receives the response of the absolute value circuit 410 as subtrahend input signal, receives the response of the absolute value circuit 408 as minuend input signal, and has wiring 420 to extract the sign bit of its difference signal. This sign bit is supplied to the read-only memory 425 as a fourth bit $b_4$ of its address input. The bit $b_4$ is a logic ONE when the correlation of NTSC co-channel interference in symbols 179,208 symbol epochs apart is higher than the correlation of NTSC co-channel interference in symbols 1368 symbol epochs apart, and is a logic ZERO when the correlation of NTSC co-channel interference in symbols 179,208 symbol epochs apart is lower than or equal to the correlation of NTSC co-channel interference in symbols 1368 symbol epochs apart.

A digital subtractor 421 receives the response of the absolute value circuit 410 as subtrahend input signal, receives the response of the absolute value circuit 406 as minuend input signal, and has wiring 422 to extract the sign bit of its difference signal. This sign bit is supplied to the read-only memory 425 as a fifth bit $b_5$ of its address input. The bit $b_5$ is a logic ONE when the correlation of NTSC co-channel interference in symbols 179,208 symbol epochs apart is higher than the anticorrelation of NTSC co-channel interference in symbols six symbol epochs apart, and is a logic ZERO when the correlation of NTSC co-channel interference in symbols 179,208 symbol epochs apart is lower than or equal to the anticorrelation of NTSC co-channel interference in symbols six symbol epochs apart.

A digital subtractor 423 receives the response of the absolute value circuit 408 as subtrahend input signal, receives the response of the absolute value circuit 406 as minuend input signal, and has wiring 424 to extract the sign bit of its difference signal. This sign bit is supplied to the read-only memory 425 as a sixth bit $b_6$ of its address input. The bit $b_6$ is a logic ONE when the correlation of NTSC co-channel interference in symbols 1368 symbol epochs apart is higher than the anticorrelation of NTSC co-channel interference in symbols six symbol epochs apart, and is a logic ZERO when the correlation of NTSC co-channel interference in symbols 1368 symbol epochs apart is lower than or equal to the anticorrelation of NTSC co-channel interference in symbols six symbol epochs apart.

The read-only memory 425 stores the look-up tables for logic to determine the optimal predicted estimate of NTSC artifact accompanying a current symbol and generates a 4-bit-wide unary code for controlling the multiplexer 380 of FIGS. 9 and 11. The unary code from read-only memory 425 has a value 1000 as an AND response to $b_3$, $b_2$, and $b_1$. The unary code from read-only memory 425 has a value 0100 as an AND response to $b_5$, $b_4$, and the complement of $b_2$. The unary code from read-only memory 425 has a value 0010 as an AND response to $b_6$, the complement of $b_4$, and the complement of $b_2$. The unary code from read-only memory 425 has a value 0001 an AND response to the complements of $b_6$, $b_5$, and $b_3$—that is, as a NOR response to $b_6$, $b_5$, and $b_3$.

Figure 30:
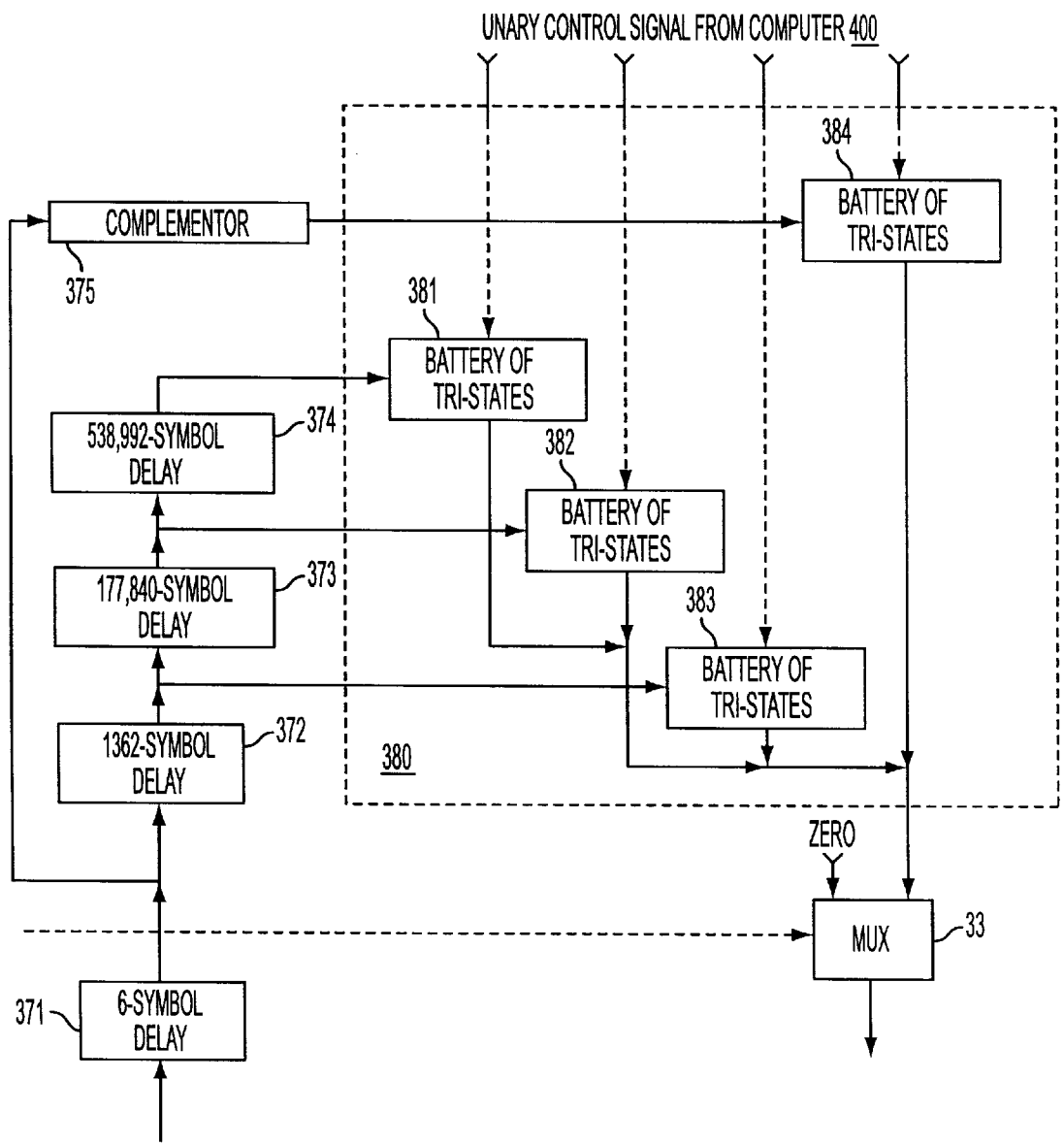
FIG. 30 is a block schematic diagram showing in greater detail the connections of a multiplexer used in the FIG. 28 DTV signal receiver.

FIG. 30 shows in detail the construction and connections of the multiplexer 380 controlled by the 4-bit-wide unary code generated by the ROM 425. A battery 381 of tri-state circuits, one for each bit in the output signal of the delay circuit 374, asserts the output signal of the delay circuit 374 on the output connection from the multiplexer 380 responsive to the 4-bit-wide unary code generated by the ROM 425 having the value 1000. A battery 382 of tri-state circuits, one for each bit in the output signal of the delay circuit 373, asserts the output signal of the delay circuit 373 on the output connection from the multiplexer 380 responsive to the 4-bit-wide unary code generated by the ROM 425 having the value 0100. A battery 383 of tri-state circuits, one for each bit in the output signal of the delay circuit 372, asserts the output signal of-the delay circuit 372 on the output connection from the multiplexer 380 responsive to the 4-bit-wide unary code generated by the ROM 425 having the value 0010. A battery 384 of tri-state circuits, one for each bit in the output signal of the complementor 375, asserts the output signal of the complementor 375 on the output connection from the multiplexer 380 responsive to the 4-bit-wide unary code generated by the ROM 425 having the value 0001.

For portions of the NTSC signal which do not exhibit change over several frames, such as the synchronizing portions of the signal which cause the strongest co-channel interference artifacts in the baseband DTV signal, the optimal predicted estimate of NTSC artifact accompanying a current symbol will often be determined to be the revised estimate from 718,200 symbol epochs before—that is, two NTSC frames previous. If there is noise accompanying the received DTV signal, the optimal predicted estimate of NTSC artifact accompanying a symbol occurring during synchronizing portions of the NTSC signal may be the revised estimate from 179,208 symbol epochs before (that is, 262 NTSC scan lines previous) or from 1368 symbol epochs before (that is, two NTSC scan lines previous). For portions of the NTSC signal which describe changing image, the optimal predicted estimate of NTSC artifact accompanying a current symbol will usually be determined to be the revised estimate from 718,200 symbol epochs before (that is, 262 NTSC scan lines previous), from 1368 symbol epochs before (that is, two NTSC scan lines previous) or from six symbol epochs before.

Modifications of the apparatus described above with reference to FIGS. 27–30 will readily occur to one skilled in the art of television receiver design and acquainted with the foregoing disclosure. For example, the apparatus can be modified so estimates from 718,200 symbol epochs before are not depended on, in order to save the considerable amount of memory associated with the 538,992-symbol-epoch delay circuitry 374 in FIG. 28 and the 538,992-symbol-epoch delay circuitry 404 in FIG. 29. The co-channel NTSC signal as recovered by the combiner 48 can be analyzed to determine when vertical synchronization intervals occur therein and, during horizontal retrace intervals in the NTSC signal, estimates from a prescribed even number (e.g., 30 or 264) of horizontal scan lines before can be chosen so as to ensure cancellation of chroma burst. The apparatus of FIGS. 27–30 can be modified to use estimates from twelve symbol epochs in the past rather than, or in addition to, using estimates from six symbol epochs in the past.

The binary numbers used to identify each of the amplitude bins or slicing ranges can be chosen to eliminate the need for the read-only memory 35 in certain embodiments of the invention. Suitable AGC and biasing of the rate-reduction filter 28 response is necessary, and the subtractor 36 structure may need to accommodate non-conventional arithmetic.

The description of FIGS. 26–28 presumes the data slicer 32 in the filters to suppress NTSC artifacts to be of a "hard" type operating with fixed boundaries on data slices. Alternatively, the filter to suppress NTSC artifacts can employ a data slicer of "soft" type operating with boundaries on data slices that can be adjusted based on the histogram of recently received symbol coding. In such filter to suppress NTSC artifacts the memories 35 are of programmable read-only memory type and are re-loaded with new center-of-data-slice entries as the boundaries of the data slices are adjusted.

What is claimed is:

1. In a radio receiver for receiving a modulated signal, said modulated signal being transmitted by a respective transmitter in a respective channel of a prescribed bandwidth, combination comprising:

means for down-converting a frequency of the modulated signal to a final intermediate-frequency band;

analog-to-digital conversion circuitry for digitizing samples of said modulated signal as translated to said intermediate-frequency band, thereby to generate a digitized final intermediate-frequency signal;

an equalizer including adaptive digital filtering with adjustable filter coefficients, connected for supplying an equalizer response to said digitized final intermediate-frequency signal;

a demodulator for demodulating said equalizer response to said modulated signal as translated to said final intermediate-frequency band and digitized, thereby to provide demodulation results; and equalizer control apparatus for comparing at least a portion of said digitized final intermediate-frequency signal with ideal values therefor to generate comparison results and for determining from said comparison results the adjustable filter coefficients of said adaptive digital filtering included in said equalizer.

2. The combination of claim 1, further comprising:

circuitry responsive to said demodulation results for generating an estimate of the modulating signal actually used for transmitting the modulated signal as currently received;

modulation apparatus, for modulating an intermediate-frequency carrier responsive to said estimate of the modulating signal actually used for transmitting said modulated signal as currently received, thereby to generate said ideal values of said digitized intermediate-frequency signal; and decision-feedback error-detection circuitry included within said equalizer control apparatus for differentially comparing said digitized intermediate-frequency signal as included in delayed said equalizer response with said ideal values of said digitized intermediate-frequency signal to generate said comparison results.

3. The combination of claim 1, wherein said modulated signal has recurrent portions that transmit a prescribed training signal, and wherein said equalizer control apparatus comprises:

a register for storing portions of said modulated signal as translated to said final intermediate-frequency band and extracted from said digitized final intermediate-frequency signal during said recurrent portions of said modulated signal that transmit said prescribed training signal, which stored portions are modulated in accordance with said prescribed training signal and are accompanied at times by multipath distortion; and computation apparatus for calculating the discrete Fourier transform of said portions of said modulated signal as translated to said final intermediate-frequency band and stored in said register with any accompanying multipath distortion thereof, dividing that said discrete Fourier transform by the discrete Fourier transform of multipath-free prescribed training signal to obtain a discrete Fourier transform characterizing the channel through which said modulated signal is received, and calculating the adjustable filter coefficients of said adaptive digital filtering from said discrete Fourier transform characterizing said channel through which said modulated signal is received.

4. In a radio receiver for receiving a modulated signal, which modulated signal is transmitted from a transmitter, said modulated signal being in a channel of a prescribed bandwidth, a combination comprising:

means for down-converting a frequency of a modulated signal to a final intermediate-frequency band;

analog-to-digital conversion circuitry for digitizing samples of said modulated signal as translated to said final intermediate-frequency band, thereby to generate a digitized final intermediate-frequency signal;

an equalizer including adaptive digital filtering with adjustable filter coefficients, connected for supplying an equalizer response to said digitized final intermediate-frequency signal;

a demodulator for demodulating said equalizer response to said modulated signal as translated to said intermediate-frequency band and digitized, thereby to provide demodulation results;

circuitry responsive to said demodulation results for generating an estimate of the actual modulating signal used in the transmitted signal;

a modulator for modulating a locally generated carrier in accordance with said estimate of the actual modulating signal used in the transmitted signal for generating a comparison signal in said final intermediate-frequency band;

error detection circuitry to compare said equalizer response with said comparison signal for generating a decision feedback signal; and filter coefficient computation apparatus responsive to said decision feedback signal for adjusting the adjustable filter coefficients of said adaptive digital filtering included in said equalizer.

5. The combination of claim 4, wherein said analog-to-digital conversion circuitry essentially consists of a single analog-to-digital converter for supplying real digital samples of said digitized intermediate-frequency signal, said combination further comprising a phase-splitter connected to receive said equalizer response as an input signal, to supply a stream of imaginary digital samples of said equalizer response to said demodulator, and to supply a stream of real digital samples of said equalizer response to said demodulator.

6. The combination of claim 5, wherein said adaptive digital filtering included in said equalizer comprises:

a digital subtractor for differentially combining a subtrahend input signal with a minuend input signal to generate said equalizer response as a difference output signal from said digital subtractor;

a first finite-impulse-response digital filter with adjustable filter coefficients for providing said minuend input signal to said digital subtractor in response to said digitized intermediate-frequency signal supplied from said analog-to-digital conversion circuitry; and a second finite-impulse-response digital filter with adjustable filter coefficients for providing said subtrahend input signal to said digital subtractor in response to said difference output signal from said digital subtractor.

7. The combination of claim 5, wherein said adaptive digital filtering included in said equalizer comprises:

a digital subtractor for differentially combining a subtrahend input signal with a minuend input signal to generate said equalizer response as a difference output signal from said digital subtractor;

a first finite-impulse-response digital filter with adjustable filter coefficients for providing said minuend input signal to said digital subtractor in response to said digitized intermediate-frequency signal supplied from said analog-to-digital conversion circuitry; and a second finite-impulse-response digital filter with adjustable filter coefficients for providing said subtrahend input signal to said digital subtractor in response to said comparison signal.

8. The combination of claim 4, wherein said analog-to-digital conversion circuitry essentially consists of a single analog-to-digital converter for supplying real digital samples of said digitized intermediate-frequency signal, and wherein said adaptive digital filtering included in said equalizer comprises:

a digital subtractor for differentially combining a subtrahend input signal with a minuend input signal to generate a difference output signal, said minuend input signal being said digitized intermediate-frequency signal generated by said analog-to-digital conversion circuitry;

a first finite-impulse-response digital filter with adjustable filter coefficients for providing said subtrahend input signal to said digital subtractor in response to said difference output signal therefrom; and a second finite-impulse-response digital filter with adjustable filter coefficients, said second finite-impulse-response digital filter responsive to said difference output signal of said digital subtractor for providing a stream of real samples of said equalizer response.

9. The combination of claim 8, further comprising:

a third finite-impulse-response digital filter with adjustable filter coefficients, said third finite-impulse-response digital filter responsive to said difference output signal of said digital subtractor for providing a stream of imaginary samples of said equalizer response supplied to said demodulator together with said stream of real samples of said equalizer response.

10. The combination of claim 4, wherein said tuner circuitry is of a type including a complex mixer for supplying respective streams of real and imaginary samples of said modulated signal down-converted in frequency to said final intermediate-frequency band, wherein said analog-to-digital conversion circuitry includes a first analog-to-digital converter for digitizing real samples of said modulated signal as translated to said final intermediate-frequency band to generate a first analog-to-digital converter response, wherein said analog-to-digital conversion circuitry further includes a second analog-to-digital converter for digitizing imaginary samples of said modulated signal as translated to said final intermediate-frequency band to generate a second analog-to-digital converter response, and wherein said equalizer comprises:

a first digital subtractor for differentially combining a first subtrahend input signal with a first minuend input signal to generate, as a first difference output signal from said first digital subtractor, real samples of said equalizer response supplied to said demodulator;

a first finite-impulse-response digital filter with adjustable filter coefficients for providing said first minuend input signal to said first digital subtractor in response to said first analog-to-digital converter response;

a second finite-impulse-response digital filter with adjustable filter coefficients for providing said first subtrahend input signal as its response;

a second digital subtractor for differentially combining a second subtrahend input signal with a second minuend input signal to generate, as a second difference output signal from said second digital subtractor, imaginary samples of said equalizer response supplied to said demodulator;

a third finite-impulse-response digital filter with adjustable filter coefficients for providing said second minuend input signal to said second digital subtractor in response to said second analog-to-digital converter response; and a fourth finite-impulse-response digital filter with adjustable filter coefficients for providing said second subtrahend input signal as its response.

11. The combination of claim 10, wherein said second finite-impulse-response digital filter responds to said first difference output signal for providing said first subtrahend input signal, and wherein said fourth finite-impulse-response digital filter responds to said second difference output signal for providing said second subtrahend input signal.

12. The combination of claim 10, wherein said second finite-impulse-response digital filter responds to said comparison signal for providing said first subtrahend input signal, and wherein said fourth finite-impulse-response digital filter responds to said second difference output signal for providing said second subtrahend input signal.

13. The combination of claim 10, wherein said second finite-impulse-response digital filter responds to real samples of said comparison signal for providing said first subtrahend input signal, and wherein said fourth finite-impulse-response digital filter responds to imaginary samples of said comparison signal for providing said second subtrahend input signal.

14. The combination of claim 4, further comprising:
circuitry for selecting portions of said modulated signal as translated to said final intermediate-frequency band and digitized, said selected portions being portions that have a known pattern of modulation when equalized to suppress multipath distortion; and
circuitry for combining the selected portions of said modulated signal as translated to said final intermediate-frequency band and digitized, thereby to generate a passband training signal supplied to said filter coefficient computation apparatus for determining the adjustable filter coefficients of said adaptive digital filtering included in said equalizer.

15. In a radio receiver for receiving a quadrature-amplitude-modulation signal transmitted in a radio-frequency band from a quadrature-amplitude-modulation transmitter, said modulated signal being in a channel of a prescribed bandwidth, the combination comprising:
means for translating a frequency of said quadrature-amplitude-modulation signal from an intermediate frequency band to a final intermediate-frequency band;
analog-to-digital conversion circuitry for digitizing samples of said quadrature-amplitude-modulation signal as translated to said final intermediate-frequency band, thereby to generate a digitized final intermediate-frequency signal;

an equalizer including adaptive digital filtering with adjustable filter coefficients, connected for supplying an equalizer response to said digitized final intermediate-frequency signal;

a complex demodulator connected for demodulating said equalizer response, thereby to provide demodulation results that include an in-phase baseband signal and a quadrature-phase baseband signal, circuitry responsive to said in-phase baseband signal and a quadrature-phase baseband signal for generating estimates of in-phase and quadrature-phase components of complex modulating signal at the transmitter of the quadrature-amplitude-modulation signal currently being received;

a quadrature-amplitude-modulation modulator for amplitude-modulating a locally generated carrier in accordance with said estimates of in-phase and quadrature-phase components of complex modulating signal, thereby to generate a comparison quadrature-amplitude-modulation signal;

an error detector for comparing said comparison quadrature-amplitude-modulation signal with said equalizer response, as suitably delayed, to generate a decision-feedback signal; and filter coefficient computation apparatus responsive to said decision-feedback signal for adjusting the adjustable filter coefficients of said adaptive digital filtering included in said equalizer.

16. The combination of claim 15, wherein said analog-to-digital conversion circuitry essentially consists of a single analog-to-digital converter for supplying real digital samples of said digitized intermediate-frequency signal, and wherein said in-phase baseband signal and said quadrature-phase baseband signal are supplied at the full sampling rate of said analog-to-digital converter, said combination further comprising:

a phase-splitter responsive to said equalizer response for supplying said complex demodulator with a stream of imaginary samples of said equalizer response and with a stream of real samples of said equalizer response;

a first rate-reduction filter for supplying a symbol-rate first rate-reduction filter response to said in-phase baseband signal;

a first quantizer responsive to said symbol-rate first rate-reduction filter response to in-phase baseband signal for supplying, as a first quantizer response, a quantized in-phase baseband signal that estimates the in-phase component of said complex modulating signal at the transmitter of the quadrature-amplitude-modulation signal currently being received;

a first sampler for re-sampling said first quantizer response to said full sampling rate;

a second rate-reduction filter for supplying a symbol-rate second rate-reduction filter response to said quadrature-phase baseband signal;

a second quantizer responsive to said symbol-rate second rate-reduction filter response to said quadrature-phase baseband signal for supplying, as a second quantizer response, a quantized quadrature-phase baseband signal that estimates the quadrature-phase component of said complex modulating signal at the transmitter of the quadrature-amplitude-modulation signal currently being received; and a second sampler for re-sampling said second quantizer response to said full sampling rate.

17. The combination of claim 16, wherein said quadrature-amplitude-modulation modulator comprises:
- a first balanced modulator for modulating the amplitude of an in-phase digital carrier in accordance with said first quantizer response as re-sampled to said full sampling rate, thereby to generate a first balanced modulator output signal;
- a second balanced modulator for modulating the amplitude of a quadrature-phase digital carrier in accordance with said second quantizer response as re-sampled to said full sampling rate, thereby to generate a second balanced modulator output signal;
- a first digital adder for combining said first and said second modulator output signals to generate a sum signal; and
- a bandpass digital filter responsive to said sum signal for supplying said comparison quadrature-amplitude-modulation signal.

18. The combination of claim 17, wherein said equalizer comprises:
- a digital subtractor for differentially combining a subtrahend input signal with a minuend input signal to generate a difference output signal used to provide said equalizer response;
- a first finite-impulse-response digital filter with adjustable filter coefficients for providing said minuend input signal to said digital subtractor in response to said digitized intermediate-frequency signal supplied from said analog-to-digital converter; and
- a second finite-impulse-response digital filter with adjustable filter coefficients for providing said minuend input signal to said digital subtractor in response to said difference output signal from said digital subtractor.

19. The combination of claim 17, wherein said equalizer comprises:
- a digital subtractor for differentially combining a subtrahend input signal with a minuend input signal to generate a difference output signal used to provide said equalizer response;
- a first finite-impulse-response digital filter with adjustable filter coefficients for providing said minuend input signal to said digital subtractor in response to said digitized intermediate-frequency signal supplied from said analog-to-digital converter; and
- a second finite-impulse-response digital filter with adjustable filter coefficients for providing said minuend input signal to said digital subtractor in response to said comparison quadrature-amplitude-modulation signal.

20. The combination of claim 17; wherein said complex demodulator includes
- a first digital multiplier for multiplying said real samples of said equalizer response by an in-phase digital carrier to generate a first product signal,
- a second digital multiplier for multiplying said imaginary samples of said equalizer response by a quadrature-phase digital carrier to generate a second product signal,
- a third digital multiplier for multiplying said real samples of said equalizer response by said quadrature-phase digital carrier to generate a third product signal,
- a fourth digital multiplier for multiplying said imaginary samples of said equalizer response by said in-phase digital carrier to generate a fourth product signal,
- a digital subtractor for subtracting said second product signal from said first product signal to generate said in-phase baseband signal, and
- a second digital adder for adding said third and fourth product signals to generate said quadrature-phase baseband signal; and wherein said first balanced modulator includes
- a fifth digital multiplier for multiplying together said in-phase digital carrier and said quantized in-phase baseband signal as re-sampled to said full sampling rate, thereby to generate said first balanced modulator output signal as a fifth product signal; and wherein said second balanced modulator includes
- a sixth digital multiplier for multiplying together said quadrature-phase digital carrier and said quantized quadrature-phase baseband signal as re-sampled to said full sampling rate, thereby to generate said second balanced modulator output signal as a sixth product signal.

21. The combination of claim 20, wherein each of said first, second, third, fourth, fifth and sixth digital multipliers are realized in read-only memory.

22. The combination of claim 21, further comprising:
- a sample clock generator for supplying said analog-to-digital conversion circuitry a sampling clock signal at a rate related to the symbol rate of said quadrature-amplitude-modulation signal;
- a sample counter for counting the occurrences of sampling clock signals to generate a sample count; and
- further read-only memory addressed by said sample count for generating said in-phase digital carrier and said quadrature-phase digital carrier.

23. The combination of claim 17, further comprising:
- a sample clock generator for supplying said analog-to-digital conversion circuitry a sampling clock signal at a rate related to the symbol rate of said quadrature-amplitude-modulation signal; and
- a sample counter for counting the occurrences of sampling clock signals to generate a sample count; and
- read-only memory included within said complex demodulator for generating said in-phase baseband signal and said quadrature-phase baseband signal, said read-only memory addressed in part by said sample count and addressed in further part by said equalizer response.

24. The combination of claim 23; wherein said first balanced modulator is constructed in
- further read-only memory generating said first balanced modulator output signal, said further read-only memory addressed in part by said sample count and addressed in further part by said quantized in-phase baseband signal as re-sampled to said full sampling rate; and wherein said second balanced modulator is constructed in
- yet further read-only memory generating said second balanced modulator output signal, said yet further read-only memory addressed in part by said sample count and addressed in further part by said quantized quadrature-phase baseband signal as re-sampled to said full sampling rate.

25. The combination of claim 16, wherein said quadrature-amplitude-modulation modulator comprises:
- a first digital lowpass filter for Nyquist slope filtering said first quantizer response as re-sampled to said full sampling rate, thereby to generate a first lowpass filter response;
- a second digital lowpass filter for Nyquist slope filtering said second quantizer response as re-sampled to said full sampling rate, thereby to generate a second lowpass filter response;
- a first balanced modulator for modulating the amplitude of an in-phase digital carrier in accordance with said first lowpass filter response, thereby to generate a first balanced modulator output signal;

a second balanced modulator for modulating the amplitude of a quadrature-phase digital carrier in accordance with said second lowpass filter response, thereby to generate a second modulator output signal; and a first digital adder for combining said first and said second modulator output signals to generate, as its sum output signal, said comparison quadrature-amplitude-modulation signal.

26. The combination of claim 25, wherein said equalizer comprises:

a digital subtractor for differentially combining a subtrahend input signal with a minuend input signal to generate a difference output signal used to provide said equalizer response;

a first finite-impulse-response digital filter with adjustable filter coefficients for providing said minuend input signal to said digital subtractor in response to said digitized intermediate-frequency signal supplied from said analog-to-digital converter; and a second finite-impulse-response digital filter with adjustable filter coefficients for providing said minuend input signal to said digital subtractor in response to said difference output signal from said digital subtractor.

27. The combination of claim 25, wherein said equalizer comprises:

a digital subtractor for differentially combining a subtrahend input signal with a minuend input signal to generate a difference output signal used to provide said equalizer response;

a first finite-impulse-response digital filter with adjustable filter coefficients for providing said minuend input signal to said digital subtractor in response to said digitized intermediate-frequency signal supplied from said analog-to-digital converter; and a second finite-impulse-response digital filter with adjustable filter coefficients for providing said minuend input signal to said digital subtractor in response to said comparison quadrature-amplitude-modulation signal.

28. The combination of claim 25; wherein said demodulator includes a first digital multiplier for multiplying said real samples of said equalizer response by an in-phase digital carrier to generate a first product signal, a second digital multiplier for multiplying said imaginary samples of said equalizer response by a quadrature-phase digital carrier to generate a second product signal, a third digital multiplier for multiplying said real samples of said equalizer response by said quadrature-phase digital carrier to generate a third product signal, a fourth digital multiplier for multiplying said imaginary samples of said equalizer response by said in-phase digital carrier to generate a fourth product signal, a digital subtractor for subtracting said second product signal from said first product signal to generate said in-phase baseband signal, and a second digital adder for adding said third and fourth product signals to generate said quadrature-phase baseband signal; and wherein said first balanced modulator includes a fifth digital multiplier for multiplying together said in-phase digital carrier and said first lowpass filter response, thereby to generate said first balanced modulator output signal as a fifth product signal; and wherein said second balanced modulator includes a sixth digital multiplier for multiplying together said quadrature-phase digital carrier and said second lowpass filter response, thereby to generate said second balanced modulator output signal as a sixth product signal.

29. The combination of claim 28, wherein each of said first, second, third, fourth, fifth and sixth digital multipliers are realized in read-only memory.

30. The combination of claim 29, further comprising:

a sample clock generator for supplying said analog-to-digital conversion circuitry a sampling clock signal at a rate related to the symbol rate of said quadrature-amplitude-modulation signal;

a sample counter for counting the occurrences of sampling clock signals to generate a sample count; and further read-only memory addressed by said sample count for generating said in-phase digital carrier and said quadrature-phase digital carrier.

31. The combination of claim 25, further comprising:

a sample clock generator for supplying said analog-to-digital conversion circuitry a sampling clock signal at a rate related to the symbol rate of said quadrature-amplitude-modulation signal; and a sample counter for counting the occurrences of sampling clock signals to generate a sample count; and read-only memory included within said demodulator for generating said in-phase baseband signal and said quadrature-phase baseband signal, said read-only memory addressed in part by said sample count and addressed in further part by said equalizer response.

32. The combination of claim 31; wherein said first balanced modulator is constructed in further read-only memory generating said first balanced modulator output signal, said further read-only memory addressed in part by said sample count and addressed in further part by said first lowpass filter response; and wherein said second balanced modulator is constructed in yet further read-only memory generating said second balanced modulator output signal, said yet further read-only memory addressed in part by said sample count and addressed in further part by said second lowpass filter response.

33. The combination of claim 15, wherein said analog-to-digital conversion circuitry essentially consists of a single analog-to-digital converter for supplying real digital samples of said digitized intermediate-frequency signal, and wherein said equalizer comprises:

a first digital subtractor for differentially combining a subtrahend input signal with a minuend input signal to generate a difference output signal, said minuend input signal being said digitized intermediate-frequency signal generated by said analog-to-digital converter;

a first finite-impulse-response digital filter with adjustable filter coefficients for providing said subtrahend input signal to said digital subtractor in response to said difference output signal therefrom;

a second finite-impulse-response digital filter with adjustable filter coefficients for providing in response to said difference output signal of said digital subtractor a stream of imaginary samples of said equalizer response to said complex demodulator; and a third finite-impulse-response digital filter with adjustable filter coefficients, for providing in response to said difference output signal of said digital subtractor a stream of real samples of said equalizer response to said complex demodulator.

34. The combination of claim 33, wherein said in-phase baseband signal and a quadrature-phase baseband signal are supplied at the full sampling rate of said analog-to-digital converter, said combination further comprising:

a first rate-reduction filter for supplying a symbol-rate first rate-reduction filter response to said in-phase baseband signal;

a first quantizer responsive to said symbol-rate first rate-reduction filter response to in-phase baseband signal for supplying, as a first quantizer response, a quantized in-phase baseband signal that estimates the in-phase component of said complex modulating signal at the transmitter of the quadrature-amplitude-modulation signal currently being received;

a first sampler for re-sampling said first quantizer response to said full sampling rate;

a second quantizer responsive to said symbol-rate second rate-reduction filter response to said quadrature-phase baseband signal for supplying, as a second quantizer response, a quantized quadrature-phase baseband signal that estimates the quadrature-phase component of said complex modulating signal at the transmitter of the quadrature-amplitude-modulation signal currently being received;

a second sampler for re-sampling said second quantizer response to said full sampling rate; and the following elements included within said quadrature-amplitude-modulation modulator:

a first balanced modulator for modulating the amplitude of an in-phase digital carrier in accordance with said first quantizer response as re-sampled to said full sampling rate, thereby to generate a first balanced modulator output signal;

a second balanced modulator for modulating the amplitude of a quadrature-phase digital carrier in accordance with said second quantizer response as re-sampled to said full sampling rate, thereby to generate a second balanced modulator output signal;

a first digital adder for combining said first and said second modulator output signals to generate a sum output signal; and a bandpass digital filter responsive to said sum output signal for supplying said comparison quadrature-amplitude-modulation signal.

35. The combination of claim 34; wherein said demodulator includes a first digital multiplier for multiplying said real samples of said equalizer response by an in-phase digital carrier to generate a first product signal, a second digital multiplier for multiplying said imaginary samples of said equalizer response by a quadrature-phase digital carrier to generate a second product signal, a third digital multiplier for multiplying said real samples of said equalizer response by said quadrature-phase digital carrier to generate a third product signal, a fourth digital multiplier for multiplying said imaginary samples of said equalizer response by said in-phase digital carrier to generate a fourth product signal, a second digital subtractor for subtracting said second product signal from said first product signal to generate said in-phase baseband signal, and a second digital adder for adding said third and fourth product signals to generate said quadrature-phase baseband signal; and wherein said first balanced modulator includes a fifth digital multiplier for multiplying together said in-phase digital carrier and said first quantizer response as re-sampled to said full sampling rate, thereby to generate said first balanced modulator output signal as a fifth product signal; and wherein said second balanced modulator includes a sixth digital multiplier for multiplying together said quadrature-phase digital carrier and said second quantizer response as re-sampled to said full sampling rate, thereby to generate said second balanced modulator output signal as a sixth product signal.

36. The combination of claim 35, wherein each of said first, second, third, fourth, fifth and sixth digital multipliers are realized in read-only memory.

37. The combination of claim 36, further comprising:

a sample clock generator for supplying said analog-to-digital conversion circuitry a sampling clock signal at a rate related to the symbol rate of said quadrature-amplitude-modulation signal;

a sample counter for counting the occurrences of sampling clock signals to generate a sample count; and further read-only memory addressed by said sample count for generating said in-phase digital carrier and said quadrature-phase digital carrier.

38. The combination of claim 33, further comprising:

a sample clock generator for supplying said analog-to-digital conversion circuitry a sampling clock signal at a rate related to the symbol rate of said quadrature-amplitude-modulation signal; and a sample counter for counting the occurrences of sampling clock signals to generate a sample count; and read-only memory included within said demodulator for generating said in-phase baseband signal and said quadrature-phase baseband signal, said read-only memory addressed in part by said sample count and addressed in further part by said equalizer response.

39. The combination of claim 38; wherein said first balanced modulator is constructed in further read-only memory generating said first balanced modulator output signal, said further read-only memory addressed in part by said sample count and addressed in further part by said first quantizer response as re-sampled to said full sampling rate; and wherein said second balanced modulator is constructed in yet further read-only memory generating said second balanced modulator output signal, said yet further read-only memory addressed in part by said sample count and addressed in further part by said second quantizer response as re-sampled to said full sampling rate.

40. The combination of claim 33, wherein said in-phase baseband signal and said quadrature-phase baseband signal are supplied at the full sampling rate of said analog-to-digital converter, said combination further comprising:

a first rate-reduction filter for supplying a symbol-rate first rate-reduction filter response to said in-phase baseband signal;

a first quantizer responsive to said symbol-rate first rate-reduction filter response to in-phase baseband signal for supplying, as a first quantizer response, a quantized in-phase baseband signal that estimates the in-phase component of said complex modulating signal at the transmitter of the quadrature-amplitude-modulation signal currently being received;

a first sampler for re-sampling said first quantizer response to said full sampling rate;

a second quantizer responsive to said symbol-rate second rate-reduction filter response to said quadrature-phase baseband signal for supplying, as a second quantizer response, a quantized quadrature-phase baseband signal that estimates the quadrature-phase component of said complex modulating signal at the transmitter of the quadrature-amplitude-modulation signal currently being received;

a second sampler for re-sampling said second quantizer response to said full sampling rate;

and the following elements included within said quadrature-amplitude-modulation modulator:

a first digital lowpass filter for Nyquist slope filtering said first quantizer response as re-sampled to said full sampling rate, thereby to generate a first lowpass filter response;

a second digital lowpass filter for Nyquist slope filtering said second quantizer response as re-sampled to said full sampling rate, thereby to generate a second lowpass filter response;

a first balanced modulator for modulating the amplitude of an in-phase digital carrier in accordance with said first lowpass filter response, thereby to generate a first balanced modulator output signal;

a second balanced modulator for modulating the amplitude of a quadrature-phase digital carrier in accordance with said second lowpass filter response, thereby to generate a second modulator output signal; and a first digital adder for combining said first and said second modulator output signals to generate, as its sum output signal, said comparison quadrature-amplitude-modulation signal.

41. The combination of claim 40; wherein said demodulator includes a first digital multiplier for multiplying said real samples of said equalizer response by an in-phase digital carrier to generate a first product signal, a second digital multiplier for multiplying said imaginary samples of said equalizer response by a quadrature-phase digital carrier to generate a second product signal, a third digital multiplier for multiplying said real samples of said equalizer response by said quadrature-phase digital carrier to generate a third product signal, a fourth digital multiplier for multiplying said imaginary samples of said equalizer response by said in-phase digital carrier to generate a fourth product signal, a second digital subtractor for subtracting said second product signal from said first product signal to generate said in-phase baseband signal, and a second digital adder for adding said third and fourth product signals to generate said quadrature-phase baseband signal; and wherein said first balanced modulator includes a fifth digital multiplier for multiplying together said in-phase digital carrier and said first lowpass filter response, thereby to generate said first balanced modulator output signal as a fifth product signal; and wherein said second balanced modulator includes a sixth digital multiplier for multiplying together said quadrature-phase digital carrier and said second lowpass filter response, thereby to generate said second balanced modulator output signal as a sixth product signal.

42. The combination of claim 41, wherein each of said first, second, third, fourth, fifth and sixth digital multipliers are realized in read-only memory.

43. The combination of claim 40, further comprising:

a sample clock generator for supplying said analog-to-digital conversion circuitry a sampling clock signal at a rate related to the symbol rate of said quadrature-amplitude-modulation signal;

a sample counter for counting the occurrences of sampling clock signals to generate a sample count; and further read-only memory addressed by said sample count for generating said in-phase digital carrier and said quadrature-phase digital carrier.

44. The combination of claim 40, further comprising:

a sample clock generator for supplying said analog-to-digital conversion circuitry a sampling clock signal at a rate related to the symbol rate of said quadrature-amplitude-modulation signal; and a sample counter for counting the occurrences of sampling clock signals to generate a sample count; and read-only memory included within said demodulator for generating said in-phase baseband signal and said quadrature-phase baseband signal, said read-only memory addressed in part by said sample count and addressed in further part by said equalizer response.

45. The combination of claim 44; wherein said first balanced modulator is constructed in further read-only memory generating said first balanced modulator output signal, said further read-only memory addressed in part by said sample count and addressed in further part by said first lowpass filter response; and wherein said second balanced modulator is constructed in yet further read-only memory generating said second balanced modulator output signal, said yet further read-only memory addressed in part by said sample count and addressed in further part by said second lowpass filter response.

46. The combination of claim 15, wherein said tuner circuitry is of a type including a complex mixer for supplying respective streams of real and imaginary samples of said modulated signal as translated in frequency from said intermediate frequency band to said final intermediate-frequency band, wherein said analog-to-digital conversion circuitry includes a first analog-to-digital converter for digitizing real samples of said modulated signal as translated to said final intermediate-frequency band to generate a first analog-to-digital converter response, wherein said analog-to-digital conversion circuitry further includes a second analog-to-digital converter for digitizing imaginary samples of said modulated signal as translated to said final intermediate-frequency band to generate a second analog-to-digital converter response, and wherein said equalizer comprises:

a first digital subtractor for differentially combining a first subtrahend input signal with a first minuend input signal to generate, as a first difference output signal from said first digital subtractor, real samples of said equalizer response supplied to said demodulator;

a first finite-impulse-response digital filter with adjustable filter coefficients for providing said first minuend input signal to said first digital subtractor in response to said first analog-to-digital converter response;

a second finite-impulse-response digital filter with adjustable filter coefficients for providing a response applied to said first digital subtractor as said first subtrahend input signal;

a second digital subtractor for differentially combining a second subtrahend input signal with a second minuend input signal to generate, as a second difference output signal from said second digital subtractor, imaginary samples of said equalizer response supplied to said demodulator;

a third finite-impulse-response digital filter with adjustable filter coefficients for providing said second minuend input signal to said second digital subtractor in response to said second analog-to-digital converter response; and a fourth finite-impulse-response digital filter with adjustable filter coefficients for providing a response applied to said second digital subtractor as said second subtrahend input signal.

47. The combination of claim 46, wherein said in-phase baseband signal and a quadrature-phase baseband signal are supplied at the full sampling rate of said analog-to-digital converter, said combination further comprising:

a first rate-reduction filter for supplying a symbol-rate first rate-reduction filter response to said in-phase baseband signal;

a first quantizer responsive to said symbol-rate first rate-reduction filter response to in-phase baseband signal for supplying, as a first quantizer response, a quantized in-phase baseband signal that estimates the in-phase component of said complex modulating signal at the transmitter of the quadrature-amplitude-modulation signal currently being received;

a first sampler for re-sampling said first quantizer response to said full sampling rate;

a second quantizer responsive to said symbol-rate second rate-reduction filter response to said quadrature-phase baseband signal for supplying, as a second quantizer response, a quantized quadrature-phase baseband signal that estimates the quadrature-phase component of said complex modulating signal at the transmitter of the quadrature-amplitude-modulation signal currently being received;

a second sampler for re-sampling said second quantizer response to said full sampling rate; and the following elements included within said quadrature-amplitude-modulation modulator:

a first balanced modulator for modulating the amplitude of an in-phase digital carrier in accordance with said first quantizer response as re-sampled to said full sampling rate, thereby to generate a first balanced modulator output signal;

a second balanced modulator for modulating the amplitude of a quadrature-phase digital carrier in accordance with said second quantizer response as re-sampled to said full sampling rate, thereby to generate a second balanced modulator output signal;

a first digital adder for combining said first and said second modulator output signals to generate a sum signal; and a first bandpass digital filter responsive to said sum signal for supplying real samples of said comparison quadrature-amplitude-modulation signal to said error detector as a real component of its input signal and to said second finite-impulse-response digital filter as the input signal thereof.

48. The combination of claim 47, wherein said second difference output signal from said second digital subtractor is applied to said fourth finite-impulse-response digital filter as the input signal thereof.

49. The combination of claim 47, wherein said quadrature-amplitude-modulation modulator further comprises:

a third balanced modulator for modulating the amplitude of an in-phase digital carrier in accordance with said second quantizer response as re-sampled to said full sampling rate, thereby to generate a third balanced modulator output signal;

a fourth balanced modulator for modulating the amplitude of a quadrature-phase digital carrier in accordance with said first quantizer response as re-sampled to said full sampling rate, thereby to generate a fourth balanced modulator output signal;

a third digital subtractor for subtracting said fourth modulator output signal from said third modulator output signal to generate a third difference output signal; and a second bandpass digital filter responsive to said third difference output signal for supplying imaginary samples of said comparison quadrature-amplitude-modulation signal to said error detector as an imaginary component of its input signal.

50. The combination of claim 49, wherein said second bandpass digital filter supplies said imaginary samples of said comparison quadrature-amplitude-modulation signal to said fourth finite-impulse-response digital filter as the input signal thereof.

51. The combination of claim 46, wherein said in-phase baseband signal and a quadrature-phase baseband signal are supplied at the full sampling rate of said analog-to-digital converter, said combination further comprising:

a first rate-reduction filter for supplying a symbol-rate first rate-reduction filter response to said in-phase baseband signal;

a first quantizer responsive to said symbol-rate first rate-reduction filter response to in-phase baseband signal for supplying, as a first quantizer response, a quantized in-phase baseband signal that estimates the in-phase component of said complex modulating signal at the transmitter of the quadrature-amplitude-modulation signal currently being received;

a first sampler for re-sampling said first quantizer response to said full sampling rate;

a second quantizer responsive to said symbol-rate second rate-reduction filter response to said quadrature-phase baseband signal for supplying, as a second quantizer response, a quantized quadrature-phase baseband signal that estimates the quadrature-phase component of said complex modulating signal at the transmitter of the quadrature-amplitude-modulation signal currently being received;

a second sampler for re-sampling said second quantizer response to said full sampling rate;

a first digital lowpass filter for Nyquist slope filtering said first quantizer response as re-sampled to said full sampling rate, thereby to generate a first lowpass filter response;

a second digital lowpass filter for Nyquist slope filtering said second quantizer response as re-sampled to said full sampling rate, thereby to generate a second lowpass filter response; and the following elements included within said quadrature-amplitude-modulation modulator:

a first balanced modulator for modulating the amplitude of an in-phase digital carrier in accordance with said first lowpass filter response, thereby to generate a first balanced modulator output signal;

a second balanced modulator for modulating the amplitude of a quadrature-phase digital carrier in accordance with said second lowpass filter response, thereby to generate a second balanced modulator output signal; and a first digital adder for combining said first and said second modulator output signals to generate, as a sum output signal, real samples of said comparison quadrature-amplitude-modulation signal supplied to said error detector as a real component of its input signal and to said second finite-impulse-response digital filter as the input signal thereof.

52. The combination of claim 51, wherein said second difference output signal from said second digital subtractor is applied to said fourth finite-impulse-response digital filter as the input signal thereof.

53. The combination of claim 51, wherein said quadrature-amplitude-modulation modulator further comprises:

a third balanced modulator for modulating the amplitude of an in-phase digital carrier in accordance with said second lowpass filter response, thereby to generate a third balanced modulator output signal;

a fourth balanced modulator for modulating the amplitude of a quadrature-phase digital carrier in accordance with said first lowpass filter response, thereby to generate a fourth balanced modulator output signal; and a third digital subtractor for subtracting said fourth modulator output signal from said third modulator output signal to generate, as a third difference output signal, imaginary samples of said comparison quadrature-amplitude-modulation signal supplied to said error detector as an imaginary component of its input signal.

54. The combination of claim 53, wherein said second bandpass digital filter supplies said imaginary samples of said comparison quadrature-amplitude-modulation signal to said fourth finite-impulse-response digital filter as the input signal thereof.

55. In a radio receiver for receiving a vestigial-sideband amplitude-modulation signal transmitted in a radio-frequency band from a vestigial-sideband amplitude-modulation transmitter, said modulated signal being in a channel of a prescribed bandwidth, the combination comprising:

means for translating in frequency said vestigial-sideband amplitude-modulation signal from an intermediate frequency band to a final intermediate-frequency band;

analog-to-digital conversion circuitry for digitizing samples of said vestigial-sideband amplitude-modulation signal as translated to said final intermediate-frequency band, thereby to generate a digitized final intermediate-frequency signal;

an equalizer including adaptive digital filtering with adjustable filter coefficients, connected for supplying an equalizer response to said digitized final intermediate-frequency signal;

a complex demodulator connected for demodulating said equalizer response, thereby to provide demodulation results that include an in-phase baseband signal and a quadrature-phase baseband signal;

circuitry responsive to said in-phase baseband signal for generating estimates of modulating signal at the transmitter of the vestigial-sideband amplitude-modulation signal currently being received;

a vestigial-sideband amplitude-modulation modulator for vestigial-sideband amplitude-modulating a locally generated carrier in accordance with said estimates of modulating signal at the transmitter of the vestigial-sideband amplitude-modulation signal currently being received, thereby to generate a comparison vestigial-sideband amplitude-modulation signal;

an error detector for comparing said comparison vestigial-sideband amplitude-modulation signal with said equalizer response, as suitably delayed, to generate a decision-feedback signal; and filter coefficient computation apparatus responsive to said decision-feedback signal for adjusting the adjustable filter coefficients of said adaptive digital filtering included in said equalizer.

56. The combination of claim 55, wherein said analog-to-digital conversion circuitry essentially consists of a single analog-to-digital converter for supplying real digital samples of said digitized intermediate-frequency signal, and wherein said in-phase baseband signal and said quadrature-phase baseband signal are supplied at the full sampling rate of said analog-to-digital converter, said combination further comprising:

a phase-splitter responsive to said equalizer response for supplying said complex demodulator with a stream of imaginary samples of said equalizer response and with a stream of real samples of said equalizer response; and, within said circuitry responsive to said in-phase baseband signal for generating estimates of modulating signal at the transmitter of the vestigial-sideband amplitude-modulation signal currently being received, a rate-reduction filter for supplying a symbol-rate rate-reduction filter response to said in-phase baseband signal;

a quantizer responsive to said symbol-rate rate-reduction filter response to in-phase baseband signal for supplying a quantized in-phase baseband signal that estimates the modulating signal at the transmitter of the vestigial-sideband amplitude-modulation signal currently being received;

a sampler for re-sampling said quantized in-phase baseband signal to said full sampling rate; and a first digital adder for adding an offset value to each sample of said quantized in-phase baseband signal as re-sampled to said full sampling rate and supplying as its sum output signal said estimates of modulating signal at the transmitter of the vestigial-sideband amplitude-modulation signal currently being received.

57. The combination of claim 56, wherein said vestigial-sideband amplitude-modulation modulator comprises:

a balanced modulator for modulating the amplitude of an in-phase digital carrier in accordance with said sum output signal of said first digital adder, thereby to generate a balanced modulator output signal; and a bandpass digital filter responsive to said balanced modulator output signal for supplying said comparison vestigial-sideband amplitude-modulation signal.

58. The combination of claim 57, wherein said equalizer comprises:

a digital subtractor for differentially combining a subtrahend input signal with a minuend input signal to generate a difference output signal used to provide said equalizer response;

a first finite-impulse-response digital filter with adjustable filter coefficients for providing said minuend input signal to said digital subtractor in response to said digitized intermediate-frequency signal supplied from said analog-to-digital converter; and a second finite-impulse-response digital filter with adjustable filter coefficients for providing said minuend input signal to said digital subtractor in response to said difference output signal from said digital subtractor.

59. The combination of claim 57, wherein said equalizer comprises:

a digital subtractor for differentially combining a subtrahend input signal with a minuend input signal to generate a difference output signal used to provide said equalizer response;

a first finite-impulse-response digital filter with adjustable filter coefficients for providing said minuend input signal to said digital subtractor in response to said digitized intermediate-frequency signal supplied from said analog-to-digital converter; and a second finite-impulse-response digital filter with adjustable filter coefficients for providing said minuend input signal to said digital subtractor in response to said comparison vestigial-sideband amplitude-modulation signal.

60. The combination of claim 57; wherein said complex demodulator includes a first digital multiplier for multiplying said real samples of said equalizer response by an in-phase digital carrier to generate a first product signal, a second digital multiplier for multiplying said imaginary samples of said equalizer response by a quadrature-phase digital carrier to generate a second product signal, a third digital multiplier for multiplying said real samples of said equalizer response by said quadrature-phase digital carrier to generate a third product signal, a fourth digital multiplier for multiplying said imaginary samples of said equalizer response by said in-phase digital carrier to generate a fourth product signal, a digital subtractor for subtracting said second product signal from said first product signal to generate said in-phase baseband signal, and a second digital adder for adding said third and fourth product signals to generate said quadrature-phase baseband signal; and wherein said balanced modulator includes a fifth digital multiplier for multiplying together said in-phase digital carrier and said quantized in-phase baseband signal as re-sampled to said full sampling rate, thereby to generate said balanced modulator output signal as a fifth product signal.

61. The combination of claim 57, wherein each of said first, second, third, fourth and fifth digital multipliers are realized in read-only memory.

62. The combination of claim 61, further comprising:

a sample clock generator for supplying said analog-to-digital conversion circuitry a sampling clock signal at a rate related to the symbol rate of said vestigial-sideband amplitude-modulation signal;

a sample counter for counting the occurrences of sampling clock signals to generate a sample count; and further read-only memory addressed by said sample count for generating said in-phase digital carrier and said quadrature-phase digital carrier.

63. The combination of claim 57, further comprising:

a sample clock generator for supplying said analog-to-digital conversion circuitry a sampling clock signal at a rate related to the symbol rate of said vestigial-sideband amplitude-modulation signal; and a sample counter for counting the occurrences of sampling clock signals to generate a sample count; and read-only memory included within said complex demodulator for generating said in-phase baseband signal and said quadrature-phase baseband signal, said read-only memory addressed in part by said sample count and addressed in further part by said equalizer response.

64. The combination of claim 63; wherein said balanced modulator is constructed in further read-only memory generating said balanced modulator output signal, said further read-only memory addressed in part by said sample count and addressed in further part by said quantized in-phase baseband signal as re-sampled to said full sampling rate.

65. The combination of claim 55, wherein said analog-to-digital conversion circuitry essentially consists of a single analog-to-digital converter for supplying real digital samples of said digitized intermediate-frequency signal, and wherein said equalizer comprises:

a digital subtractor for differentially combining a subtrahend input signal with a minuend input signal to generate a difference output signal, said minuend input signal being said digitized intermediate-frequency signal generated by said analog-to-digital converter;

a first finite-impulse-response digital filter with adjustable filter coefficients for providing said subtrahend input signal to said digital subtractor in response to said difference output signal therefrom;

a second finite-impulse-response digital filter with adjustable filter coefficients for providing in response to said difference output signal of said digital subtractor a stream of imaginary samples of said equalizer response to said complex demodulator; and a third finite-impulse-response digital filter with adjustable filter coefficients, for providing in response to said difference output signal of said digital subtractor a stream of real samples of said equalizer response to said complex demodulator.

66. The combination of claim 65, wherein said in-phase baseband signal and a quadrature-phase baseband signal are supplied at the full sampling rate of said analog-to-digital converter, said combination further comprising:

a rate-reduction filter for supplying a symbol-rate rate-reduction filter response to said in-phase baseband signal;

a quantizer responsive to said symbol-rate rate-reduction filter response to in-phase baseband signal for supplying a quantized in-phase baseband signal that estimates the modulating signal at the transmitter of the vestigial-sideband amplitude-modulation signal currently being received;

a sampler for re-sampling said quantized in-phase baseband signal to said full sampling rate;

a first digital adder for adding an offset value to each sample of said quantized in-phase baseband signal as re-sampled to said full sampling rate and supplying as its sum output signal said estimates of modulating signal at the transmitter of the vestigial-sideband amplitude-modulation signal currently being received;

a balanced modulator for modulating the amplitude of an in-phase digital carrier in accordance with said sum output signal of said first digital adder, thereby to generate a balanced modulator output signal; and a bandpass digital filter responsive to said balanced modulator output signal for supplying said comparison vestigial-sideband amplitude-modulation signal.

67. The combination of claim 66; wherein said demodulator includes a first digital multiplier for multiplying said real samples of said equalizer response by an in-phase digital carrier to generate a first product signal, a second digital multiplier for multiplying said imaginary samples of said equalizer response by a quadrature-phase digital carrier to generate a second product signal, a third digital multiplier for multiplying said real samples of said equalizer response by said quadrature-phase digital carrier to generate a third product signal, a fourth digital multiplier for multiplying said imaginary samples of said equalizer response by said in-phase digital carrier to generate a fourth product signal, a second digital subtractor for subtracting said second product signal from said first product signal to generate said in-phase baseband signal, and a second digital adder for adding said third and fourth product signals to generate said quadrature-phase baseband signal; and wherein said first balanced modulator includes a fifth digital multiplier for multiplying together said in-phase digital carrier and said quantized in-phase baseband signal as re-sampled to said full sampling rate, thereby to generate said first balanced modulator output signal as a fifth product signal.

68. The combination of claim 67, wherein each of said first, second, third, fourth and fifth digital multipliers are realized in read-only memory.

69. The combination of claim 68, further comprising:

a sample clock generator for supplying said analog-to-digital conversion circuitry a sampling clock signal at a rate related to the symbol rate of said vestigial-sideband amplitude-modulation signal;

a sample counter for counting the occurrences of sampling clock signals to generate a sample count; and further read-only memory addressed by said sample count for generating said in-phase digital carrier and said quadrature-phase digital carrier.

70. The combination of claim 65, further comprising:

a sample clock generator for supplying said analog-to-digital conversion circuitry a sampling clock signal at a rate related to the symbol rate of said vestigial-sideband amplitude-modulation signal; and a sample counter for counting the occurrences of sampling clock signals to generate a sample count; and read-only memory included within said demodulator for generating said in-phase baseband signal and said quadrature-phase baseband signal, said read-only memory addressed in part by said sample count and addressed in further part by said equalizer response.

71. The combination of claim 70; wherein said balanced modulator is constructed in further read-only memory generating said balanced modulator output signal, said further read-only memory addressed in part by said sample count and addressed in further part by said quantized in-phase baseband signal as re-sampled to said full sampling rate.

72. The combination of claim 55, wherein said tuner circuitry is of a type including a complex mixer for supplying respective streams of real and imaginary samples of said modulated signal as translated in frequency from said intermediate frequency band to said final intermediate-frequency band, wherein said analog-to-digital conversion circuitry includes a first analog-to-digital converter for digitizing real samples of said modulated signal as translated to said final intermediate-frequency band to generate a first analog-to-digital converter response, wherein said analog-to-digital conversion circuitry further includes a second analog-to-digital converter for digitizing imaginary samples of said modulated signal as translated to said final intermediate-frequency band to generate a second analog-to-digital converter response, and wherein said equalizer comprises:

a first digital subtractor for differentially combining a first subtrahend input signal with a first minuend input signal to generate, as a first difference output signal from said first digital subtractor, real samples of said equalizer response supplied to said demodulator;

a first finite-impulse-response digital filter with adjustable filter coefficients for providing said first minuend input signal to said first digital subtractor in response to said first analog-to-digital converter response;

a second finite-impulse-response digital filter with adjustable filter coefficients for providing a response applied to said first digital subtractor as said first subtrahend input signal;

a second digital subtractor for differentially combining a second subtrahend input signal with a second minuend input signal to generate, as a second difference output signal from said second digital subtractor, imaginary samples of said equalizer response supplied to said demodulator;

a third finite-impulse-response digital filter with adjustable filter coefficients for providing said second minuend input signal to said second digital subtractor in response to said second analog-to-digital converter response; and a fourth finite-impulse-response digital filter with adjustable filter coefficients for providing a response applied to said second digital subtractor as said second subtrahend input signal.

73. The combination of claim 72, wherein said in-phase baseband signal and a quadrature-phase baseband signal are supplied at the full sampling rate of said analog-to-digital converter, and wherein said second difference output signal from said second digital subtractor is applied to said fourth finite-impulse-response digital filter as the input signal thereof, said combination further comprising:

a rate-reduction filter for supplying a symbol-rate rate-reduction filter response to said in-phase baseband signal;

a quantizer responsive to said symbol-rate rate-reduction filter response to in-phase baseband signal for supplying a quantized in-phase baseband signal that estimates the in-phase component of said complex modulating signal at the transmitter of the vestigial-sideband amplitude-modulation signal currently being received;

a sampler for re-sampling said quantized in-phase baseband signal to said full sampling rate; and the following elements included within said vestigial-sideband amplitude-modulation modulator:

a first balanced modulator for modulating the amplitude of an in-phase digital carrier in accordance with said quantized in-phase baseband signal as re-sampled to said full sampling rate by said sampler, thereby to generate a first balanced modulator output signal; and a first bandpass digital filter responsive to said sum signal for supplying real samples of said comparison quadrature-amplitude-modulation signal to said error detector as a real component of its input signal and to said second finite-impulse-response digital filter as the input signal thereof.

74. The combination of claim 73, wherein said second difference output signal from said second digital subtractor is applied to said fourth finite-impulse-response digital filter as the input signal thereof.

75. The combination of claim 72, wherein said in-phase baseband signal and a quadrature-phase baseband signal are supplied at the full sampling rate of said analog-to-digital converter, said combination further comprising:

a rate-reduction filter for supplying a symbol-rate rate-reduction filter response to said in-phase baseband signal;

a quantizer responsive to said symbol-rate rate-reduction filter response to in-phase baseband signal for supplying a quantized in-phase baseband signal;

a sampler for re-sampling said quantized in-phase baseband signal to said full sampling rate; and the following elements included within said vestigial-sideband amplitude-modulation modulator:

a phase-splitter responsive to said quantized in-phase baseband signal as re-sampled to said full sampling rate by said sampler, for supplying a stream of real samples and a stream of imaginary samples which together provide complex estimates of the in-phase component of said complex modulating signal at the transmitter of the vestigial-sideband amplitude-modulation signal currently being received;

a first balanced modulator for modulating the amplitude of an in-phase digital carrier in accordance with said stream of real samples from said phase splitter, thereby to generate a first balanced modulator output signal;

a first bandpass digital filter connected for supplying its response to said first balanced modulator output signal to said to said error detector as a real component of its input signal;

a second balanced modulator for modulating the amplitude of a quadrature-phase digital carrier in accordance with said stream of imaginary samples from said phase splitter, thereby to generate a second balanced modulator output signal; and a second bandpass digital filter connected for supplying its response to said second balanced modulator output signal to said error detector as an imaginary component of its input signal.

76. The combination of claim 75, wherein said first bandpass digital filter is connected for supplying its response to said first balanced modulator output signal to said second finite-impulse-response digital filter as the input signal thereof, and wherein said second bandpass digital filter is connected for supplying its response to said second balanced modulator output signal to said fourth finite-impulse-response digital filter as the input signal thereof.

* * * * *